United States Patent [19]
Fujii et al.

[11] Patent Number: 6,027,333
[45] Date of Patent: Feb. 22, 2000

[54] RADIANT TUBE BURNER

[75] Inventors: Yoshiki Fujii; Toshio Ishii; Shunichi Sugiyama, all of Tokyo; Ryoichi Tanaka, Yokohama; Mamoru Matsuo, Yokohama; Makoto Miyata, Yokohama; Shigeo Kurioka, Tokyo; Hiroaki Sato, Tokyo; Akinori Hokabori, Tokyo; Toshikazu Akiyama, Tokyo, all of Japan

[73] Assignees: NKK Corporation, Tokyo; Japan & Nippon Furnace Kogyo Kaisha, Ltd., Yokohama, both of Japan

[21] Appl. No.: 08/648,155

[22] PCT Filed: Sep. 22, 1995

[86] PCT No.: PCT/JP95/01916

§ 371 Date: May 23, 1996

§ 102(e) Date: May 23, 1996

[87] PCT Pub. No.: WO96/09496

PCT Pub. Date: Mar. 28, 1996

[30] Foreign Application Priority Data

Sep. 24, 1994 [JP] Japan .................................. 6-254570
Mar. 13, 1995 [JP] Japan .................................. 7-52224
Mar. 13, 1995 [JP] Japan .................................. 7-52225
Aug. 23, 1995 [JP] Japan .................................. 7-214485
Aug. 31, 1995 [JP] Japan .................................. 7-223531

[51] Int. Cl.[7] ........................... F23D 14/12; F23D 14/48; F23C 7/00
[52] U.S. Cl. ................. 431/215; 431/11; 431/8; 431/252; 432/180; 432/181; 432/209; 126/91 A
[58] Field of Search ................. 126/91 A; 431/115, 431/215, 11, 8, 353, 10, 350, 349, 252; 239/398, 418; 432/181, 209, 180

[56] References Cited

U.S. PATENT DOCUMENTS 2,250,680  7/1941  Schlitt .................................. 126/91 A
2,398,611  4/1946  Beggs .................................... 126/91 A
2,712,308  7/1955  Keating .................................. 126/91 A
4,162,890  7/1979  Hirose ..................................... 431/115
4,911,637  3/1990  Moore et al. ........................... 431/252
4,926,842  5/1990  Watson .................................. 126/91 A
5,479,912  1/1996  Dunne .................................... 126/91 A

FOREIGN PATENT DOCUMENTS 63-63806    6/1987  Japan .
62-242711  10/1987  Japan .
63-116011   5/1988  Japan .
2-23950     6/1990  Japan .
311202      1/1991  Japan .
406193824   7/1994  Japan .................................... 431/350
6-65705     9/1994  Japan .

OTHER PUBLICATIONS

Patent Abstracts of Japan of JP 62—242,711 of Oct. 1987.
Patent Abstracts of Japan of JP 63—116,011 of May 1988.
Patent Abstracts of Japan of JP 3—11,202 of Jan. 1991.

*Primary Examiner*—Carl D. Price
*Attorney, Agent, or Firm*—Ladas & Parry

[57] ABSTRACT

With respect to a radiant tube burner to be used for heating a heating furnace or the like, to suppress the generation of NOx accompanying combustion, to make the structure thereof fit for a radiant tube burner equipment, to simplify the control of a fuel supply system and an air supply system, and to prevent the coking. Furthermore, to provide a combustion control scheme appropriate to a radiant tube burner. For these purposes, the present invention placed the respective tips of a fuel nozzle, e.g., pilot burner joint-use nozzle (11), and an air throat (13) in the end of a radiant tube (3) and moreover has a combustion air injection port (33) of the air throat (13) provided to be deviated in contact with or near to the inner circumferential wall surface of the radiant tube (3). In addition, a control device (307) for making a burner burn alternately.

20 Claims, 36 Drawing Sheets

FIOW VELOCITY OF AIR/COMBUSTION SPEED

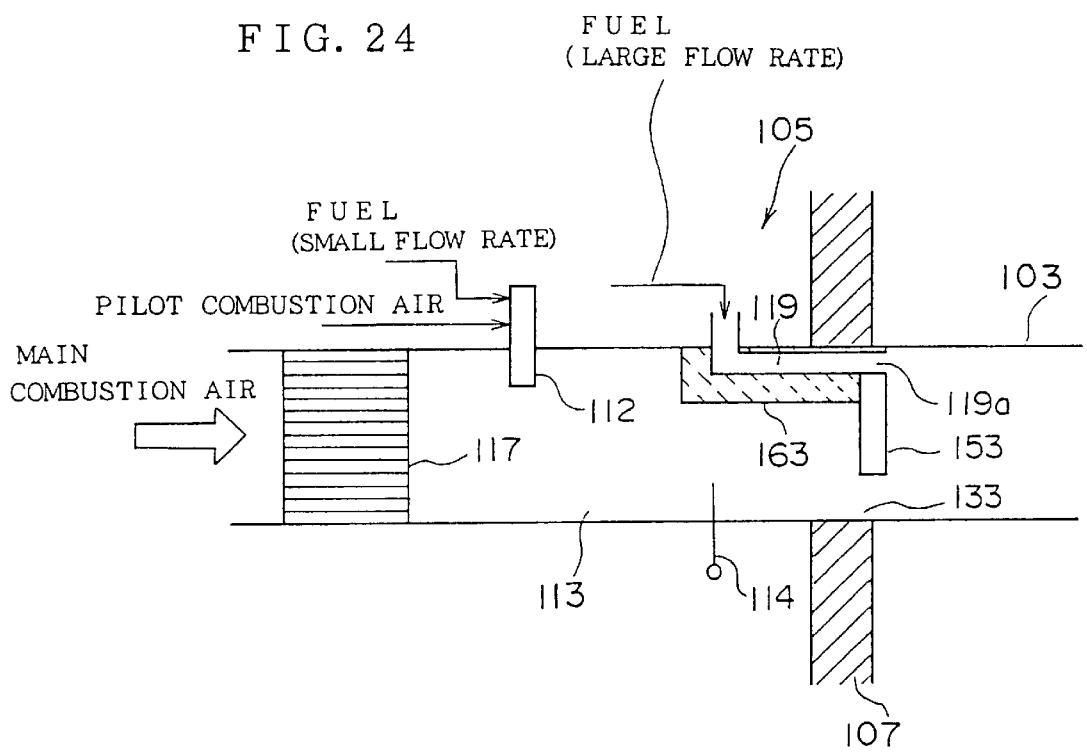

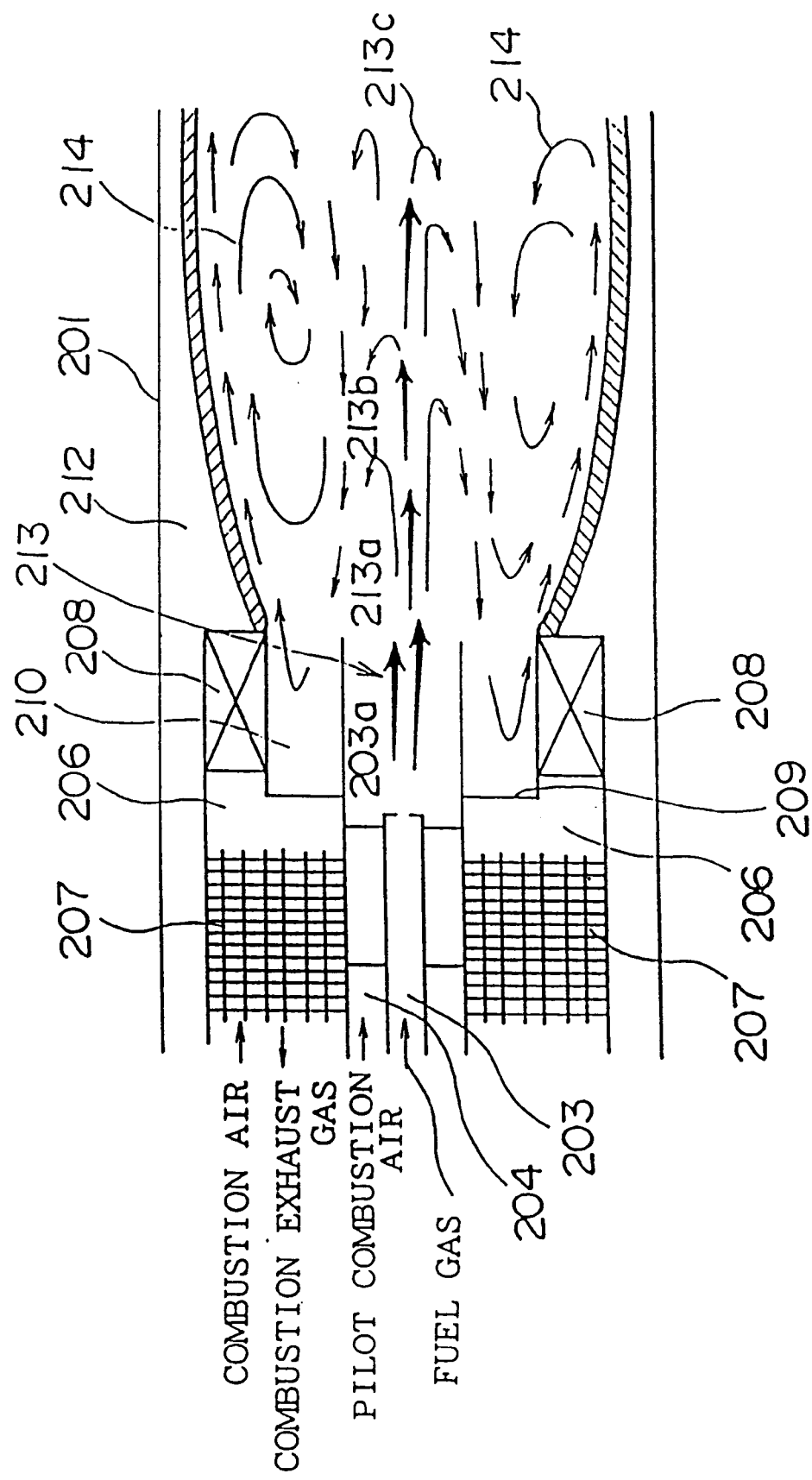

RADIANT TUBE BURNER

FIELD OF THE INVENTION

The present invention relates to a radiant tube burner and a combustion method thereof used in industrial heating furnaces and heat treatment furnaces for heating materials.

DESCRIPTION OF THE PRIOR ART

Recently, attempts have been made to apply regenerative combustion to a radiant tube burner. Regenerative co combustion is carried out in such a manner that air for combustion is preheated with combustion exhaust gas by using a heat storage member and this preheated air is utilized for combustion. In these attempts, alternate combustion is in which burners at respective ends of the radiant burner are allowed to burn alternately and the combustion exhaust gas of one burning burner is discharged through the air throat of the other burner at pause. With the radiant tube burner of regenerative alternate combustion type, the air throat of each burner, connected to the respective heat storage member, serves as the supply passage of air for combustion and as the exhaust passage of combustion exhaust gas at the pause of combustion. Each heat storage member collects heat when a combustion waste gas passes by it and preheats air for combustion to high temperatures near the temperature of combustion waste gas with stored heat when air for combustion passes by it.

However, generally when the regenerative combustion is carried out, the preheated temperature of air for combustion reaches a high temperature, i.e., 800° c. or higher and NOx increases. For this reason, suppressing the generation of NOx is considered by employing so-called two-stage combustion (U.S. Pat. Nos. 4,856,492 and 4,870,947) in which fuel is injected into the flow of air for combustion at two steps or so-called air multi-stage combustion in which air is injected into fuel at two steps to cause a combustion.

With the radiant tube burner, however, any of the above combustion schemes is difficult to execute since a fuel nozzle is generally inserted in a heat-resistant alloy radiant tube of as small caliper as 90–200 mm to form an air throat. To be concrete, with the two-stage fuel combustion scheme, though provision of a secondary fuel nozzle for injecting a secondary fuel is required downstream of the primary combustion, it is extremely difficult to have a secondary fuel nozzle provided outside or inside the primary combustion chamber in a narrow space of the radiant tube. And with the air multi-stage combustion method, to employ a double cylinder structure is indispensable to assure a passage for supplying a secondary air downstream of the primary combustion zone, but the placement thereof is extremely difficult in the radiant tube with a restricted space. Thus, the reduction principle of NOx in each of the above-mentioned combustion methods is difficult to make the best of.

Implementation of the fuel two-stage combustion method or the air multi-stage combustion method requires primary and secondary fuel supply systems or air supply systems and not only the control of them but also the structure of burners becomes complicated.

Furthermore, with a burner system in which alternate combustion is performed, fuel is left in the fuel nozzle of a not burning burner as a result of burner structure. Thus, unless the heat isolating structure of a fuel nozzle is sufficient, a problem of so-called coking is involved that the residual fuel is heated and carbonized due to a high-temperature combustion exhaust gas exhausted through an air throat.

Among various inventions made for preventing the generation of NOx, Japanese Patent Application Laid-Open No. 62-242711, for example, discloses that addition of water in a burner enables the generation of NOx to be reduced. Japanese Patent Application Laid-Open No. 63-116011 discloses that a high-load combustion based on a turning flow of primary air permits a good and stable combustion and a soft two-stage combustion in a radiant tube that enables the generation of NOx to be reduced. Japanese Patent Application Laid-Open No. 3-11202 discloses that provision of a Venturi mechanism and recirculation of exhaust gas under control of flow rate enable the generation of NOx to be reduced.

With a radiant tube burner, however, each of the above-mentioned combustion methods is difficult to implement because a burner gun is inserted into a radiant tube of relatively small diameter. That is, with the fuel two-stage method for allowing a secondary fuel to burn downstream after combustion of a primary fuel, provision of a fuel supply passage outside (or inside) the primary combustion chamber is necessary which extends to the secondary fuel injection port. And with the air multi-stage combustion method leading secondary air to downstream of a primary combustion region is necessary and a double-structured air passage must be provided. For these reasons, implementation of the individual combustion methods mentioned above requires such a large-sized and complex-structured burner that the above combustion methods were hardly applicable to a radiant tube burner.

Implementation of the fuel two-stage combustion method or the air multi-stage combustion method requires not only control of the fuel supply and air supply systems leading to a pilot burner, but control of either the primary and secondary fuel systems and the air system or the primary and secondary air systems and the fuel system and therefore causes a problem that control of these systems becomes complicated as well.

Furthermore, with a burner for alternate combustion, fuel never fails to remain in the fuel passage of a burner on the non-operating side for a structural reason. This is a problem that, when a high-temperature exhaust gas is exhausted via a burner on the non-operating side, a residual fuel in the fuel passage is heated and carbonized, or so-called coking takes place.

The above method of Japanese Patent Application Laid-Open No. 62-242711, can lower the flame temperature because combustion gas is directly cooled. However, since a heat quantity corresponding to the latent heat of evaporation of added water and the sensitive heat taken out by water vapor released as exhaust gas must be additionally supplied as compared with a case of no added water, the thermal efficiency decreases. With the method of Japanese Patent Application Laid-Open No. 63-116011, since re-combustion (secondary combustion) is performed with air being supplied after a low-air-ratio combustion (primary combustion), the flame temperature can be lowered below that of normal combustion, but no effect is attainable unless flow control is made with good accuracy. For implementation, there are defects such as an increase in cost of repair and maintenance to maintain the optimum point. Or, with a method for allowing fuel gas to burn by using air mixed concentrically with exhaust gas in an exhaust-gas-circulating cylindrical radiant tube according to Japanese Patent Application Laid-Open No. 3-11202, a low NOx combustion can proceed by lowering the flame temperature and oxygen concentration in the field of combustion, but there are defects such as an increase in installation cost and repair cost because the mechanism including a burner is complicated and equipped with attachments.

In addition, though the upper limit of preheated-air temperature was about 500° c. according to a conventional recuperator method, the method of Japanese Patent Publication No. 2-23950 wherein the alternate combustion mentioned above made it possible to obtain a preheated-air temperature of more than 900° C. has a problem that, as compared with a conventional method, a considerable rise in the temperature of preheated air elevates the flame temperature and increases the quantity of generated NOx.

Meanwhile, the present authors found that the quantity of generated NOx is inversely proportional to the flow velocity of combustion air (cf. FIG. 1). In applying this result to a conventional radiant tube burner, the temperature of preheated air obtained by the recuperator method applied to a conventional radiant tube burner is on the order of 500° c. and this preheated air has insufficient ignition energy for COG (Coke Oven Gas; ignition temperature on the order of 500–600° c.) and LNG (ignition temperature on the order of 550–650° c.) to be used as fuel for a radiant tube burner. Thus, the quantity of thermal energy radiated to the surroundings exceeded that of thermal energy generated by combustion reaction, so that no stable combustion could proceed, lifting or blown extinguishment of flame took place and no burner using combustion air with high flow velocity was made fit for practical use.

At a preheated-air temperature of about 500° c. obtained by the recuperator, a conventional burner for a low-NOx combustion method, wherein the flow velocity of combustion air is set to about 50–60 times the combustion speed of fuel, can be supplied at an intra-furnace temperature of 900° c. and a coke furnace gas mixed with fuel gas and air in the air ratio of about 1.3 as a fuel gas for combustion. After an incomplete combustion done at the first stage, exhaust gas at the first stage is allowed to undergo perfect combustion at the second stage. FIG. 2 shows the experimental results on the relation between pre-heated air temperature and the NOx content in exhaust gas obtained by the inventors in such a two-stage combustion method, which reveals that a low NOx combustion cannot be sufficiently fulfilled in the two-stage combustion.

Since a preheated air of higher temperature is employed for blow-in of vapor or water than that employed in a conventional method, the blown-in quantity must be increased and there are problems such as an increase in running cost and a rise in equipment cost due to a decrease in thermal efficiency. Even when the exhaust gas circulation method is employed, to fulfill a low NOx combustion with a high-temperature preheated air, as shown in FIG. 3, there are problems such as an increase in power cost for circulating fan due to an increased amount of exhaust gas circulation and a rise in installation cost and repair cost due to a more complicated equipment and moreover an economically effective reduction of the Nox concentration in exhaust gas is hardly implementable on account of a rise in flame temperature due to the high-temperature preheated air.

A basic reason for a high combustion temperature in combustion of a radiant tube burner is that the region highest in combustion temperature with an air ratio of about 0.95–1.00 is localized. Based on many combustion experiments and numerical simulations of combustion, the inventors compared and examined a case of combustion at air ratios of 1.4 and 4.0 in a premix combustion where a premixed gas of fuel and air is allowed to burn and a case of combustion at air ratios of 1.4 and 4.0 in a diffuse combustion where separately supplied fuel and air are allowed to burn. As shown in FIG. 4, it is found from the results that, whereas the maximum combustion temperature in the combustion region varies substantially for a premix combustion, the maximum combustion temperature differs little for a diffuse combustion. That is, a comparative study revealed that, whereas for a diffuse ratio a region with an air ratio of nearly 1 is locally present in the mixture portion of fuel and air even at a large air ratio and a gas burning in this region reaches a high temperature, no region with an air ratio of nearly 1 is observed anywhere for a premix combustion, so that the maximum combustion temperature depends on the air ratio.

Because of a fear of explosion in industrial applications, however, a premix combustion is normally unemployed and consequently reduction of generated NOx must be fulfilled for a diffuse combustion.

It is one object of the present invention to provide a radiant tube burner of simple structure, enabling the generation of NOx to be suppressed, the control of the fuel supply system and air supply system to be simplified and the coking of fuel to be prevented.

Furthermore, a burner of regenerative radiant tube scheme typified by Japanese Utility Model Application Laid-Open No. 2-23950 (hereafter example(1)) has recently been disclosed which attains a high thermal efficiency with exhaust heat recovery implemented by applying the regenerative heat exchange to this radiant tube burner.

A burner of such scheme will be described referring to FIG. 5. A radiant tube burner 320 comprises heat storages 312 provided at ends of a radiant tube 311 and nozzles 313 so arranged as to penetrate heat storages 312 wherein the supply of fuel and the exhaust of exhaust gas are performed via a change-over control valve 314. The sensitive heat of combustion exhaust gas is accumulated in a heat storage 312 when combustion exhaust gas passes through the heat storage 312 and heat accumulated in the heat storage 312 is allowed to transmit to combustion air, which is supplied to the inside of the furnace as a high-temperature preheated air, when combustion air passes through the heat storage 312, thereby attaining a high heat efficiency. By alternate combustion of regenerative burners provided at ends of a radiant tube 311 through repetition of a burning state and not burning state, the thermal efficiency is raised.

In addition, burners provided at both ends are allowed to burn alternately. Thus, though a temperature distribution took place along the longitudinal direction of a radiant tube in a conventional radiant tube burner with a burner allowed to burn at one side end alone, the longitudinal temperature distribution of a radiant tube is improved by alternate combustion of burners provided on both ends, so that there is an advantage that the service life of a radiant tube is prolonged.

Also, in Japanese Utility Model Application Laid-Open No. 6-65705 (hereafter example (2)), a trident type regenerative radiant tube burner is proposed. Description will be made referring to FIG. 6. The radiant tube 311 comprises a combustion tube 315 and a pair of return tubes 316, wherein a burner 318 is provided on the end of the combustion tube 315 and heat storages 312 are provided on the respective ends of both return tubes 316. With this regenerative radiant tube burner 322, combustion air is supplied directly to the burner 318 and at the same time is heated while passing through the heat storages 312 to be supplied to the burner 318, whereas combustion exhaust gas is exhausted to outside the furnace after accumulating its sensitive heat in the heat storages 312. In each heat storage 312, an exhaust passage and a combustion air passage are perpendicularly formed in such a manner that combustion exhaust gas and combustion air cross.

However, with the regenerative radiant tube burner of conventional example (1), the pressure loss in passing of combustion air/combustion exhaust gas through a heat storage exceeds that of a recuperator (metal heat exchanger method). Thus, there is a disadvantage that the pressure-saving capability of a combustion air blower and combustion exhaust gas suction fan must be increased, thereby resulting in a larger size of equipment. In addition, though energy-saving effect is obtained in view of thermal efficiency, there is another disadvantage that the power cost required for the blower equipment used in the combustion plant rises.

On the other hand, with the trident type regenerative radiant tube burner of conventional example (2), since the tube of burning state is always one and the same, it contributes to a rise in heat efficiency of the regenerative radiant tube burner but nevertheless uniformized longitudinal temperature distribution of the radiant tube by alternate change-over combustion (alternate combustion) cannot be sufficiently achieved. Thus, there are disadvantages that an anomalous thermal stress acts on the radiant tube owing to a non-equilibrium temperature distribution. The repeated stress of the radiant tube makes breakage likely and prolonged the service life cannot be fully realized.

For solving these problems, it is another object of the present invention to provide a radiant tube burner in which the power cost of a combustion air blower and a combustion exhaust gas suction fan can be reduced and the longitudinal temperature distribution of a radiant tube can be made more uniform by a decrease in the pressure loss of a regenerative radiant tube.

At the same time, it is a further object of the present invention to provide a radiant tube burner in which fuel gas is allowed to undergo a perfect combustion, thereby enabling thermal efficiency of a radiant tube burner to be improved.

DISCLOSURE OF THE INVENTION

A radiant tube burner according to allows a radiant tube burner allowing a burner to burn by using high-temperature combustion air obtained by alternately passing combustion waste gas and combustion air through a heat storage with a fuel nozzle for injecting fuel and an air throat for injecting the combustion air arranged in parallel in the end of a radiant tube and a tip opening of the air throat is near to the inner circumferential wall surface of said radiant tube as well. Here, in the radiant tube burner according to the present invention, it is preferable to employ a pilot burner joint-use nozzle as the nozzle, it is preferable to bring the injection port of the air throat into internal contact with the inner wall surface of the radiant tube burner and further it is preferable to divert the fuel nozzle from the center to a direction opposed to the combustion air injection port within such limits as not to internally touch the center of the radiant tube or the inner circumferential wall surface.

In addition, with a radiant tube burner according to the present invention, while having a nozzle support at the tip of the air-throat tube inserted into the radiant tube in one piece and a combustion-nozzle through hole for supporting the inserted tip of the fuel nozzle provided on the nozzle support, it is preferable to have a through hole internally touching the inner wall surface of the radiant tube provided on the rim of the nozzle support and to allot the through hole to a combustion air injection port of the air throat. And, in a radiant tube burner according to the present invention, it is preferable to allot a hole formed by the air throat formed between the radiant tube and fuel nozzle along with the circumferential groove of the nozzle support and the inner wall surface of the radiant tube to the tip opening of the air throat, with a nozzle support having a fuel-nozzle through hole for stopping up the radiant tube and for supporting the inserted tip of the fuel nozzle and a groove internally touching the inner wall surface of the radiant tube provided on the radiant tube.

Meanwhile, the heat storage to be used for a radiant tube burner according to the present invention is preferably a honeycomb-shaped ceramics through which a flow passage passes in a constant passage area and linearly.

Furthermore, in the present invention, an alternate-combustion type radiant tube burner is so arranged that burners arranged like these are installed at both ends of the radiant tube and combustion waste gas is exhausted through the air throat of the not burning burner. And it is desirable for this alternate-combustion type radiant tube burner to use a pilot burner joint-use nozzle as the fuel nozzle. It is desirable for this pilot burner joint-use nozzle that while a suitable amount of primary air for pilot combustion is made to always flow independently of the working state of a burner with the primary air passage being provided for allowing primary air to flow around the fuel nozzle, a sufficient amount of fuel for maintaining the pilot flame is always flowed as pilot fuel and at the same time the amount of injection fuel is switched at combustion and at pause of combustion in such a manner that the main combustion and the pilot combustion succeed each other.

Such being the case, with a radiant tube burner of the present invention, combustion air is injected along the tube wall of the radiant tube and the flow thereof is unevenly distributed but not over the whole transverse section. Consequently, a negative pressure is generated on the opposite side to the injection of combustion air, thereby causing a strong recirculation of exhaust gas, and at the same time the exhaust gas and combustion gas injected in parallel with combustion air are induced by and follow the flow of combustion air, so that a slow combustion occurs with a gradual rolling up of both gases in the flow of combustion air.

That is, the combustion air preheated to high temperatures, e.g., about 800° C. or higher, is injected at considerably higher speed than that of a normal-temperature fuel because the volume is expanded as compared with the time of normal temperature. For example, in contrast to fuel injected at velocities of 20–30 m/s, a high-temperature preheated air is injected at an extremely high velocity of 100 m/s or higher. Accordingly, fuel does not spread in the tube but is induced by the high-speed flow of combustion air to flow along the inner wall of the tube and is gradually rolled up into the flow of combustion air with the lapse of time. In addition, part of combustion exhaust gas to counterflow to the neighborhood of the injection port in the radiant tube is directly induced by the flow of combustion air to be rolled up, thereby decrease the oxygen concentration, or sometimes rolled up between fuel injection flow and combustion-air injection flow, thereby preventing these from immediately contacting each other. Thus, they can form a long flame while burning slowly and consequently can heat the tube with a uniform heat flux, thereby permitting a long service life of the radiant tube.

Also, with the present invention, a pilot flame is ceaselessly formed at the root of combustion jet and accordingly a flame is stably formed even if combustion air and fuel are injected in parallel, so that a low NOx content can be achieved by increasing the roll-up amount of combustion exhaust gas.

Also, with the present invention, exhaust gas is rolled up between the flow of combustion air and that of fuel, thereby preventing both of them from contacting each other directly after the injection and decreasing the oxygen concentration of combustion air in the diffusion portion of fuel, so that generation of NOx can be suppressed to a still greater extent.

Also, with the present invention, by inserting the tip of the fuel nozzle into the nozzle support in the radiant tube, the position of this fuel nozzle is determined in the radiant tube and at the same time the air throat completely isolated from the fuel nozzle. And, since a through hole or groove on the rim of the nozzle support and the radiant tube form the tip opening of the air throat by portioning, the tip opening of the air throat internally touching this radiant tube is formed only by fixing the nozzle support in the radiant tube. And, the fuel nozzle support functions as the baffle. For these reasons, manufacturing the radiant tube burner is facilitated.

Also, with the present invention, since a honeycomb-shaped ceramics is used as the heat storage, the stagnant flow of combustion air or exhaust gas can be eliminated and moreover since two opposite-directioned flows of exhaust and charging occur alternately, a self-cleaning operation (backwash) works, so that deposition of dust in the heat storage is prevented.

Furthermore, with the present invention, wherein the above burners are provided at both ends of the radiant tube in such a manner as to burn alternately, upgrading the thermal efficiency can be achieved. Combustion exhaust gas having passed through the radiant tube is exhausted through the air throat of a burner during the pause of combustion and led to the heat storage.

With the radiant tube burner of the present invention, since the not burning fuel nozzle of the radiant tube burner forms a pilot flame, the fuel nozzle itself is cooled with primary air and fuel and can be prevented from being heated with high-temperature combustion exhaust gas, so that occurrence of coking can be checked. Besides this convenience, it is only necessary for actuating a burner during the pause to switch the flow of combustion air over to flow toward the burner throat on one side and increase the amount of fuel to flow into the fuel nozzle on the other hand.

Furthermore, a radiant tube burner according to the present invention is characterized in that the combustion air injection port or/and the fuel injection port is/are placed off-center in such a manner that they are kept apart from each other in the inside diameter direction.

Another feature is that the transverse-direction shape of the combustion air injection port is circular.

Still another feature is that the maximum temperature point of a flame generated by the combustion reaction takes place in the furnace at a position above the furnace wall thickness distant from the furnace wall on which the radiant tube is supported.

Yet another feature is that the temperature of air injected from the combustion air injection port is 100° C. or higher than the ignition temperature of the fuel.

Yet another feature is that combustion air is injected at as high a speed as not less than 110 times the combustion speed of fuel.

Yet another feature is that the discharge opening of the combustion air injection port or the fuel injection port are deviated from the center and the flow velocity of combustion air for allowing a mixture gas comprising carbon monoxide and a hydrocarbon compound portion to burn is set to 110 m/sec or higher.

With the radiant tube burner of the present invention, a vortex flow due to an eccentric flow of air injected from the combustion air injection port or/and due to an eccentric flow of fuel injected from the fuel injection port is generated, so that a circulation of exhaust gas is caused in the radiant tube. As a result, exhaust gas flows back to envelop combustion air or/and to be mixed into combustion air, thereby diluting it, so that combustion in the radiant tube proceeds slowly, the combustion reaction time is delayed, a local high-temperature portion is decreased and the present time of the high-temperature portion is shortened, thereby enabling the generation of NOx to be reduced. In propotion to a distance due to eccentricity of the combustion air injection port and the fuel injection port, the degree of decrease in NOx concentration in exhaust gas increases. And since it is sufficient to place a burner gun and a combustion air passage in the radiant tube burner, a fire burner and an appropriate radiant tube burner can be formed.

Also, with the present invention, since the combustion air injection port is circular, the outer peripheral length of injected combustion air becomes minimum as compared with the other shapes and accordingly the combustion reaction surface becomes small, the combustion reaction distance extends and combustion occurs over a wide area, so that the combustion reaction can proceed moderately and the local high-temperature region in flame widened and reduced in temperature, thereby enabling the generation of NOx to be decreased.

Also, with the present invention, since the maximum temperature point of a flame generated by the combustion reaction is so arranged as to take place at an in-furnace position above the furnace wall thickness distant from the burner side, the thermal energy generated by the combustion reaction is released into the furnace, so that an excessive rise in flame temperature can be prevented, thereby enabling generation of NOx to be decreased and the service life of the whole radiant tube burner to be prolonged.

Also, with the present invention, since the temperature after the mixing can be maintained above the ignition temperature of fuel even if a decrease in temperature takes place, occurrence of an accidental fire due to a burst of flame or a blown leap of flame can be prevented. That is, the temperature of the preheated combustion air decreases directly before the combustion on account of the mixing in of fuel gas and heat diffusion to the periphery, but use of high-temperature preheated air (more than 100° C. higher than the ignition temperature) made it possible to burn stably in an air of high speed not less than 110 times the combustion speed. The ignition temperature of COG used as fuel for a radiant burner is on the order of 500–600° C. and that of LNG is on the order of 550–650° C. By using a preheated air of at least 100° C. higher temperature than these temperatures, the high temperature preheated air can be provided with two requisites (oxygen and ignition source) out of the three requisites for combustion (combustibles, oxygen and ignition source), so that occurrence of an accidental fire due to a burst of flame or a blown leap of flame can be prevented and a forced mixing of air and fuel gas in the burner becomes unnecessary as well. Thus, a moderate combustion reaction can proceed over a wide area in the radiant tube and the local high-temperature region can be widened and reduced in temperature, thereby enabling the generation of NOx to be decreased.

Also, with the present invention, the flow velocity of combustion air is set to at least 110 times the combustion speed of the fuel to be used to increase the degree of the combustion gas diluted with self-circulated exhaust gas. As a result, the locally occurring high-temperature portion with an air ratio of 1.0 can be reduced greatly. By assuring the gas flow velocity and shortening the lasting time of the high-temperature so that combustion reaction in that portion does not proceed at high speed, the flame temperature can be lowered. With rising preheated air temperature, the NOx concentration in the exhaust gas increases (cf. FIG. 2), but this increasing NOx concentration in the exhaust gas can be decreased by raising the flow velocity of combustion air (cf. FIG. 1). This means that decreasing the generation of NOx is achieved by making the combustion time in the radiant tube shorter than the time taken till the combustion reaction is completely terminated and leading the combustion in the radiant tube to a non-equilibrium state. The quantity of NOx in exhaust gas is decreased by maintaining the reaction in the non-equilibrium state in such a manner that the generation of NOx determined from the length of the radiant tube and the flow rate of exhaust gas are shortened in time.

Meanwhile, with the air flow velocity of at least 110 times the combustion speed, the amount of thermal energy released to the surroundings surpasses the amount of thermal energy generated in the combustion reaction and the lifting or blow out of a flame take place, but use of a preheated air of at least 100° C. or higher temperature than the ignition temperature prevents this and a stable combustion state is obtained.

Also when the flow velocity of fuel gas is raised, a decrease in the NOx concentration of exhaust gas is observed but the decreasing effect of NOx is smaller than that due to an increase in the flow velocity of combustion air. This can be conjectured to be attributed to the difference in the momentum of injection gas represented by (density) (flow velocity)$^2$, derived from the density difference between fuel gas and air.

Incidentally, the combustion speed of COG and LNG (town gas 13A) as fuel is calculated in accordance with the following formula:

Letting SM be the combustion speed of fuel gas, $$SM = \frac{\sum ([S_b])_i \cdot M_i \cdot A_i \cdot X_i}{\sum M_i \cdot A_i \cdot X_i} [1 - f \cdot (N_2 + N_2^2 + 2.5CO_2)] \quad (1)$$

$$N_2 = \frac{[N_2] - 3.76[O_2]}{100 - 4.76[O_2]} \quad (2)$$

$$CO_2 = \frac{[CO_2]}{100 - 4.76[O_2]} \quad (3)$$

$$f = \frac{\sum X_i}{\sum (X_i / f_i)} \quad (4)$$

where $[S_b]_i$: Maximum combustion speed of a simple gas;

$M_i$: Optimal combustion reaction air coefficient of a simple gas;

$A_i$: Theoretical air amount of a simple gas;

$X_i$: Vol % of a simple combustible gas;

$f_i$: Combustion speed attenuation coefficient of a simple combustible gas due to an inert gas;

$[N_2]$: Vol % of $N_2$ in the mixed fuel gas;

$[O_2]$: Vol % of $O_2$ in the mixed fuel gas; and $[CO_2]$: Vol % of $CO_2$ in the mixed fuel gas.

The constants of ombustible simple gases required for the calculation of SM shown in the above formula (1) are shown in Table 1, whereas the combustion speeds computed of COG and LNG are shown in Table 2.

As described above, the relation between the NOx concentration in exhaust gas and the flow velocity of combustion air depends on species of fuels, but if the ratio of the combustion velocity of the fuel to the combustion air flow velocity is arranged in conjunction with the NOx concentration in exhaust gas, an approximate correlation can be found out, thereby enabling low NOx combustion burners to be designed corresponding to various fuels.

TABLE 1

Constants of Individual Combustible Simple Gases Required for the Calculation of SM

|  | $H_2$ | CO | $CH_4$ | $C_2H_4$ | $C_2H_6$ | $C_3H_6$ | $C_3H_8$ | $C_4H_{10}$ |
|---|---|---|---|---|---|---|---|---|
| $[Sb]_i$ | 280 | 100 | 38 | 67 | 43 | 50 | 42 | 38 |
| $M_i$ | 0.5 | 0.4 | 1.1 | 0.85 | 1.15 | 1.1 | 1.15 | 1.15 |
| $A_i$ | 2.38 | 2.38 | 9.52 | 14.28 | 16.66 | 21.42 | 23.8 | 30.94 |
| $f_i$ | 0.75 | (1.0) | 0.5 | 0.25 | 0.22 | 0.22 | 0.22 | 0.18 |

TABLE 2

| Fuel | Combustion Speed |
|---|---|
| COG | 78.0 cm/s |
| Town Gas 13A | 38.5 cm/s |

With the present invention, the discharge opening of a combustion air injection port or/and a fuel injection port is/are placed off-center, the flow velocity of combustion air is set to 100 m/sec or higher and a great quantity of exhaust gas is allowed to undergo a self-circulation in a radiant tube. On diluting fuel gas with this self-circulating exhaust gas, the flame temperature falls. By allowing a mixture gas of hydrogen, carbon monoxide and hydrogen compounds to burn under such conditions, the generation of NOx decreases and can be reduced to a desired value (cf. FIG. 7).

In addition, by greatly decreasing the locally generating portion with an air ratio of nearly 1.0 and assuring the flow velocity of combustion air so that combustion reaction in that portion does not proceed at high speed, the lasting time of the high-temperature portion is shortened.

TABLE 3

|  | Maximum Amount of combustion temperature | Generated NOx |
|---|---|---|
| Conventional example | 1,800° C. | 700 ppm |
| Present example |  |  |
| 100 m/s supply of air | 1,700° C. | 200 ppm |
| 200 m/s supply of air | 1,620° C. | 100 ppm |

Furthermore, the present invention is a radiant tube burner with the respective regenerative burners provided at both ends thereof each comprising fuel passages provided at the radial center of the respective burners, combustion air passages having a greater inside diameter than that of the fuel passages provided outside them, heat storages provided halfway in the combustion air passages, and turning means subsequent to the heat storages for injecting combustion air preheated therewith while turning it.

Also, the present invention is a radiant tube burner characterized in that circulating current inflow sections for allowing the circulating flow of combustion exhaust gas to inflow are provided between the fuel passages and the turning means.

In these inventions, after preheating while passing through a heat storage at one end of a radiant tube, combustion air is injected from a combustion air passage into a radiant tube while turning force is given with turning means and advances along the inner wall of a radiant tube by a centrifugal force.

On the other hand, combustion gas (described in the case of gas fuel) is injected linearly and at high velocity toward the tube core of a radiant tube through the fuel passage of a combustion burner center. Since the inside diameter of the turning current of combustion air becomes larger than the outside diameter of the flow of fuel gas, the portion of relatively negative pressure takes place along the longitudinal direction of a radiant tube between both of them and a circulating current of combustion exhaust gas is formed in opposition to the injection direction. The fuel gas of the outermost portion in the flow of injected fuel gas, as if riding on and drawn back by this circulating current of combustion exhaust gas, is rolled up into the turning current of combustion air and mixed with combustion air to burn.

Since the circulating current of fuel exhaust gas advances to the front while circulating, the fuel gas positioned inside the first rolled fuel gas in the fuel gas flow rides on this circulating flow in the front of the position where the fuel gas first rode on the circulating current of combustion exhaust gas is then rolled up into the combustion air and mixed with combustion gas to burn.

In this manner, fuel gas does not burn at one time, but begins to burn in sequence from the nearest portion to the turning current of combustion air in the flow of fuel gas and accordingly combustion proceeds slowly and the combustion temperature does not become high, thereby preventing the generation of nitrogen oxides (NOx).

Furthermore, when a circulating current inflow section for circulating flow of combustion exhaust gas is provided, fuel rides on this circulating current of combustion exhaust gas and flows into the circulating current inflow section to lower the temperature of combustion air by heat exchange with combustion air and fuel is mixed with combustion air to burns from the stating point of the turning current of combustion air, so that the above slow combustion is further enhanced, thereby preventing the generation of nitrogen oxides (NOx) more effectively.

Furthermore, the present invention is a radiant tube burner characterized in comprising at least three burners, wherein exothermic reaction (combustion) is allowed to proceed dispersedly while switched and consequently the temperature distribution can be made uniform in the longitudinal direction of the radiant tube.

Also, the present invention is a radiant tube burner comprising a trunk tube and at least three branch tubes linked to the trunk tube, characterized in that a burner is provided at the end of each branch tube, which provision enables the temperature distribution to be made uniform in the longitudinal direction of a branch tube in the radiant tube and the service life of the radiant tube to be prolonged.

Also, the present invention is a radiant burner characterized in that the inner sectional area of the trunk tube is larger than that of the branch tube, which difference lowers the flow velocity of combustion exhaust gas in the trunk tube, decreases a pressure loss generated by the flow of combustion gas in the trunk tube (pressure loss due to the friction of flow) and equalizes the combustion exhaust gas pressure between each branch tube and the trunk tube for discharging combustion exhaust gas, so that balance between inflow amount and discharge amount of combustion exhaust gas can be made uniform and a pressure loss of the radiant tube can be decreased.

In addition, the present invention is a radiant tube burner characterized in that a burner is provided with a heat storage, which provision enables the longitudinal temperature distribution in branch tubes of a radiant tube to be made uniform and the thermal efficiency to be further enhanced.

And, the present invention is a radiant tube burner characterized in the alternate combustion by repetition of combustion and non-combustion at a certain period, which mechanism enables the collection of sensible heat of combustion exhaust gas and the release of collected sensible heat to combustion air in the heat storage, so that a heat storage type heat exchange becomes possible to provide the combustion equipment with a high thermal efficiency. Furthermore, alternate combustion of burners placed at individual branch tubes makes it possible to repeat combustion and exhaust at similar time divisions in such a manner that the flame is not always present in a certain tube and no difference in surface temperature occurs between the branch tubes, and consequently the temperature distribution of a radiant tube can be made uniform and the thermal efficiency can be further raised.

And, the present invention is a radiant tube burner characterized in that the burners burn alternately and are provided with a controller for controlling the alternate combustion to proceed in an arrangement with a smaller number of burning burners than of not burning burners, wherein fuel undergoes perfect combustion, the longitudinal temperature distribution of branch tubes of a radiant tube can be made uniform and the thermal efficiency can be further raised.

To be more illustrative, in the radiant tube burner, heat storages are placed at both ends of the radiant tube, and combustion air and combustion exhaust air are alternately exhausted. At that time, since combustion exhaust gas is supplied into each heat storage in counterbalance with the flow rate of combustion air passing through the heat storage, the flow velocity of gas passing through the heat storage per unit time is greater for passing of combustion exhaust gas than for passing of combustion air. This is because the thermal expansion of exhaust gas is larger due to a higher average gas temperature in the heat storage for exhaust gas than for air and the amount of combustion exhaust gas generated is larger than the that of combustion air per unit fuel for as perfect a combustion as seen in a radiant tube. That is, this means that a pressure loss in the heat storage is larger in passing combustion exhaust gas than in passing combustion air. Whereas it was for passing of exhaust gas that the passing loss of the heat storage is large with a conventional scheme, with a scheme according to the present invention, since alternate combustion is allowed to proceed in an arrangement of a smaller number of burning burners than of not burning burners, passing loss through the heat storage is determined based on when combustion air passes through the heat storage and becomes smaller than that of a conventional scheme, so that the total pressure loss of a burner for air supply and gas exhaust decreases through the heat storage and the motive power of a blower can be saved.

And, the present invention is a radiant tube burner characterized in that the number of burners switched between combustion and non-combustion is set to be below a half of the total number of burners provided on the radiant tube, which setting decreases passing loss through the heat storage, so that the longitudinal temperature distribution of branch tubes of a radiant tube can be made uniform and the thermal efficiency can be further raised.

And, the present invention is a radiant tube burner characterized in that the supply of combustion air pauses with the delay of a predetermined time after the stop of fuel supply in alternate combustion of regenerative burners, which delay enables the longitudinal temperature distribution of branch tubes of a radiant tube to be made uniform without generation of noxious materials such as CO, so that the thermal efficiency can be further raised.

To be more illustrative, at the combustion termination of alternately burning burners, carbon monoxide (CO) is generated due to an imperfect combustion in shortage of air when supply of fuel and air is stopped simultaneously, whereas, by stopping of combustion air with a delay of 0.5 sec or longer after the supply stop of fuel, the fuel remaining in the piping extending from the fuel electromagnetic valve to the burner nozzle is injected and is allowed to perfectly burn by flowing of combustion air to prevent CO from being generated, so that a stable combustion can be continued.

Furthermore, the present invention is characterized in that a combustion air injection port and/or a fuel injection port is so arranged off-center as to be apart from each other in the inner radius direction of the radiant tube and fuel gas supplied into a radiant tube is allowed to burn in a non-equilibrium state.

And, the present invention is characterized in that a combustion air injection port and/or a fuel injection port is so arranged off-center as to be apart from each other in the inner radius direction of the radiant tube, and fuel gas supplied into a radiant tube is allowed to burn in a non-equilibrium state and thereafter to burn in a heat storage chamber provided at the outlet of the radiant tube, thus attaining an equilibrium state.

And, the present invention is characterized in that a combustion air injection port and/or a fuel injection port is so arranged off-center as to be apart from each other in the inner radius direction of the radiant tube, and the average stay time of combustion gas in the radiant tube is set to below 1 sec in a non-equilibrium state.

And, the present invention is characterized in that a non-equilibrium combustion is allowed to proceed in a straight radiant tube.

With the present invention, a moderate progress of combustion reaction greatly decreases the locally generated portion with an air ratio of 1.0 and prevents a local high-temperature state from developing, so that the temperature of combustion gas is lowered and the generation of nitrogen oxide is reduced.

Also, with the present invention, a moderate progress of combustion reaction greatly decreases the locally generated portion with an air ratio of 1.0 and prevents a local high-temperature state from developing, so that the temperature of combustion gas is lowered, the generation of nitrogen oxide is reduced and exhaust heat recovery can be accomplished from exhaust gas.

Also, with the present invention, a moderate progress of combustion reaction greatly decreases the locally generated portion with an air ratio of 1.0 and prevents a local high-temperature state from developing, so that the temperature of combustion gas is lowered and the generation of nitrogen oxide can be limited below a reference value.

Also, with the present invention, a moderate progress of combustion reaction greatly decreases the locally generated portion with an air ratio of 1.0 and prevents a local high-temperature state from developing, so that the temperature of combustion gas is lowered and it can be very easily attained in a stable state to limit the generation of nitrogen oxide below a reference value.

BRIEF DESCRIPTION OF THE DRAWINGS

FIG. 24 is a partially sectional view of a radiant tube burner according to the present invention;

FIG. 28A is a structural schema, FIG. 28B is a sectional view taken along I—I of FIG. 28A and FIG. 28C is a sectional view taken along II—II of FIG. 28A;

FIG. 29 is an explanatory drawing of combustion mechanism in which fuel is allowed to burn by using the radiant tube burner of FIG. 28A;

PREFERRED EMBODIMENTS

Figure 1:
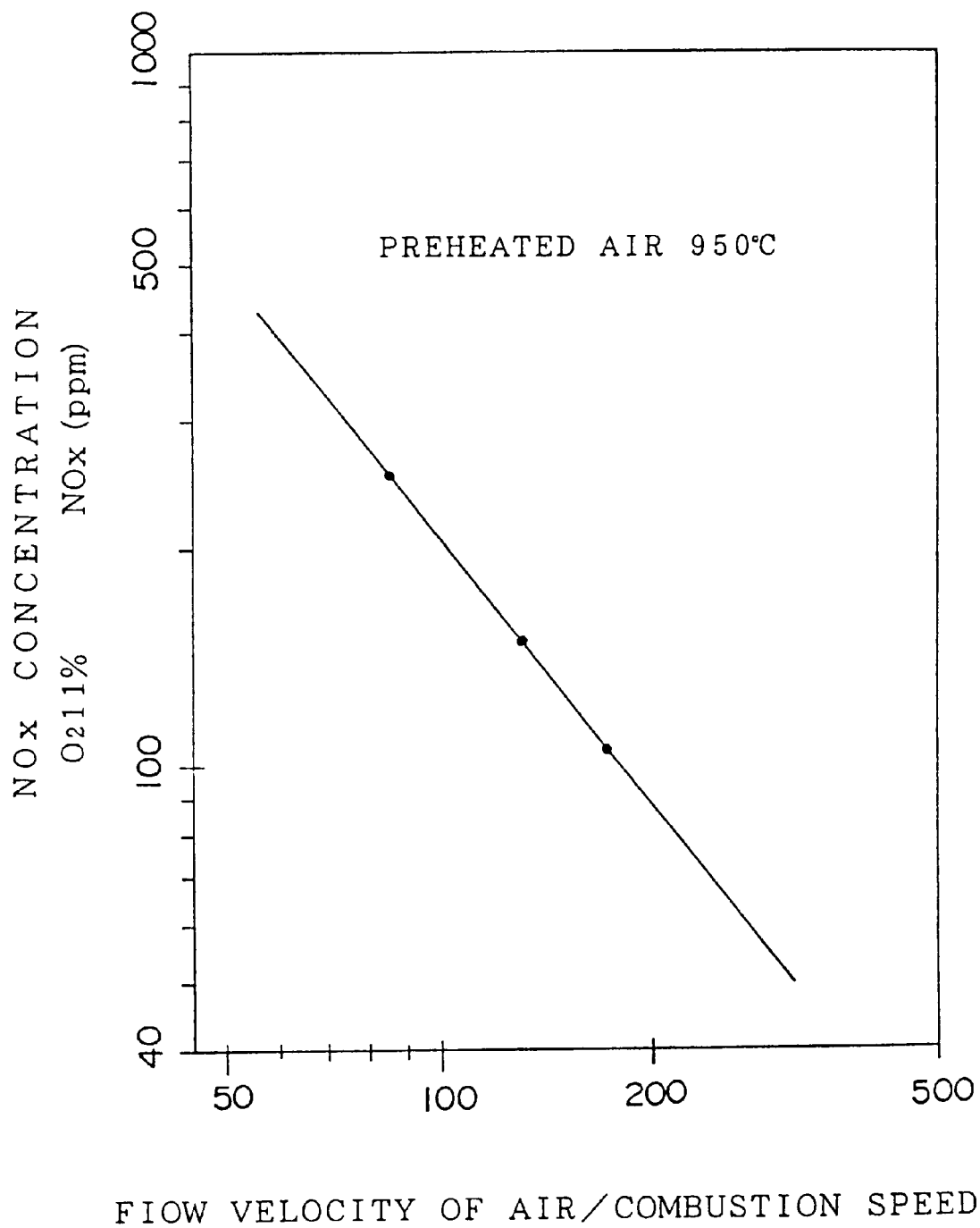
FIG. 1 is a graph showing the relation between the ratio of the flow velocity of combustion air to the combustion speed of fuel and the NOx content in exhaust gas.
Figure 2:
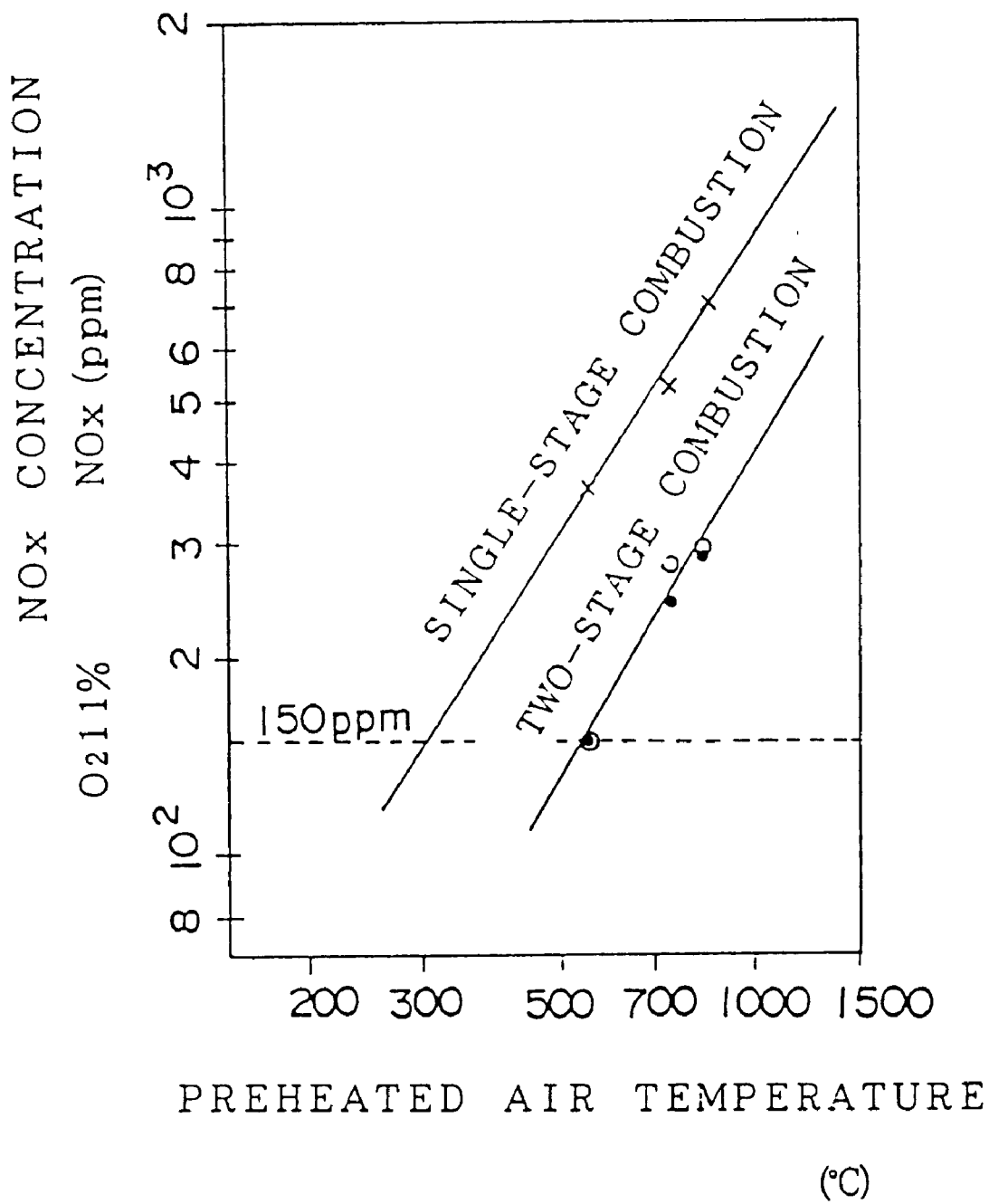
FIG. 2 is a graph showing the relation between the temperature of preheated air temperature and the NOx concentration in exhaust gas in accordance with single-stage combustion and two-stage combustion.
Figure 3:
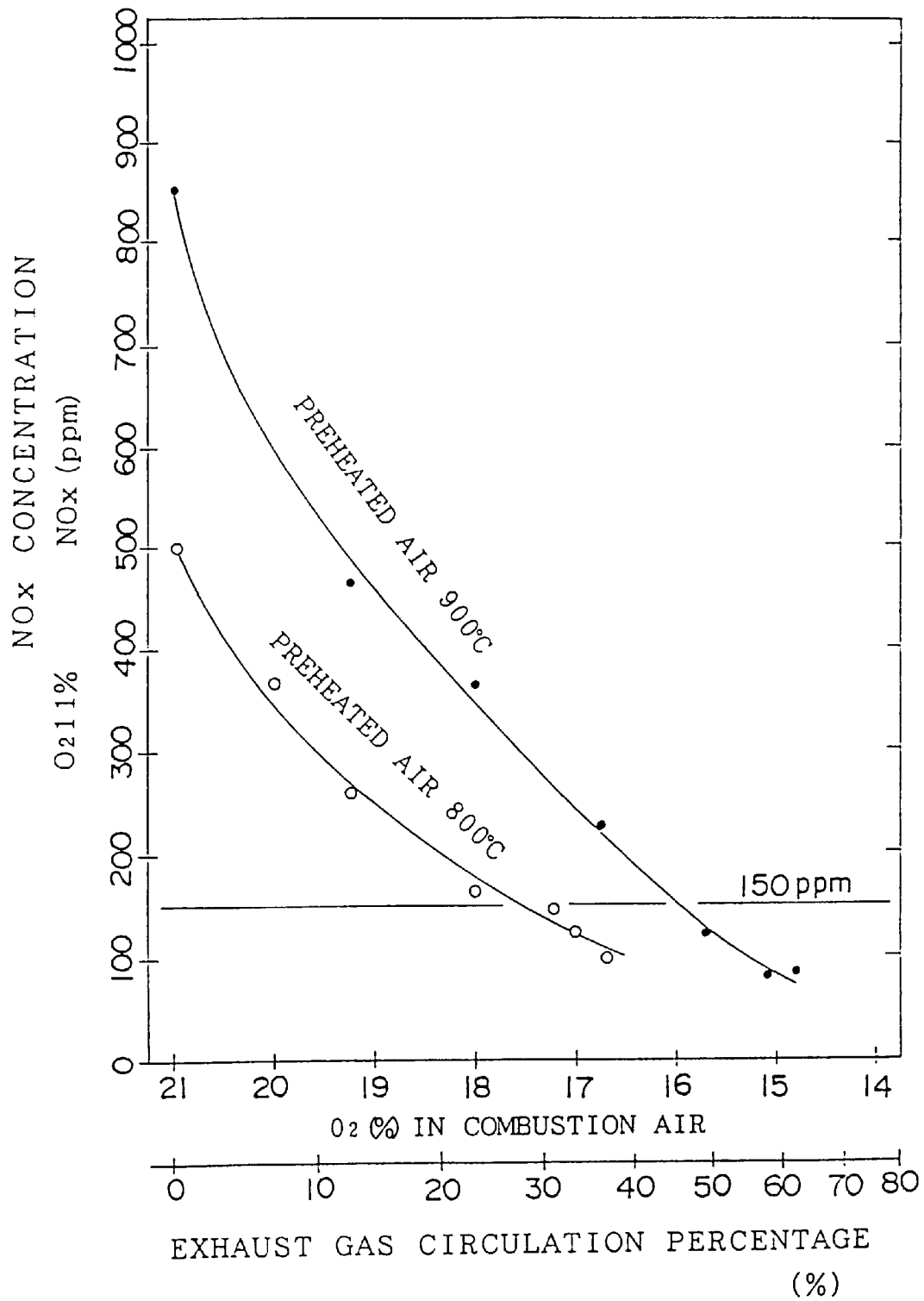
FIG. 3 is a graph showing the relation between the circulation ratio and the NOx concentration in exhaust gas.
Figure 4:
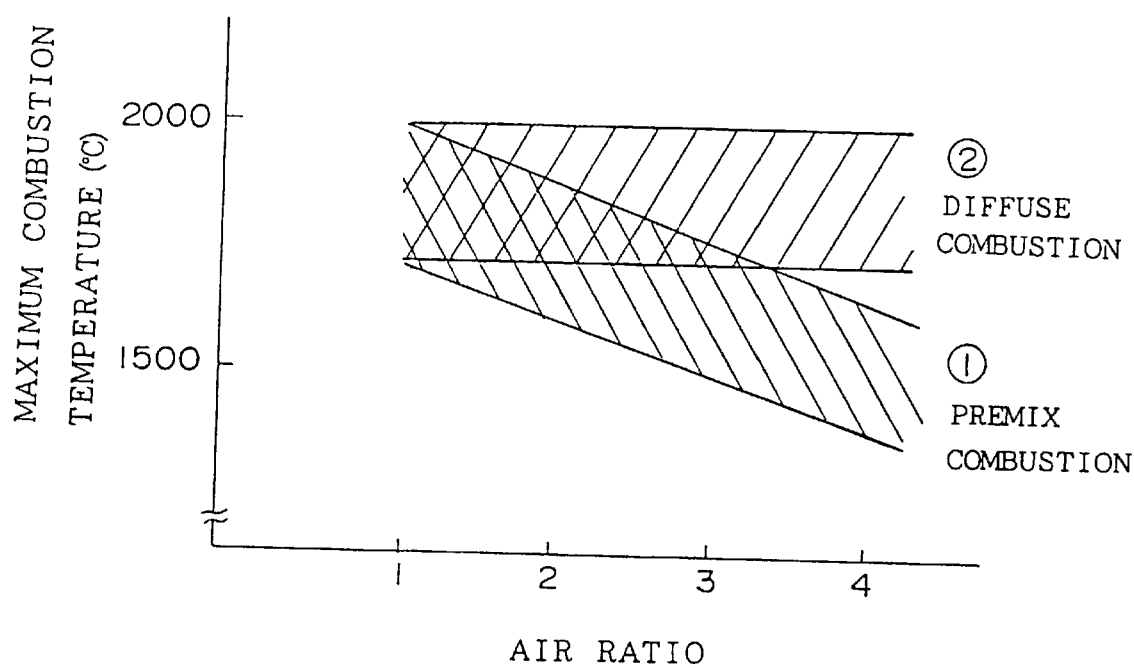
FIG. 4 is a graph showing the relation between the air ratio and the maximum combustion temperature in a diffuse combustion and in a premix combustion.
Figure 5:
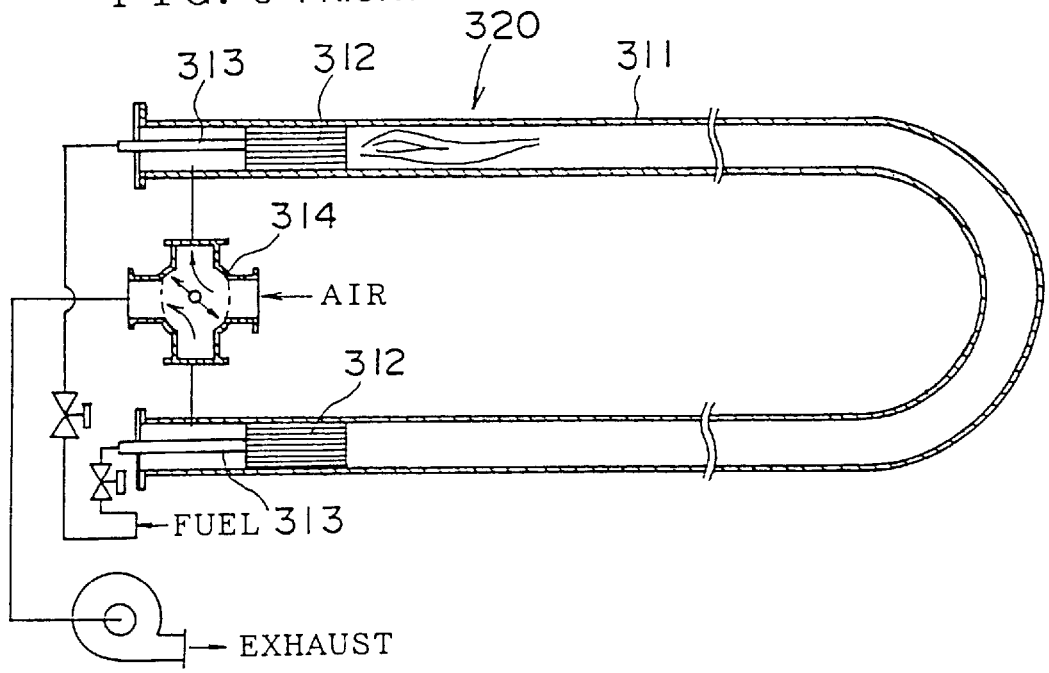
FIG. 5 is a schema showing one example of a conventional radiant tube burner.
Figure 6:
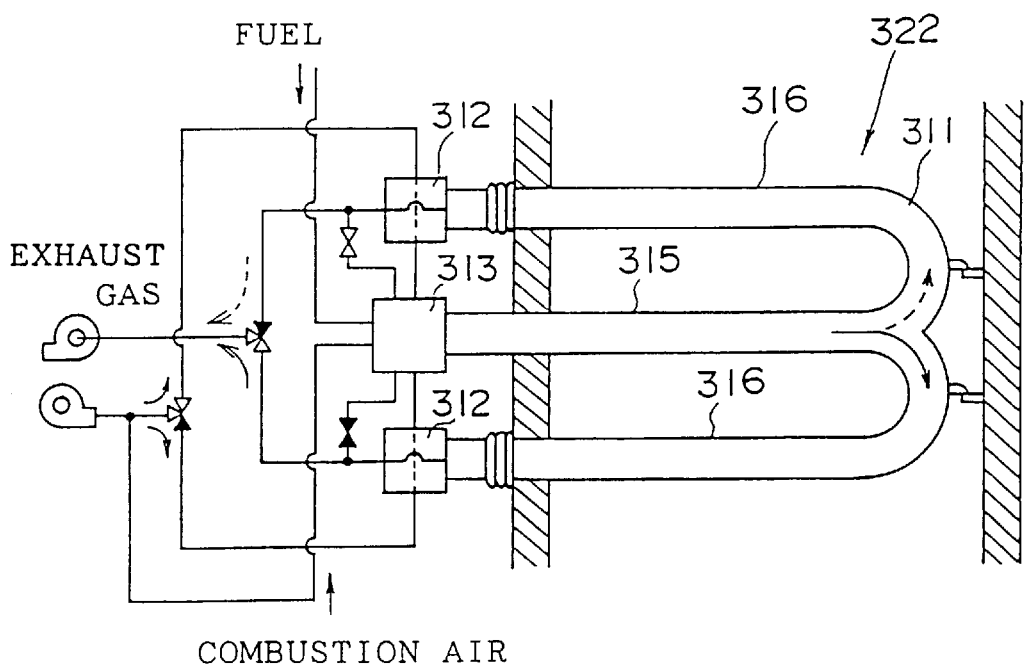
FIG. 6 is a schema showing another example of a conventional radiant tube burner.
Figure 7:
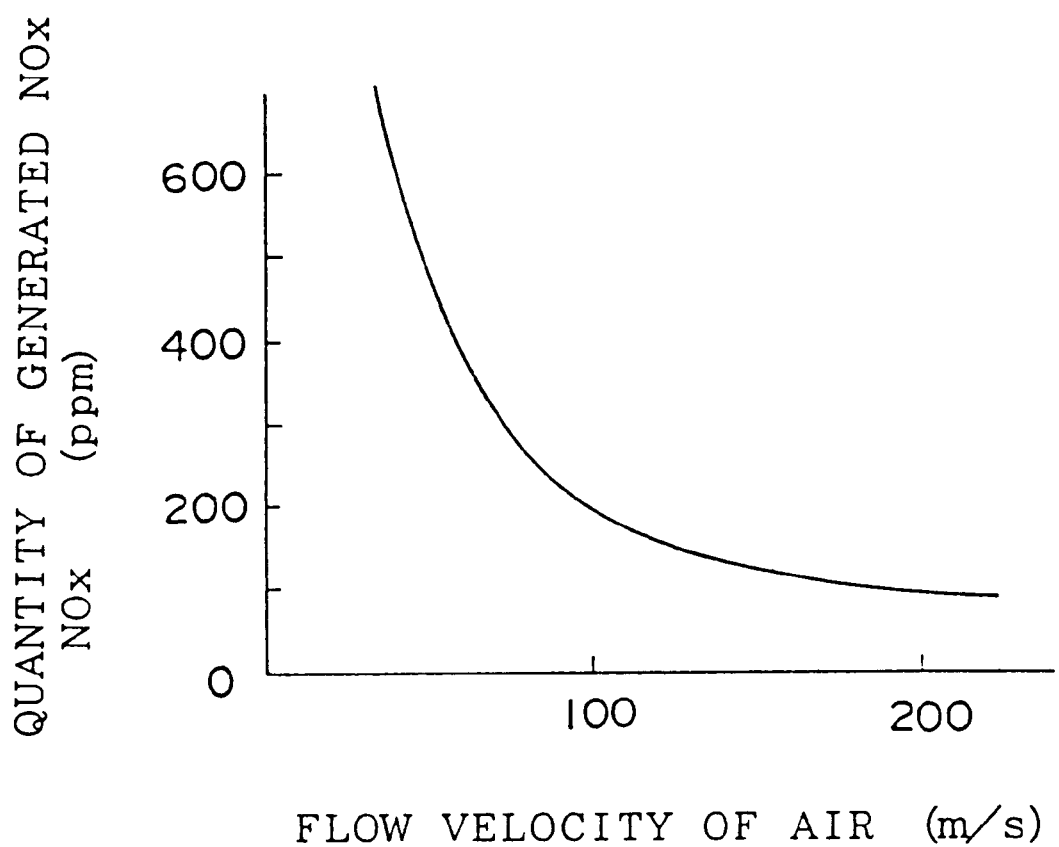
FIG. 7 is a graph showing the relation between the ratio of the flow velocity of combustion air to the combustion speed of fuel and the NOx content in exhaust gas.
Figure 8:
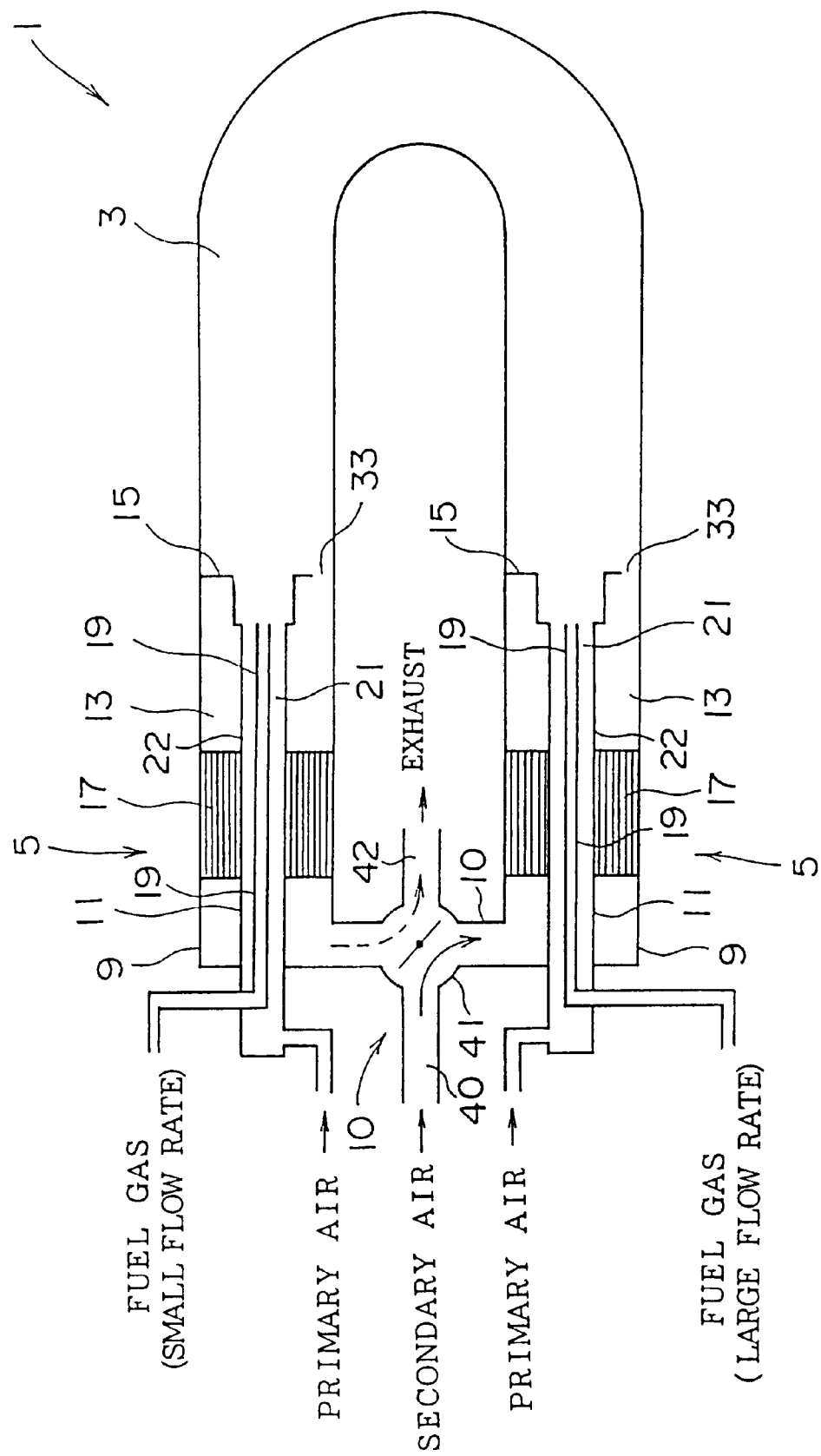
FIG. 8 is a schema showing one embodiment of radiant tube burner according to the present invention.

FIG. 8 shows one embodiment of an alternate combustion type radiant tube burner according to the present invention. This alternate combustion type radiant tube burner 1 comprises a radiant tube 3, a pair of burners 5 at both ends of this radiant tube, a combustion air supply system and fuel supply system for selectively supplying combustion air or a greater part except a pilot combustion part of fuel for alternate combustion, and an exhaust system.

A radiant tube 3 of U-shape is illustrated in this embodiment. As shown for one end in FIG. 9, both ends of this radiant tube 3 penetrate a furnace wall 7 and are positioned outside a furnace. A flange 3a is provided at each end of the radiant tube 5, and the tube 3 is fixed on the furnace wall 7 through a spacer 7b of heat insulating material placed between the flange 3a and the furnace wall 7. Although a detailed fixing condition of the radiant tube 3 to the furnace wall 7 is not shown a heat insulating material is fitted in a rather large hole bored in the furnace wall 7 and tightly sealed with a sealing member of heat insulating material.

Each of burners 5 is of a type having a heat storage 17 built-in, and comprises a burner body 9, fuel nozzle used both for a pilot and a burner (hereinafter referred to as a pilot-burner nozzle 11), an air throat (combustion air passage) 13, a nozzle support 15 and so on. The nozzle support 15 functions as a baffle to form a stable flame. The respective burners 5 placed at both ends of the radiant tube 3 have the same construction. Accordingly, construction of one radiant tube burner 5 will be described.

In this embodiment, the burner body 9 is formed in a L-shaped cylinder and attached to the radiant tube 3 by using the flange 9c of its upper part. On the upper part of this burner body 9, a hole 9a is bored for inserting a fuel nozzle, e.g., the pilot-burner nozzle 11, and the nozzle 11 is set therein to penetrate the hole. The space in this burner body 9 forms an air throat 13 and a plurality of heat storages 17 are housed midway in this air throat 13. The heat storages 17 are disposed in a row in a lower part bent downward. Thereby dust or the like included in exhaust gas is prevented from staying in the heat storages 17 because the direction of exhaust becomes the same as the direction of gravity. For each heat storage 17, a honeycomb-shaped ceramics, e.g., cordierite or mullite, having a constant passage cross section and a linearly penetrating flow passage is preferably used. This honeycomb-shaped ceramics has a relatively low pressure loss in proportion to a large heat capacity and high durability. And exhaust and supply are alternately performed without stagnation as well. Consequently, dust or the like in exhaust gas is unlikely to stick to the interior of the honeycomb-shaped flow passage in heat storages 17. Even if the dust has stuck to the interior, it is washed out to prevent the interior from being stained. Furthermore, even when the temperature of exhaust gas is lowered below the dew point temperature during recovery of heat from exhaust gas, sulfur content and chemical reaction substances in the exhaust gas are trapped on the surface of ceramics so as not to corrode a downstream duct in the exhaust system at low temperature.

Incidentally, the burner body 9 of each burner is connected through a duct 10 to four-way flow-passage switch means 41 such as a rotary four-way valve. At the lower end of the burner body 9, a flange 9b is formed and fixed on the duct 10 with screws or the like.

Figure 11:
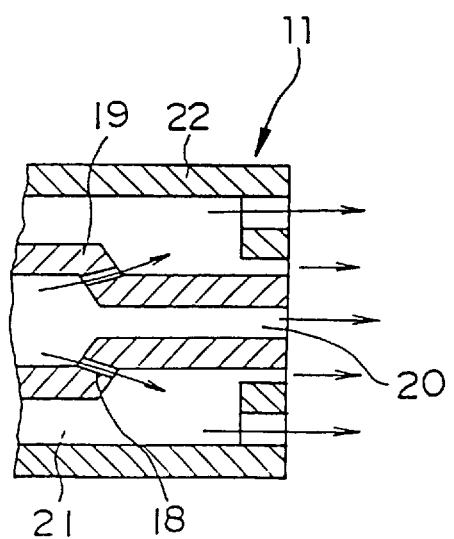
FIG. 11 is a sectional view showing one example of a pilot burner joint-use nozzle.

As a fuel nozzle, the pilot-burner nozzle 11 is adopted. As shown in FIG. 11, this pilot-burner nozzle 11 comprises a fuel nozzle 19, a primary air piping 22 constituting a primary air throat (pilot combustion air passage) 21, and an ignition plug not shown in the figure, and so forth. The fuel nozzle 19 and the primary air piping 22 are arranged concentrically. Thus, the structure of the nozzle is simple and can be formed with a relatively small outside diameter. According to this pilot-burner nozzle 11, primary air equal to about 10% of combustion air as secondary air flowing through the air throat 13 is allowed to flow into the primary air throat 21 around the fuel nozzle (fuel passage) 19. In addition to a main injection port 20, injection ports 18 for injecting a part of fuel toward the surrounding primary air throats 21 are opened at the tip of the fuel nozzle 19, allowing a part of fuel to be injected into the primary air throat 21 as pilot fuel and mixed well with primary air so that a premixed gas can be obtained. An igniter (not shown) is provided there so that a flame keeping source can be formed around the injection port 20 of the fuel nozzle 19.

Here, independently of an operating state of a burner, an appropriate amount of primary air for pilot combustion is allowed to flow in the primary throat 21 continuously. In the fuel nozzle 19, a sufficient amount of fuel for maintaining a pilot flame is allowed to flow continuously as pilot fuel and moreover main combustion and pilot combustion are arranged to take place alternately by switching the injected amount of fuel corresponding to combustion and pause.

Figure 12:
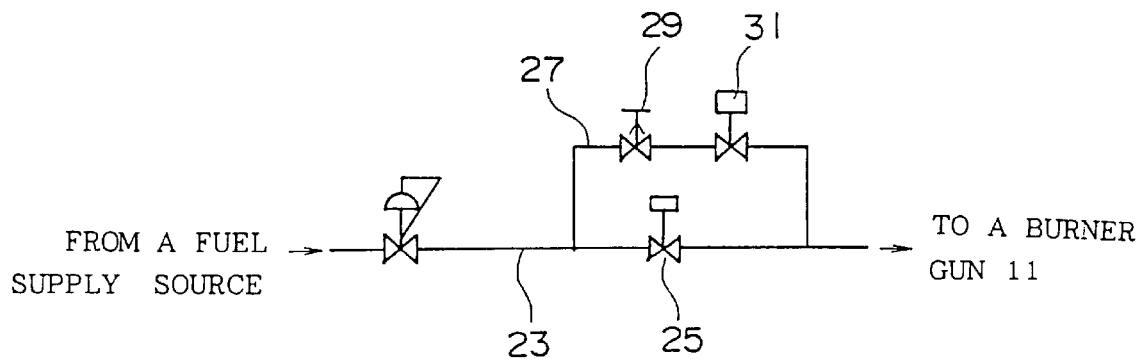
FIG. 12 is a block diagram showing one example of a fuel supply system of the radiant tube burner of FIG. 9.

To the fuel nozzle 19 of the this pilot burner joint-use nozzle 11, a fuel source not shown in the figure is connected, for example, through such a fuel supply passage 23 as shown in FIG. 12. This fuel supply passage 23 comprises a control valve 25 for controlling the amount of fuel injected from the fuel nozzle 19 and a bypass passage 27 for bypassing the control valve 25, and further the bypass passage 27 comprises a flow control valve 29 for allowing a sufficient amount of fuel for the pilot fuel to flow and a shut-off valve 31. Thus, fuel supplied from a fuel source is supplied through the bypass passage 27 to the fuel nozzle 19 even when the flow control valve 25 is closed. In the bypass passage 27, however, the flow control valve 29 restricts the flow of fuel in the bypass passage 27 and adjusts the fuel supplied to the fuel nozzle 11 to a minimum amount necessary for allowing the fuel nozzle 11 to perform pilot combustion.

This pilot-burner nozzle 11 is inserted into the radiant tube 3 through hole 9a of the burner body 9. Thus, the space around the pilot-burner nozzle 11 forms an air throat 13 for combustion air pre-heated to a temperature flowing as secondary air. The tip of the pilot-burner nozzle 11 reaches a position near the inner surface of the furnace wall 7 and is supported by a nozzle support (baffle) 15 which will be later described in detail.

To the air throat 21 of the pilot-burner nozzle 11, a primary air supply source (not shown) is connected and a minimum necessary amount of primary air for pilot combustion of the fuel nozzle 19 is supplied. For the primary air, cold air which does not pass through a heat storage is used. By combining this primary air with high-temperature combustion air supplied as the secondary air, the air ratio is determined.

The nozzle support 15 is placed, for example, at a position corresponding to the inner surface of the furnace wall 7 in the radiant tube 3. Normally, since the bung part enclosed in the furnace wall 7 cannot release heat, the furnace is so arranged that a flame can be formed inside the furnace. This nozzle support 15 comprises a disc part 15a functioning as baffle plate and a tube for air passage 15b extending from the whole periphery of the disc part toward the pilot-burner nozzle 11, and these are shaped into one body. The diameter of the disc part 15a and the tube for air passage 15b are set nearly equal to the inside diameter of the radiant tube 3. The interior of the radiant tube 3 is blocked up with the disc part 15a and an air throat 13 is formed.

Figure 13:
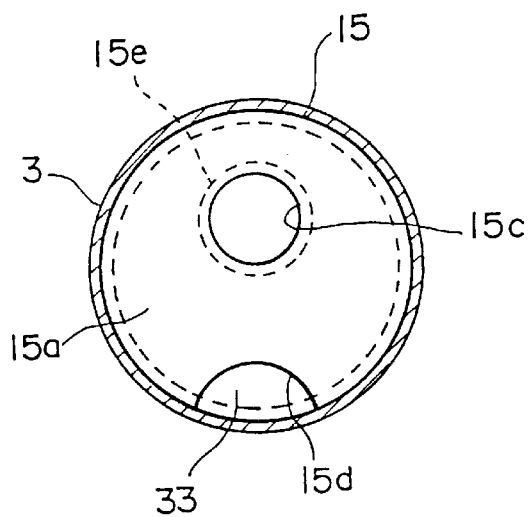
FIG. 13 is a sectional view of a radiant tube burner viewed from the arrow V direction of FIG. 9.

On this disc part 15a, a marginal through hole 15d and a through hole 15c for the fuel nozzle formed with a cylindrical flange 15e protruding to the side of the pilot-burner nozzle 11 are provided as shown in FIG. 13. As shown in FIG. 13, the through hole 15d is a hole bored in a part of the tube 15b for air passage so as to be out at the marginal portion of the disc part 15a in a form of semicircle. This through hole 15d, together with the radiant tube 3, forms a combustion air injection port 33 for the air throat 13. That is, the combustion air injection port 33 of the main air throat 13 for allowing combustion air preheated to high temperature to flow as secondary air is provided in such a deviation as to inscribe the inner circumferential wall surface of the radiant tube 3. Thus, a high-temperature combustion air to be described later is injected from the combustion air injection port 33 and flows along the inner circumferential wall surface of the radiant tube 3. Incidentally, a through hole 15d according to the present invention is not always required to inscribe the inner circumferential wall surface of a radiant tube 3 but is only required to be placed near the wall surface for a sufficient effect.

On the other hand, the fuel nozzle through hole 15c in the disc part 15a is deviated oppositely to the combustion air injection port 33 to such an extent as not to cross the tube center or inscribe the inner circumferential wall surface.

Figure 9:
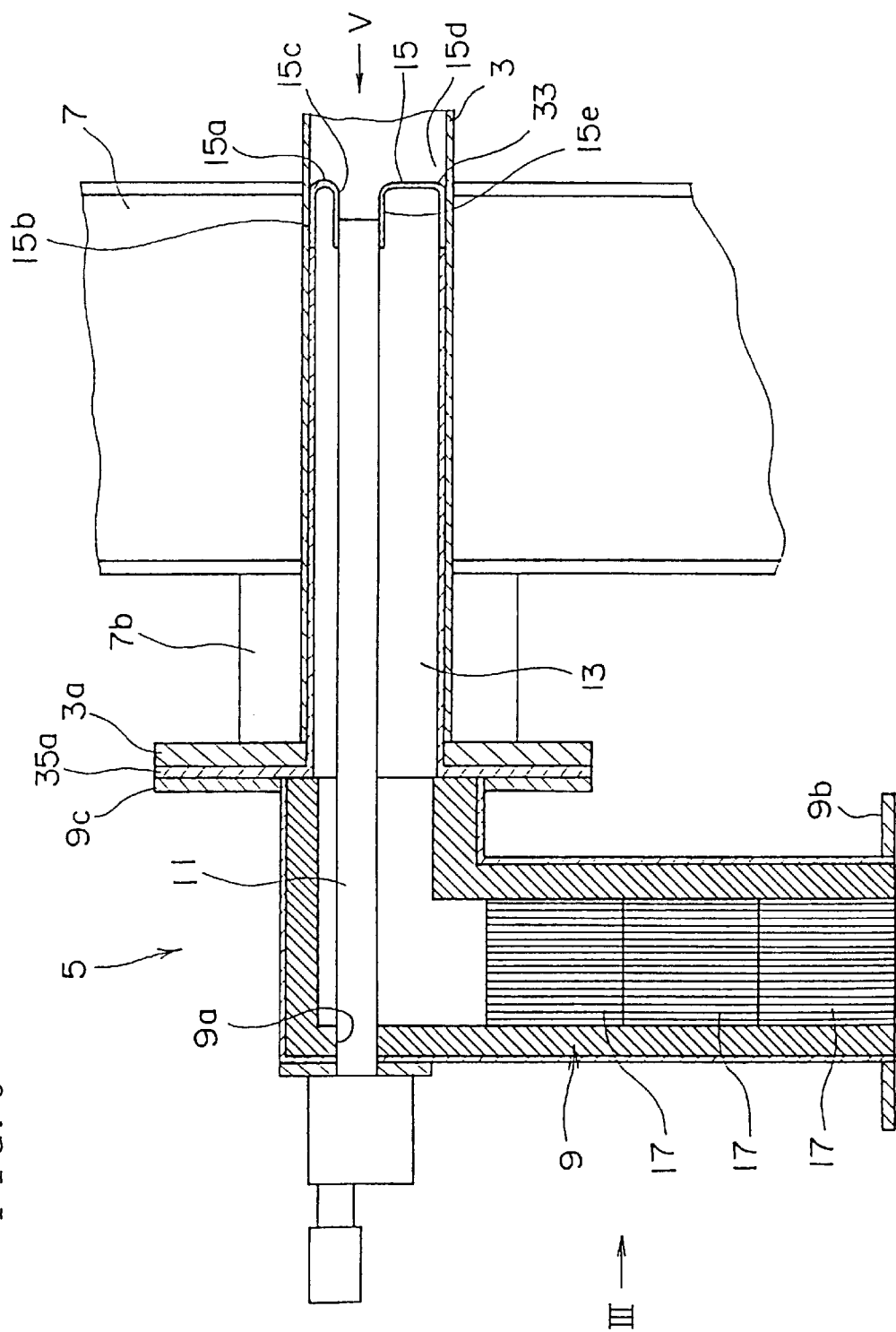
FIG. 9 is a partially sectional view of a radiant tube burner according to the present invention.
Figure 10:
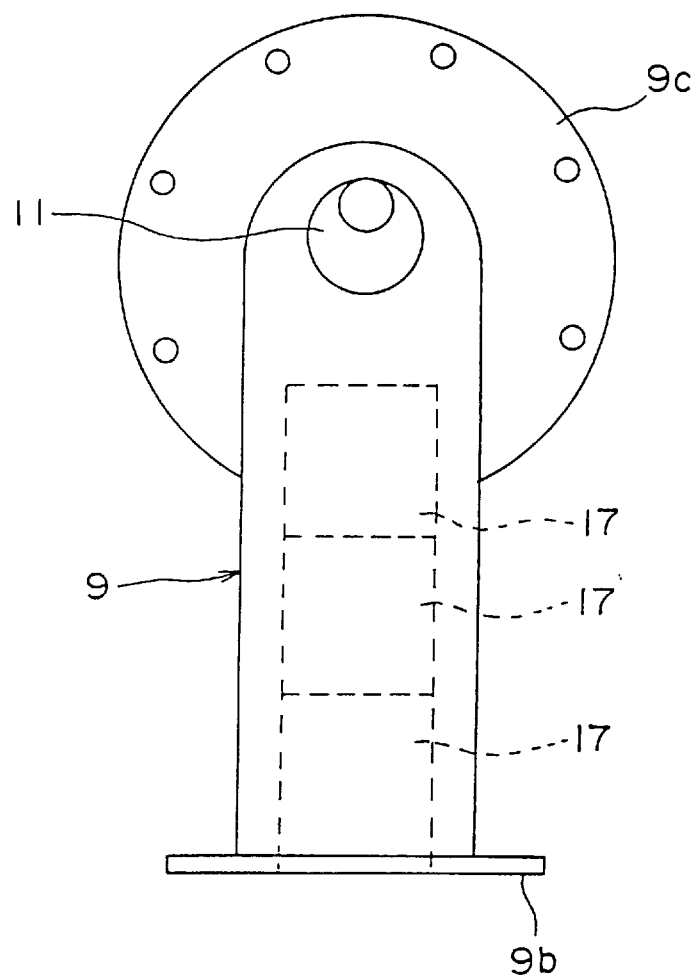
FIG. 10 is a side view of a radiant tube burner viewed from the arrow III direction of FIG. 9.

The diameter of the fuel nozzle through hole 15c is set nearly equal to the outside diameter of the tip of the pilot burner nozzle 11. The inside margin of the fuel nozzle through hole 15c extends toward the burner body 9 and forms a flange 15e. The tip of the pilot-burner nozzle 11 is inserted into and supported by this flange 15e. Thus, the pilot-burner nozzle 11, as shown in FIG. 9, is placed in the upper part of the space in the radiant tube 3 and nearly in parallel with the radiant tube 3 and has its tip positioned apart from the combustion air injection port 33.

The respective air throats 13, 13 of individual burners 5 are connected via a four way valve 41 to the combustion air supply system 40 and exhaust system 42 in a manner that when one burner 5 is connected to the supply system 40, the other burner 5 is connected to the exhaust system 42.

Figure 14:
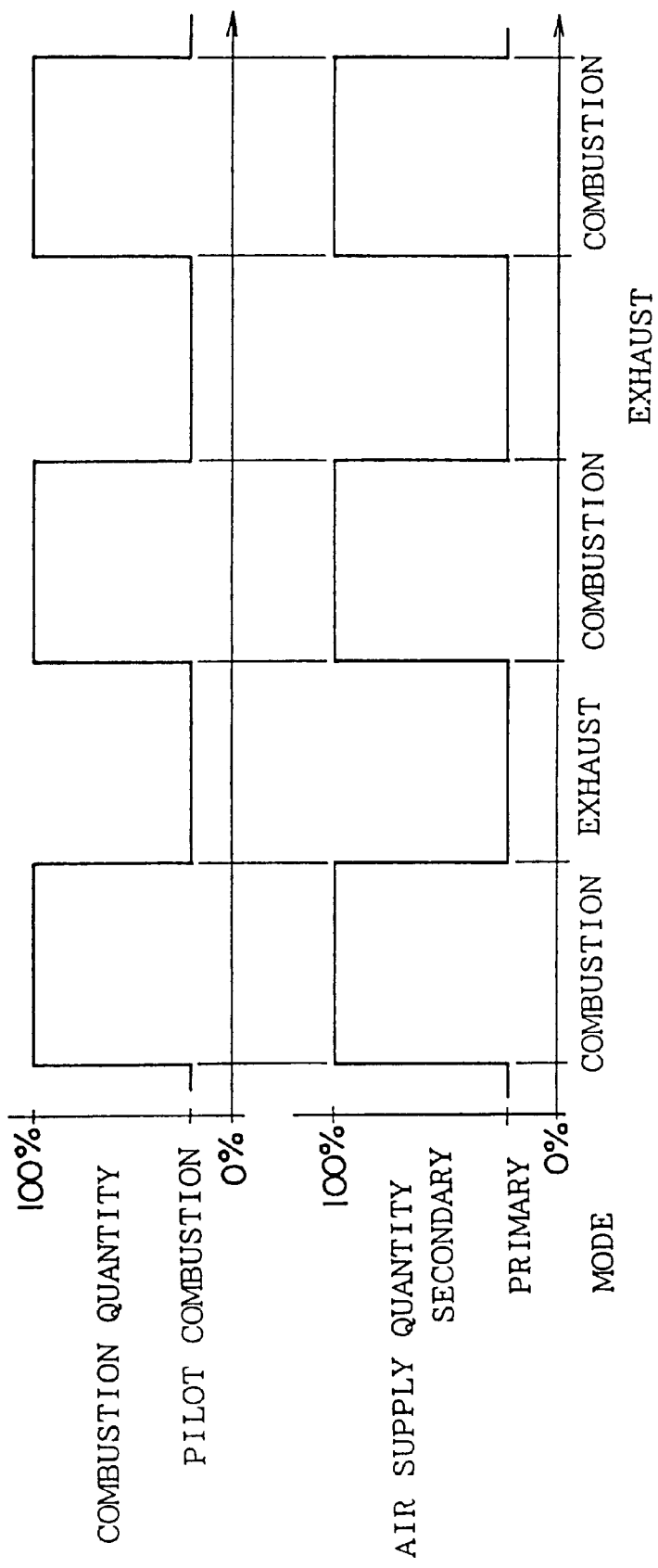
FIG. 14 is a time chart showing the relation between the combustion state of the radiant tube burner of FIG. 9 and the quantity of supplied air.

The operational relation of a burner 5 to the primary air and the secondary air is shown in FIG. 14. In a combustion mode where a burner 5 operates, secondary air, in addition to primary air, is supplied under pressure. Thus, to this burner 5, 100% of the combustion air appropriate to perfect combustion is supplied. In this case, the combustion of the burner 5 reaches 100%.

On the other hand, in an exhaust mode where the burner 5 comes into a non-operational and combustion pause state, only primary air is supplied under pressure. Thus, to this burner 5, a small amount of combustion air appropriate to pilot combustion is supplied only to form a pilot flame having little effect on the combustion. That is, to the primary air throat 21 of the fuel nozzle 11, primary air is always supplied independently of the operating state of the burner 5.

One burner 5 arranged as described above operates as follows.

First, when a pilot combustion is executed, fuel is supplied through the bypass passage 27 to the fuel nozzle 19 while keeping the flow control valve 25 closed. Since primary air is always supplied under pressure from the primary air supply source to the primary throat 21 around the fuel nozzle 19, pilot fuel and the primary air produce a premix gas with an appropriate air ratio for the pilot combustion. This premix gas is ignited with an ignition plug to execute the pilot combustion (state of the upper burner 5 shown in FIG. 8).

After starting supply of secondary air under the condition that the fuel nozzle 11 is executing pilot combustion, the flow control valve 25 of the fuel supply passage 23 is opened and fuel is allowed to flow to the fuel nozzle 19. In other words, when the flow control valve 25 of the fuel supply passage 23 is opened, a large quantity of fuel is supplied from the fuel supply source to the fuel nozzle 19 of a pilot-burner nozzle 11.

Figure 15:
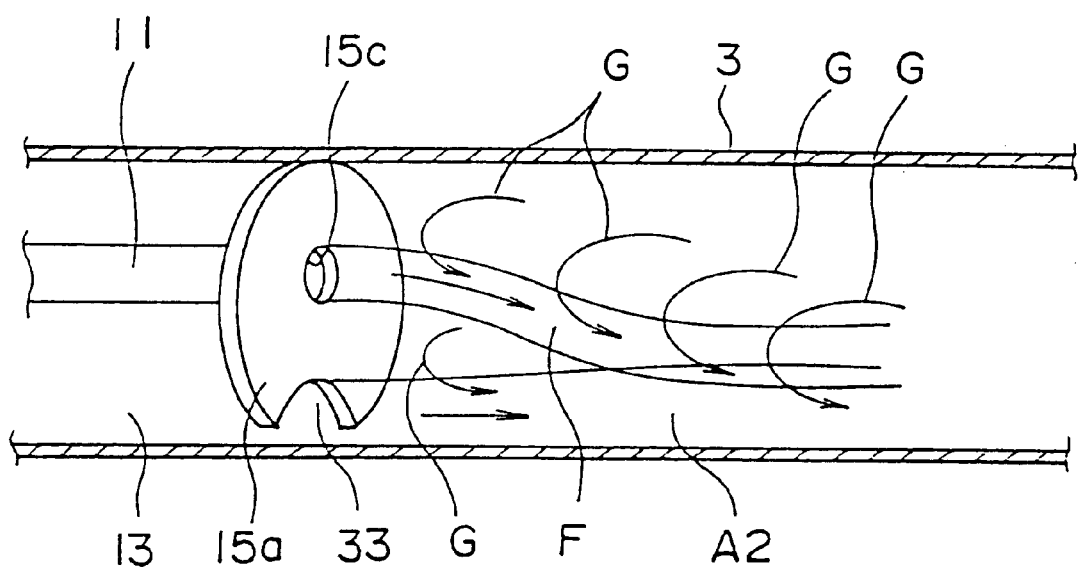
FIG. 15 is a conceptual illustration showing the combustion principle of the radiant tube burner of FIG. 9.

On the other hand, air supplied from the combustion air supply system 40 as secondary air is preheated while passing through the respective heat storages 17 to reach to high temperature, e.g., 800° C. and introduced into the air throat 13. Consequently, the secondary air expands to increase the velocity of flow and is injected energetically, e.g., at a velocity of about 100 m/s, from the combustion air injection port 33 to form a high-speed air flow deflected along the inner circumferential wall surface of the radiant tube 3. The combustion air injection port 33 is provided in such a way as to inscribe, touch or approach the inner circumferential wall surface of the radiant tube 3 and be placed apart from the through hole 15c into which the tip of the pilot-burner nozzle 11 is inserted. As a result, a high-temperature combustion air flow A2 is formed as secondary air flow along the inner circumferential wall surface of the radiant tube 3 apart from the fuel flow F, as shown in FIG. 15. Thus, a negative pressure is caused on the opposite side of combustion air flow A2 in the radiant tube 3, and combustion exhaust gas G reversely flows while whirling, to be mixed with fuel and further rolled up in combustion air flow A2. In turn, this flow of combustion exhaust gas G envelopes a high-speed combustion air flow A2 and flows while being taken into combustion air. That is, fuel and combustion air undergoes a slow combustion extending into the radiant tube 3 while gradually burning in a state of rolling up combustion exhaust gas sufficiently (state of the lower burner 5 shown in FIG. 8). The slow combustion suppresses NOx generation by a decrease in flame temperature and a decrease in oxygen concentration.

And, even when the flow control valve 25 of the fuel supply passage 23 is closed and supply of secondary air from the secondary air supply source is stopped in this combustion state, a pilot flame is maintained because the pilot-burner nozzle 11 is still supplied with a slight amount of fuel and primary air continuously.

This burner 5 equipped with a pilot-burner nozzle 11 or simple fuel nozzle is inserted from a hole 9a of the burner body 9 into the tube 15b for air passage and the tip of the pilot-burner nozzle 11 is positioned and supported by inserting it into the flange 15e of the nozzle support 15 at the tip of the tube 15b. And further, by fitting the burner body 9 to the radiant tube 3 and inserting the tube 15b for air passage into the radiant tube 3, the pilot-burner nozzle 11 is automatically disposed in parallel with radiant tube 3 on the upper side of the space in the radiant tube 3.

Furthermore, in the pilot-burner nozzle 11 of this burner 5, room temperature air is always supplied around the fuel nozzle 19 as primary air and a slight amount of fuel also flows, so that no coking occurs even if combustion exhaust gas flows through the air throat 13.

Incidentally, the other burner 5 is also arranged in a similar manner to that of the above described burner 5 and operates similarly. Thus, the description will be omitted of the other burner 5. With respect to a fuel supply, primary-air supply source and secondary-air supply source, however, it is preferable for the other burner 5 to use them in common with the one above described burner 5.

Here, it is so arranged that when the four way valve 41 is in the first position (position indicated in FIG. 8), the secondary air throat 13 of one burner 5 is connected to the secondary-air supply source and simultaneously the secondary-air throat 13 of the other burner 5 is connected to the side of atmosphere, whereas the secondary air throat 13 of the one burner 5 is connected to the atmosphere side and the secondary air throat 13 of the other burner 5 to the secondary-air supply source when the four way valve 41 is switched over to the second position.

Equipped with burners 5 operating in this manner at both ends of a radiant tube 3 and burning alternately, the alternate-combustion type radiant tube burner 1 operates as follows:

For the sake of convenience in this description of operation, one burner is referred to as Burner A and the other as Burner B.

First, the flow control valve 25 of the fuel supply passage 23 on the Burner A side is opened and the flow control valve 25 of the fuel supply passage 23 on the Burner B side is closed, and the four way valve 41 is so switched as to connect the combustion air supply system 40 to the Burner A side and the exhaust system 42 to the Burner B side.

Accordingly, a large quantity of fuel and primary and secondary air are supplied to the Burner A side and main combustion proceeds. On the other hand, a small amount of fuel and primary air alone are supplied to the Burner B side and pilot combustion proceeds. That is, Burner B, even if main combustion is stopped, is supplied with an appropriate amount of fuel and primary air for pilot combustion to continue.

Combustion exhaust gas generated in the main combustion of Burner A flows toward the Burner B side while heating the radiant tube 3. And, this combustion exhaust gas flows from the combustion exhaust air injection port 33 of the nozzle support 15 on the Burner B side into the main air throat 13, and is taken via the four way valve 41 into the exhaust system 42 to be exhausted to atmosphere after a predetermined exhaust treatment. At that time, heat contained in the combustion exhaust gas is collected by heat storage 17 in the burner body 9. Thus, the temperature of individual heat storages 17 rises.

And, after a lapse of predetermined time T, e.g., about 20–40 sec from starting the combustion of Burner A, the flow control valve 25 of the fuel supply passage 23 on the Burner A side is closed. Then, the four way valve is switched, so that the Burner A side is connected to the exhaust system 42 and the Burner B side is connected to the combustion air supply system 40 to clean Burner B with air. Thereafter, the flow control valve 25 of the fuel supply passage 23 on the Burner B side is opened to supply the main fuel to the Burner B side.

Figure 16:
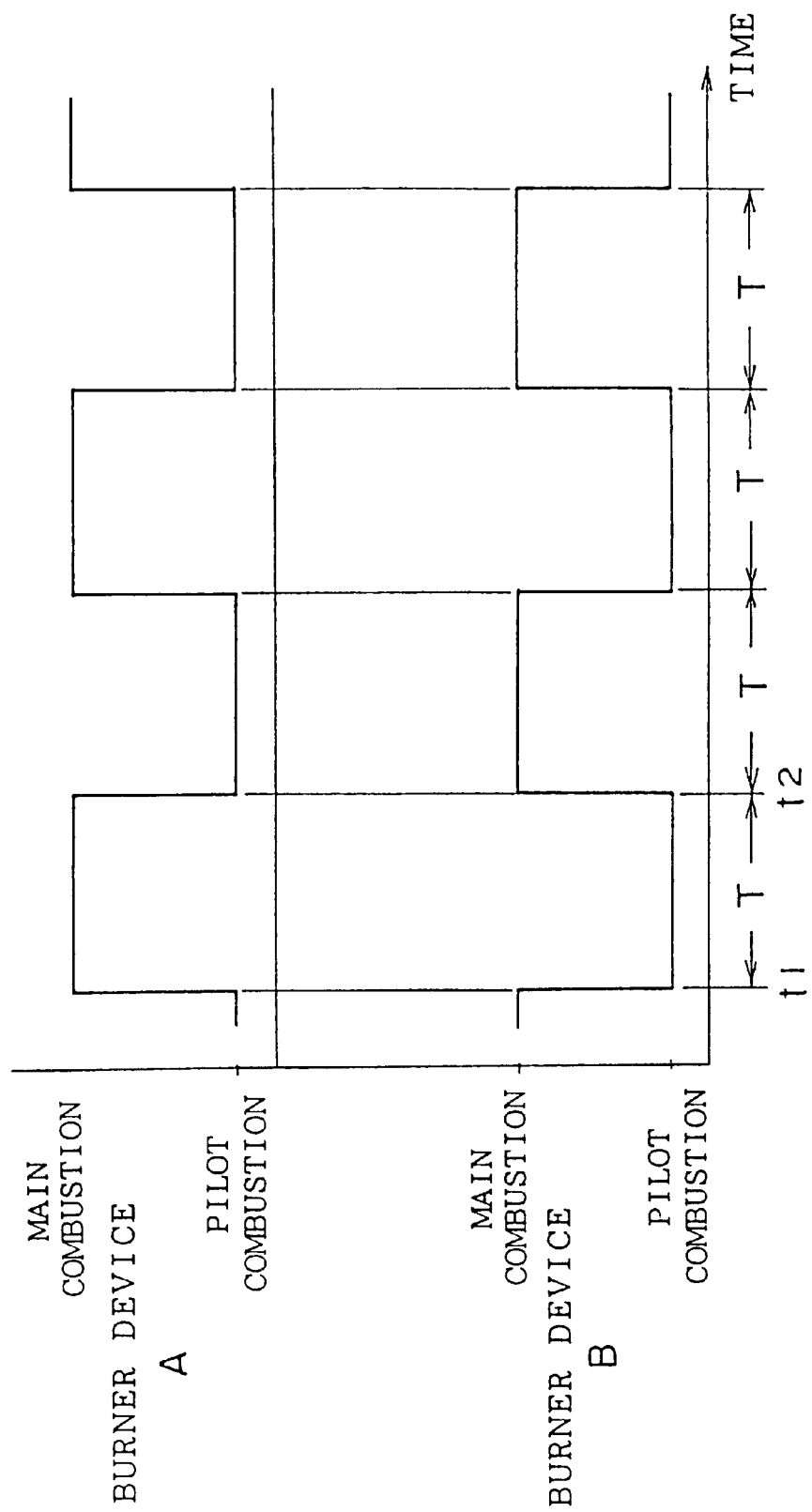
FIG. 16 is a time chart showing the aspect of alternate combustion of the radiant tube burner of FIG. 8 and the operating relation of individual radiant tube burners.

FIG. 16 shows this aspect of progress. At the point of time t1, Burner A starts a main combustion and Burner B starts a pilot combustion. And at the point of time t2 with a lapse of time T after t1, Burner A that has been responsible for a main combustion is switched to a pilot combustion and Burner B that has been responsible for a pilot combustion starts a main combustion. From this time on, a burning burner and a non-burner burner switch are switched from one to the other at each lapse of a predetermined time, so that the present radiant tube burner 1 executes alternate combustion.

Incidentally, the above embodiment is one example of preferred implementation of the present invention, but various changes and modifications may be made without departing from the spirit and scope of the present invention. For example, the arrangement is so set that the switching between Burner A and Burner B is performed for every lapse of a predetermined time T but is not limited to this. The arrangement may be so set that the temperature of combustion exhaust gas after passing through each heat storage 17 is monitored and the switching is performed at a point of time when this temperature reaches, e.g., 200° C. or so.

In addition, the nozzle support 15 and the tube 15b for air passage to be built in the radiant tube 3 are shaped into one body so that they can be incorporated in the tube 3 at an attaching step, but are not limited to this. For example, the nozzle support 53 of the radiant tube burner 51, with a fuel nozzle through hole 53c and a marginal groove 53d formed by punching in a sheet disc may be fixed on the inner circumferential surface of the radiant tube 3 by welding or the like, as shown in FIG. 17.

Figure 17:
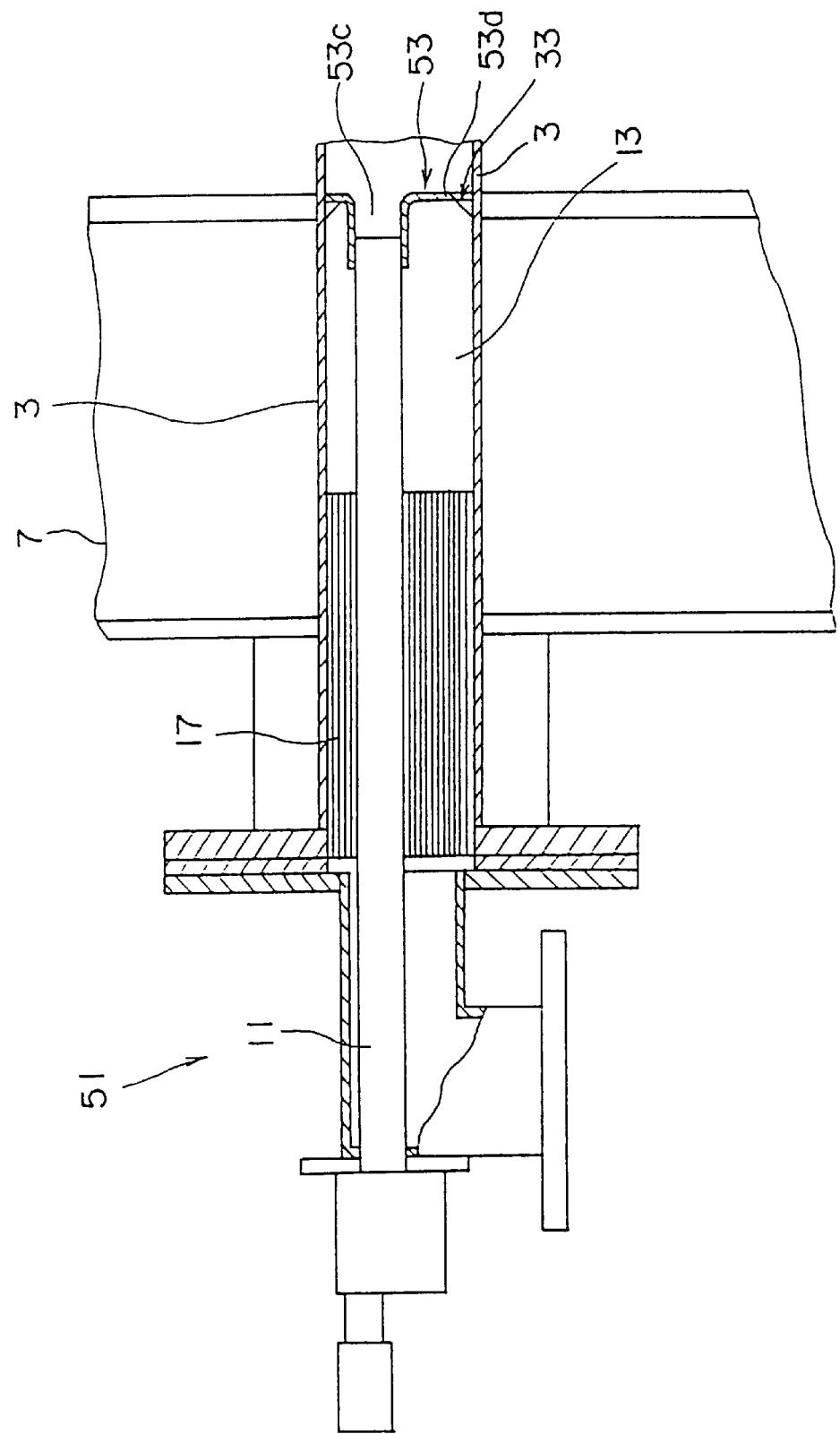
FIG. 17 is a sectional view showing another embodiment of radiant tube burner according to the present invention.

Furthermore, individual heat storages 17 are so arranged as to be housed one behind another in a lower portion of a burner body 9 but may be housed in the air throat 13 as shown in FIG. 17 or may be housed in a duct 10 connecting the burner body 9 and the four way valve 41 (not shown). When housed in the air throat 13, they are housed at the pilot-burner nozzle 11 as shown in FIG. 17.

Figure 18:
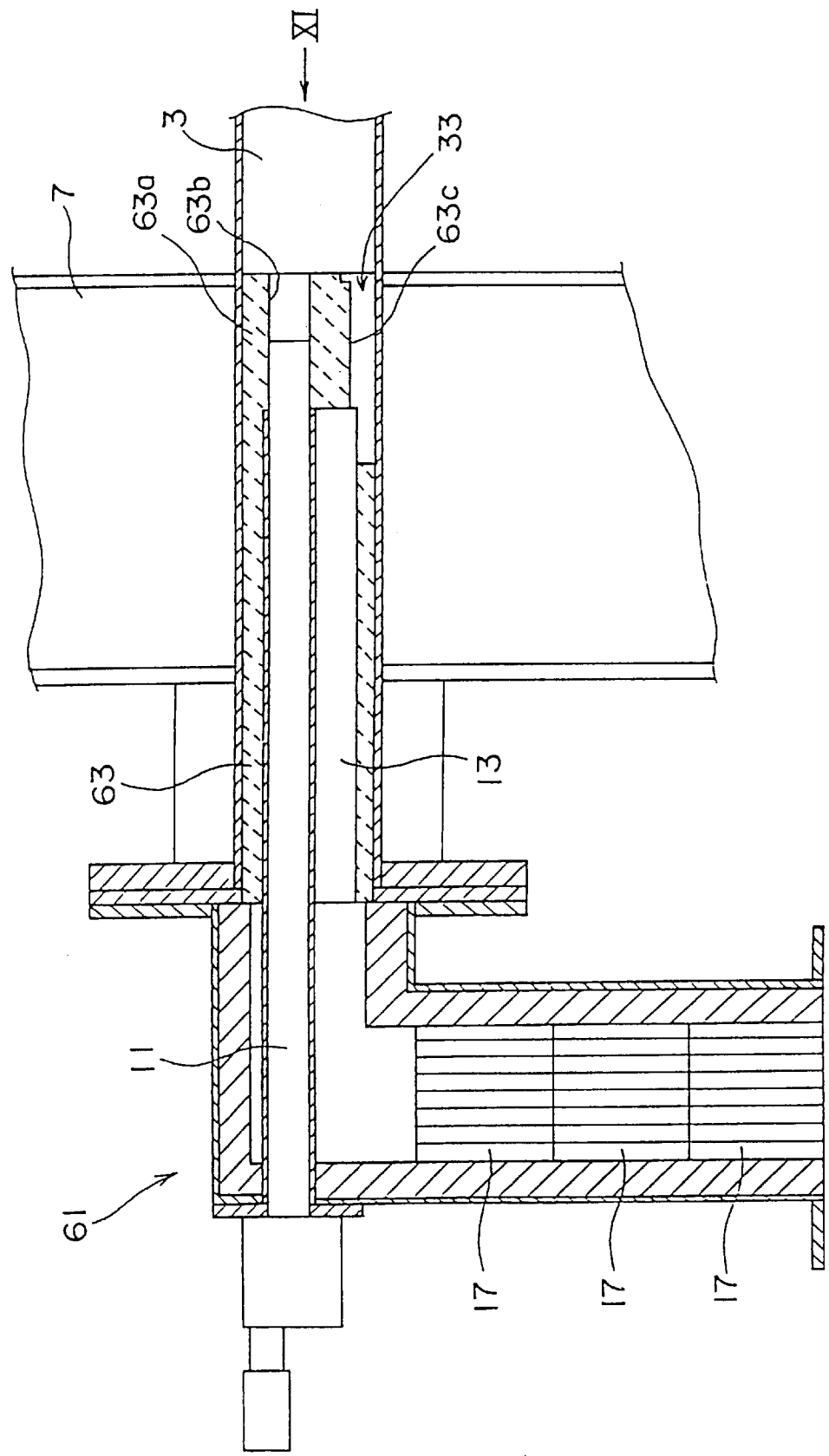
FIG. 18 is a sectional view showing a third embodiment of radiant tube burner according to the present invention.
Figure 19:
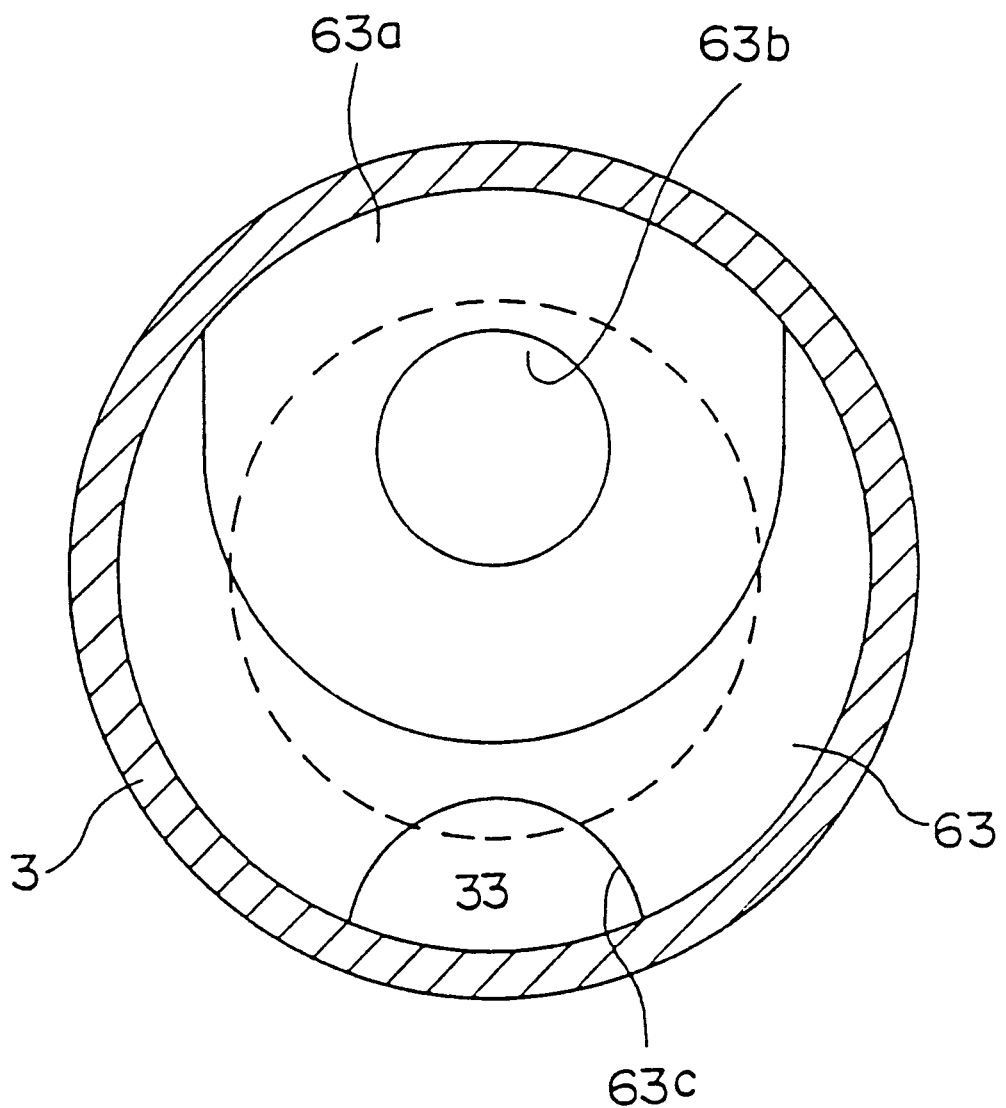
FIG. 19 is a sectional view of a radiant tube burner viewed from the arrow XI direction of FIG. 18.

Also, the radiant tube burner may be of a type shown in FIG. 18. In more detail, a sleeve 63 made of a refractory material, is inserted into the end of the radiant tube 3 in this radiant tube burner 61. The tip of the sleeve 63 forms a thick-wall portion 63a and a hole of this thick-wall portion 63a, i.e., a nozzle through hole 63b is slightly deviated from the center of the radiant tube 3 to the upper side. As the tip of the pilot-burner nozzle 11 is inserted into this hole 63b, the tip of the fuel nozzle 11 is consequently positioned and supported by this thick-wall portion 63a.

On the lower portion of the outer peripheral surface of the thick-wall portion 63a, a groove 63c partially connected to the air throat 13 and extending in the longitudinal direction is formed. This groove 63c forms the injection port 33 of the air throat 13, in combination with the inner circumferential wall surface of the radiant tube 3. That is, the outlet of the air throat 13 of the radiant tube burner 61 is deviated to inscribe the inner circumferential wall surface of the radiant tube 3 as in the above example. In this embodiment, description was made chiefly of an example of the opening of the air throat 13, or combustion air injection port 33 inscribing the inner circumferential wall surface, but the application is not limited to this. It is also possible with the combustion air inspection port in a state of nearly inscribing or approaching the inner circumference to arouse a circulation of exhaust gas on the opposite side to air injection flow. A stronger circulation of exhaust gas arises when the combustion air injection port 33 inscribes the inner circumferential wall surface, though.

Incidentally, on the tip surface of the sleeve 63, the formed portion of a groove 63c is dented in a form of crescent steps from the bored portion of a hole 63b. The shape of this stepped portion enables the injection angle or direction of secondary air flow to be adjusted to a desired value.

In this embodiment, description was made chiefly of a case obtaining a high-temperature combustion air with alternate combustion using a heat storage connected to or built in a burner, but the application is not limited to this. It is also allowable to continuously supply to a single burner combustion air preheated to high temperature by the discharge heat of high-temperature exhaust gas in such a way as relatively rotating a heat storage to both the combustion air supply system and the exhaust system or switching the flowing directions of a fluid in a heat storage by using flow passage switching means, thereby permitting continuous combustion. In addition, in this embodiment, a pilot-burner nozzle burner is employed as a fuel nozzle, but the fuel nozzle is not limited to this. It is sometimes allowable to separately install a pilot burner near the injection port of the fuel nozzle. Furthermore, in this embodiment, description was made chiefly of using gaseous fuel, but the fuel used is not limited particularly to this and use of liquid fuel such as oil is possible. And the combustion air need not always a flow speed as high as 100 m/s; the present invention is effective with a somewhat slower flow speed.

Figure 20:
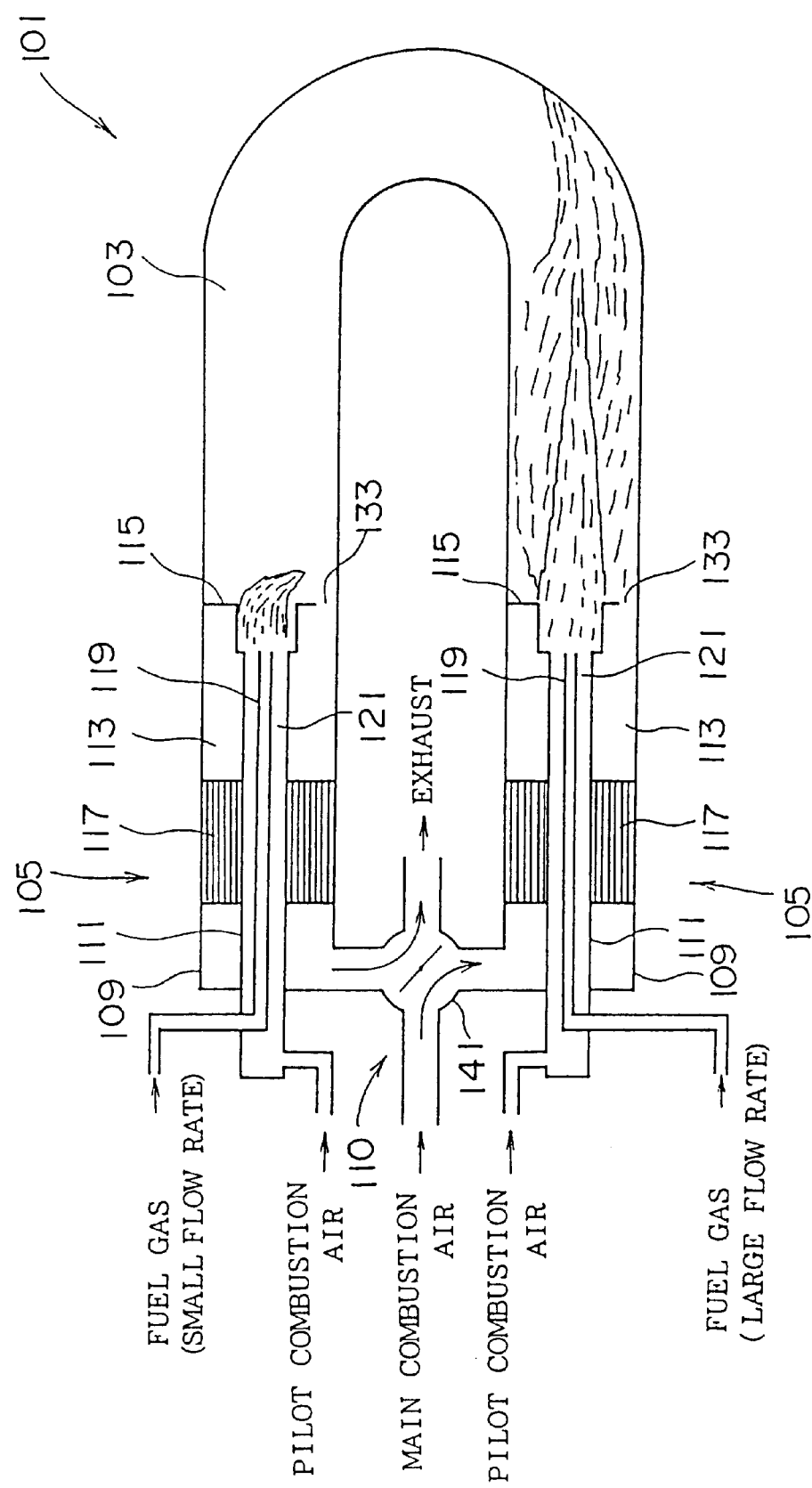
FIG. 20 is a structural schema showing a fourth embodiment of radiant tube burner according to the present invention.

FIG. 20 shows a fourth embodiment of radiant tube burner according to the present invention. In FIG. 20, a radiant tube burner 101 comprising a radiant tube 103 curved in a U-shape, a pair of burners 105 disposed at both ends of this radiant tube 103 and so on is heated by combustion gas passing through its interior and radiation heat radiates from its outer surface to heat the interior of a heating furnace, heat treating furnace or the like.

Figure 21:
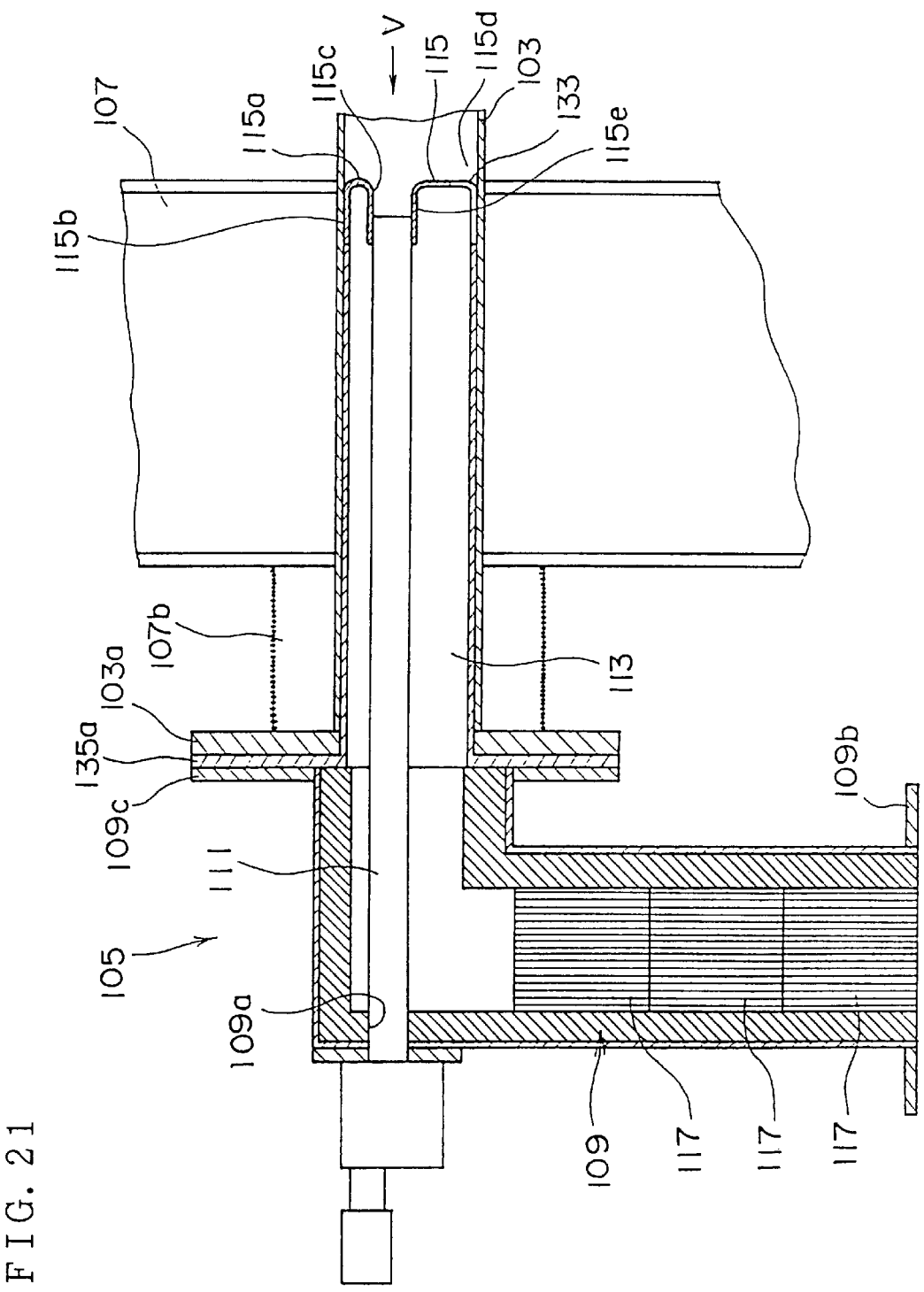
FIG. 21 is a partially sectional view of a radiant tube burner according to the present invention.

With the radiant tube 103, as shown in FIG. 21, its middle portion is supported by a mounting hole bored in the outer surface of a furnace wall 107 and a flange 103a is fixed at a mounting portion 107b provided on the outer surface of the furnace wall 107 with the end positioned outside the furnace. The gap between both ends of the radiant tube 103 and the furnace wall 107 is choked tightly with a seal material not shown.

Each of burners 105 disposed at both ends of the radiant tube 103 comprises a burner body 109, a burner gun 111, a combustion air passage 113, a baffle (nozzle support) 115 and so on. Thus, only the arrangement of one burner 105 will be described.

The burner body 109 of a burner 105 is nearly cylindrical, and is placed to be kept a predetermined distance away from the furnace wall 107, extending vertically. And, the upper portion of the burner body 109 is bent rectangularly and extends toward the furnace wall 107. In this burner body 109, a hole 109a for inserting the burner gun 111 is bored. This hole 109a is bored on the bent portion opposite to the furnace wall 107 at the bend and more specifically at a position near the top end of the burner body 109.

The space in this burner body 109 forms a combustion air passage 113, in a part of which a plurality of heat storages 117 are housed. Individual heat storages 117 are placed one behind the other at the lower portion of the burner body 109. Each heat storage 117 is a honeycomb-shaped cylinder molded of a material with a large heat capacity and a high durability considering a relatively low pressure loss (e.g., ceramics). Accordingly, air can pass through individual heat storages 117. In this case, passing air absorbs heat from individual heat storages 117 and its temperature rises. Incidentally, at the lower end of the burner body 109, a flange 109b is formed to fix a duct (air passage mechanism) 110. Accordingly, the combustion air passage 113 in the burner body 109 is connected to the air passage mechanism 110. Further, a flange 109c is formed at the tip of the burner body 109 and fixed together with the radiant tube 103 to the mounting portion 107b.

The burner gun 111 comprises a fuel passage 119, a pilot combustion air passage 121, an ignition plug not shown and so on. The fuel passage 119 and the pilot combustion air passage 121 are arranged adjacently. That is, the fuel passage 119 is concentrically placed in the pilot combustion air passage 121. Thus, the burner gun 111 is simple in structure and therefore can be formed in a relatively small diameter. This burner gun 111 is inserted from the hole 109a of a burner body 109 into the radiant tube 103. Thus, the space around the burner gun 111 forms a combustion air passage 113. The tip of the burner gun 111 reaches the neighboring position to the inner surface of the furnace wall and is supported by a baffle 115 described later in detail.

Figure 22:
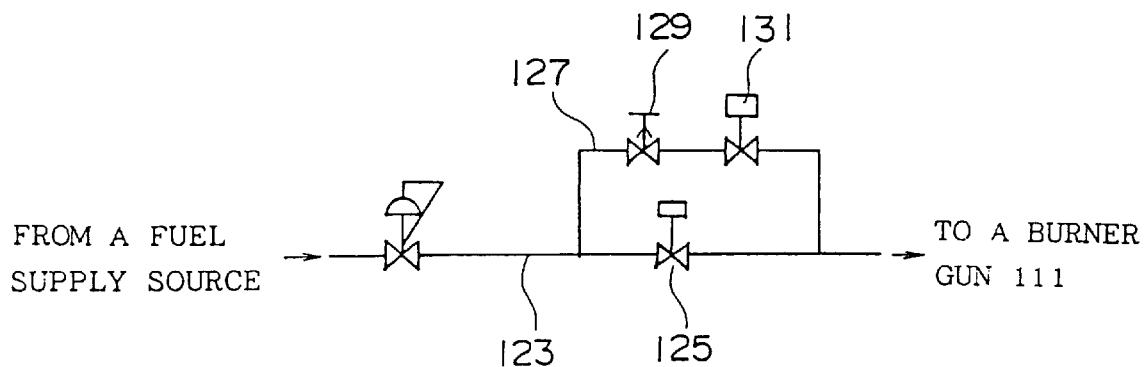
FIG. 22 is a system diagram showing a fuel supply passage of the radiant tube burner of FIG. 21.

To the fuel passage 119 of a burner gun 111, a fuel supply source not shown is connected through a fuel supply passage 123. FIG. 22 shows this fuel supply passage 123. Incidentally, explanation of its operation will be omitted because the same as that of FIG. 12.

The baffle 115 is placed in the radiant tube 103, for example, at a position corresponding nearly to the inner surface of the furnace wall 107 but is allowed to move back toward outside of the furnace. The baffle 115 comprises a disc portion 115a, and a circumferential wall 115b extending from the whole peripheral margin of this disc portion 115a in the direction of the burner gun 111. An inner tube fixed to a flange 135a put over a flange 103a is coupled to the circumferential wall 115b and these are formed in one body. The diameter of the disc part 115a is set nearly equal to the inside diameter of the radiant tube 103 and the disc part 115a blocks up the interior of the radiant tube 103.

Figure 23:
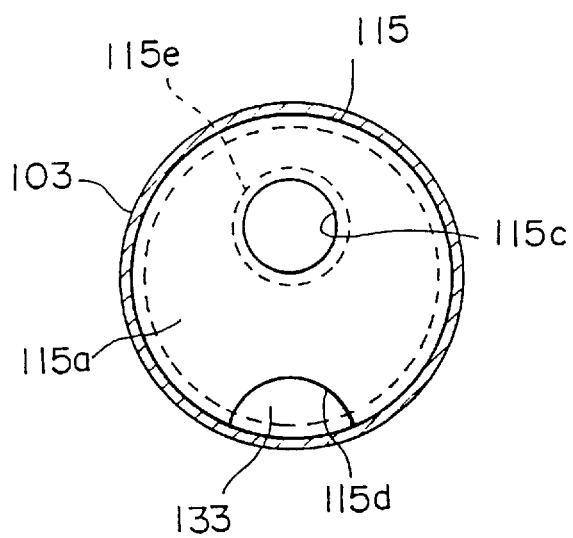
FIG. 23 is a sectional view of a radiant tube burner viewed from the arrow V direction of FIG. 21.
Figure 25A:
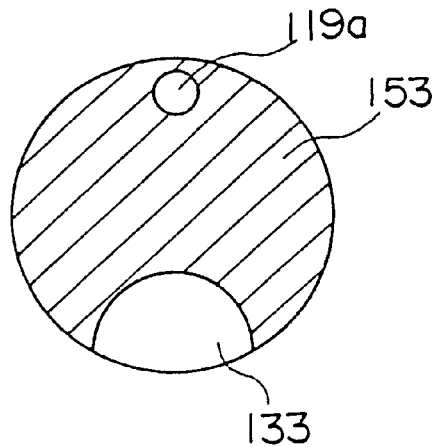
FIGS. 25A–25F are transverse sectional views showing other embodiments of fuel injection ports and combustion air injection ports in radiant tube burners of the present invention.
Figure 25B:
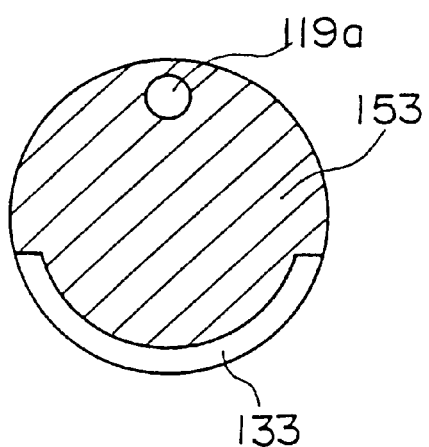
Figure 25C:
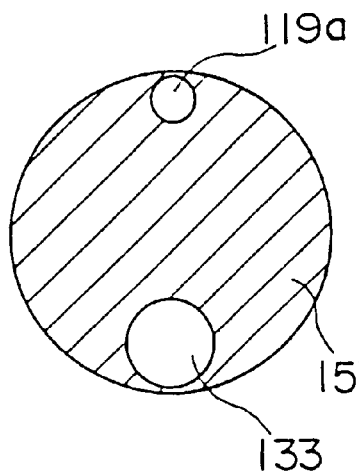
Figure 25D:
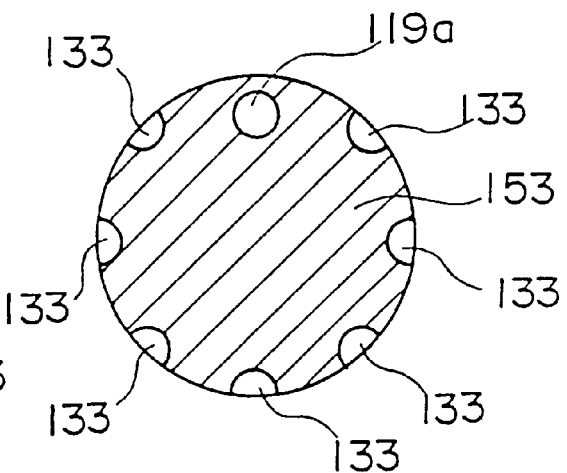
Figure 25E:
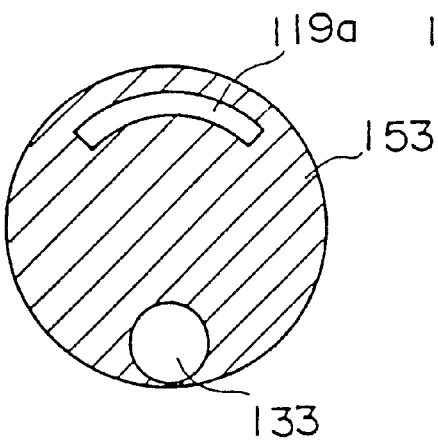
Figure 25F:
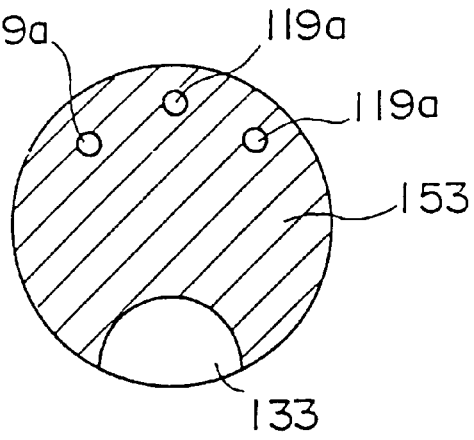

On this disc part 115a, a notch 115d and a small-diameter hole 115c are provided as shown in FIG. 23. The notch 115d of the disc portion 115a is made by cutting off the lower portion of the disc part 115a in a semicircular shape. This notch 115d, together with the radiant tube 103, defines the combustion air injection port 133. That is, the combustion air injection port 133 is provided off the center of a sectional surface of the radial tube 103 and combustion air is injected to a position of the center of the space in the radiant tube 103.

Meanwhile, a small-diameter hole 115c of the disc part 115a is opposed to a hole 109a of the burner body 109. The diameter of the small-diameter hole 115c is set nearly equal to the outside diameter of the tip of the burner gun 111. The margin of the small-diameter hole 115c extends toward the burner body 109 and constitutes a cylindrical portion 115e, into which the tip of the burner gun 111 is inserted and supported. Thus, the burner gun 111 is placed nearly in parallel with the radiant tube 103 and its tip is kept apart from the combustion air injection port 133. The circumferential wall 115b of the baffle 115 is fixed on the inner circumferential surface of the radiant tube burner 103.

The combustion air passage 113 is connected to the air passage mechanism 110 as mentioned above so that an appropriate amount of combustion air is supplied under pressure via this air passage mechanism 110 from a combustion air supply source not shown.

Furthermore, the above burner gun 111 comprises a fuel passage 119 and a pilot combustion air passage 121 provided side by side, in such a manner as the fuel passage 119 is arranged in the pilot combustion air passage 121. The space around the burner gun 111 forms a combustion air passage 113, and high-temperature exhaust gas flows through this combustion air passage 113 when the burner 105 is in a non-operating stand-by state. However, low-temperature air is always supplied into the pilot combustion air passage 121, while a necessary amount of fuel for pilot combustion flows in the fuel passage 119. Thus, with this burner 105, fuel in the fuel passage 119 is not heated by the heat of exhaust gas in the combustion air passage 113 to reach high temperature.

Meanwhile, the other burner 105 is also arranged and operates like the above one burner 105. Thus, description will be omitted of the other burner 105. However, a fuel supply source and a combustion air supply source are preferably used for the other burner 105 in common to the one burner 105.

In this case, the air passage mechanism 110 leading to the combustion air supply source is preferably provided with a four way valve 141 shown in FIG. 20. In more detail, the system is so arranged that, in the first switching position of the four way valve 141 (position shown in FIG. 20), the combustion air passage 113 of the burners 105 are connected to the combustion air supply source and an atmosphere side respectively, and in the second switching position of the four way valve 141, the combustion air passages 113 the burners 105 are connected to the atmosphere side and the combustion air supply source respectively.

Pilot combustion for the burner 105 may proceed with a pilot burner 112 separately provided in the combustion air passage 113 as shown in FIG. 24. By allowing pilot combustion to proceed with this pilot burner 112, the temperature of combustion air can be raised to a temperature sufficient for a ignition source and oxygen source, that is, a high temperature about 100 C higher than the ignition temperature of fuel. Furthermore, a temperature measuring device 114 may be provided. As a result, since the temperature of injected air can be monitored, safety at the time of ignition is assured and the combustion amount of the pilot burner 112 can be so controlled that the temperature of combustion air becomes 100° C. higher than the ignition temperature of fuel.

In addition, by using a material having a high thermal expansion coefficient for the baffle plate 153, the combustion air injection port can be enlarged to make the velocity of air flow lower when the combustion air is at a low temperature, and the combustion air injection port 133 can be contracted to make the velocity of air flow higher according to an increase in the temperature.

Further as shown in FIGS. 25A–25F, though the fuel injection port 119a and the combustion air injection port 133 are provided to be apart from each other as mentioned above, they may be so modified as to be a plurality of injection ports each having a circular section or injection ports including a port in an oblong shape along the margin, to decrease the NOx content in combustion gas and save installation and maintenance costs. However, a slit-shaped discharge opening is more desirable than a circular opening for a fuel gas supply port to mix fuel gas with air at high speed, and a circular opening is also desirable for the combustion air injection port 133 to increase self-recirculation flow.

Figure 26A:
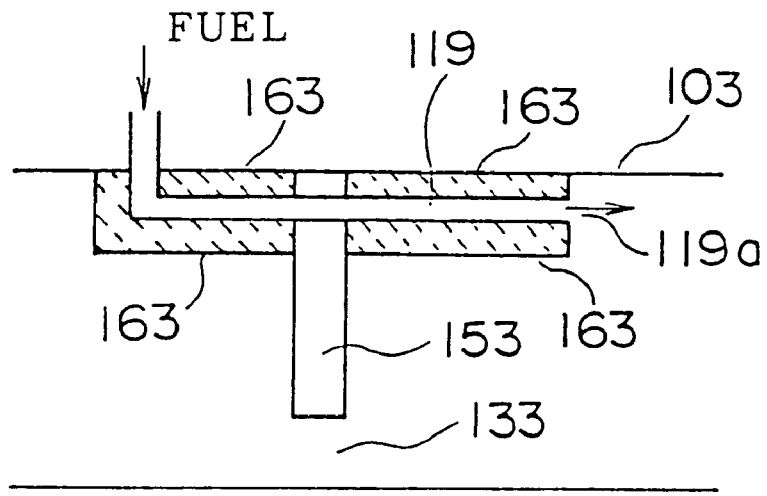
FIGS. 26A–26B are partially sectional views of fuel injection ports and combustion air injection ports in radiant tube burners of the present invention.
Figure 26B:
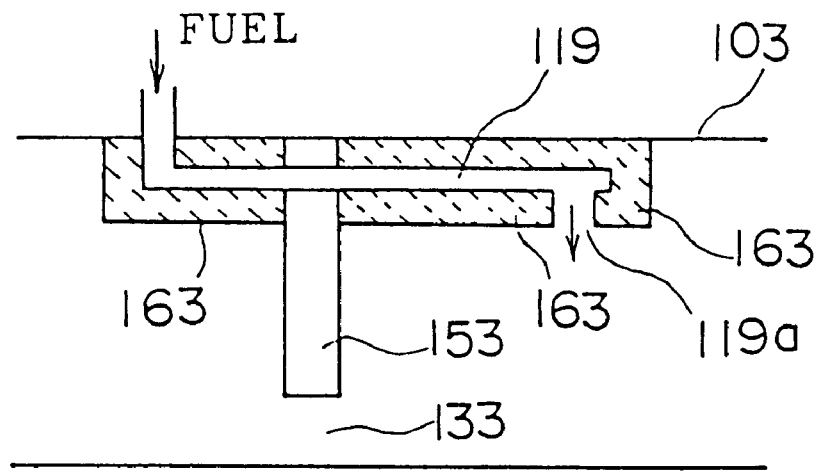

Also, as shown in FIG. 26A and FIG. 26B, the fuel passage 119 may be extended while the fuel injection port 119a and the combustion air passage 133 are put apart from each other, to carry out a low NOx content combustion.

Here, a description of the relation between the combustion air and the operation of a burner 105 will be omitted because it is similar to what has been already explained using FIGS. 14 and 16.

Figure 27:
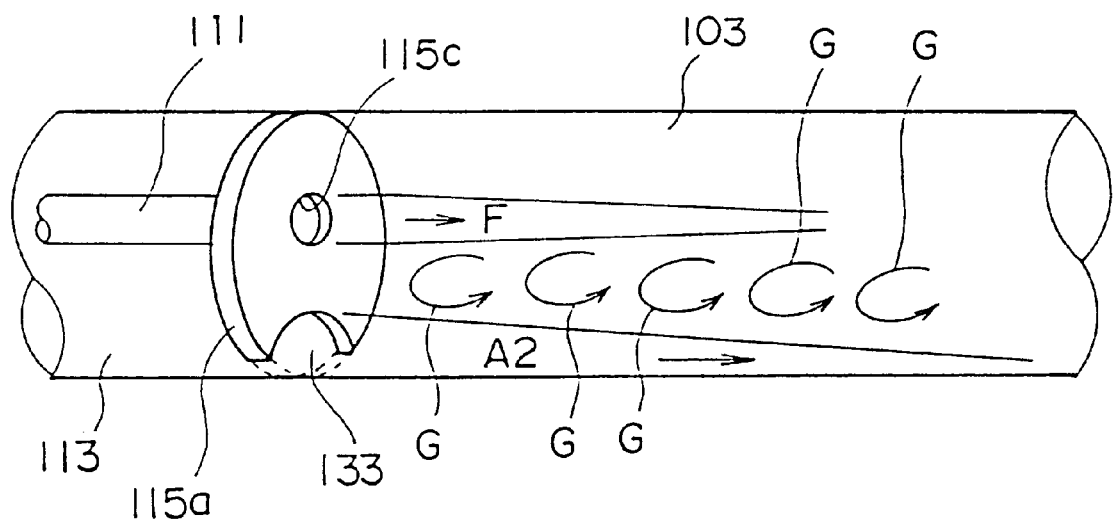
FIG. 27 is a conceptual illustration showing the state of a main combustion of a radiant tube burner of FIG. 21.

When the radiant tube burner 101 is allowed to operate as mentioned above, its combustion state will be described using a schema shown in FIG. 27. Combustion air A2, which has already absorbed heat from a heat storage 117 to reach a high temperature, passes through the combustion air passage 113 and is injected from the off-center combustion air injection port 133. On the other hand, fuel gas F is injected from a small-diameter hole 115c positioned apart from the combustion air injection port 133 and connected to a burner gun 111 and burns in the radiant tube 103 while rolled up in a self-circulating flow G formed by a high-speed jet of combustion air A2. At that time, fuel gas F is mixed with the self-circulating flow G mainly comprising exhaust gas and becomes a low-calory fuel, so that the flame temperature at the time of combustion is reduced to carry out a low NOx content combustion. Furthermore, since the combustion reaction takes place on a high-speed air jet, the combustion reaction is delayed and the extent of the combustion reaction widens, so that combustion reaction energy is dispersed and the flame temperature is further reduced, thereby resulting in a low NOx content combustion. In addition, with the delay of the combustion reaction and the wider extent of the combustion reaction, the maximum temperature point of flame can be placed at an intra-furnace position over the thickness of the furnace wall and accordingly thermal energy generated by combustion reaction is released into the furnace, so that an excessive rise in flame temperature can be prevented, thereby also resulting in a low NOx content combustion. Furthermore, the mass flow rate is increased in the combustion reaction field as the self-circulating flow mainly consisting of exhaust gas is rolled up by the high speed air jet, thereby enabling a low NOx content combustion. According to the present invention, the combustion temperature can be made lower and an amount of generated NOx can be reduced to an extremely small extent, as clearly seen from Table 3 showing the present invention and a conventional example.

Meanwhile, though generation of a misfire due to lifting or blown leap of a flame is expected with a higher velocity of combustion air flow, no misfire is generated even at a flow velocity of 60 m/s of combustion air (coke oven gas herein referred to as COG) at a temperature higher than the ignition temperature of fuel. In COG, combustion is possible even at a high velocity of 150 m/s though the upper limit of flow velocity of combustion air could not be experimentally confirmed.

Incidentally, the above embodiment is a preferred example of implementation according to the present invention, but the present invention is not limited to this and a wide variety of changes and modification can be implemented without departing from the true spirit and scope of the present invention.

For example, the radiant tube burner 101 was so arranged that the switching of individual burners 105 between the operating state and the standby state was repeated periodically with a time interval T, but is not limited to this and it may also be so arranged that the temperature of individual heat storages 117 is monitored and the operation and standby states of individual burners 105 are switched when this temperature reaches a preset temperature.

Furthermore, a burner 105 was so arranged that individual heat storages 117 were housed one behind another on the lower side of the burner body 109. But the housed position of individual heat storages 117 is not limited to this provided that it is situated in the main combustion air passage 113 or at a midway point of the air passage mechanism 110 connected thereto and heat storages 117 may be housed one behind the other, for example, around the burner gun 111.

Figure 28A:
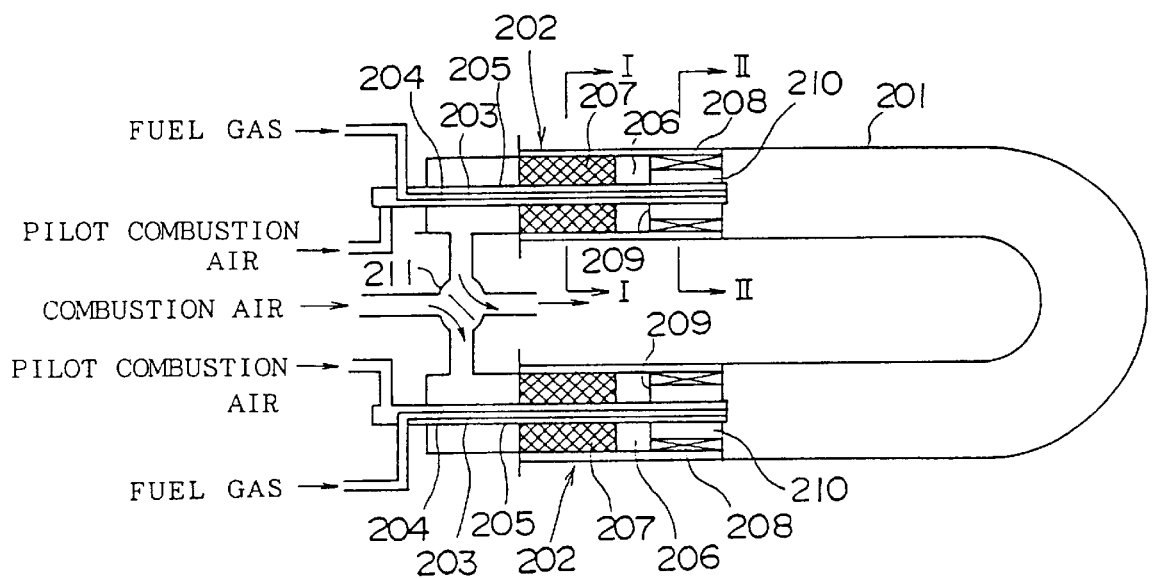
FIGS. 28A–28C are explanatory drawings of a fifth embodiment of radiant tube burner according to the present invention, where
Figure 28C:
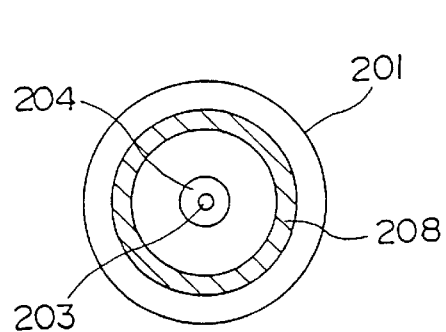
Figure 28B:
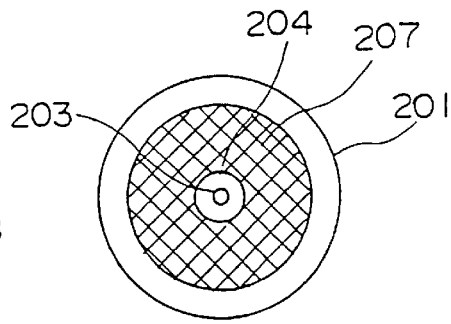

FIGS. 28A–28C show a fifth embodiment of a heat storage type radiant tube burner according to the present invention. FIG. 28A is a structural drawing of this heat storage type radiant tube burner, while FIGS. 28B and 28C are sectional views taken along the line I—I and line II—II of FIG. 28A, respectively. This heat storage type radiant tube burner has a structure that burners 202 are oppositely inserted into both ends of a U-shaped radiant tube 201. A burner 202 comprises a burner gun 205 incorporating a fuel passage 203 in its center for supplying fuel and a pilot combustion air passage 204 around the fuel passage for supplying pilot combustion air, a combustion air passage 206 provided around the burner gun 205 and having a larger inside diameter than the diameter of the burner gun, a heat storage 207 made of honeycomb-shaped ceramic structure placed at a halfway point of the combustion air passage 206, a turning vane 208 in an angle of almost 56 deg. placed similarly in a midway point of the combustion air passage 206 and in front of the heat storage 207, a baffle 209 for preventing the backflow of fuel gas and a circulating-flow rolling up part 210 enclosed with the burner gun 205, the turning vane 208 and the baffle 209.

In this embodiment, the outside diameter of the combustion air passage 206 is somewhat smaller than the inside diameter of the radiant tube 201 so that a space for turned combustion air to spread outward is preserved.

And, when combustion proceeds at one burner 202, combustion exhaust gas is sucked by the other burner 202 and passes through a heat storage 207 to accumulate sensible heat retained by the combustion exhaust gas. At the time of combustion, combustion air passes through the heat storage 207 with accumulated heat and is preheated to burn fuel by using the preheated combustion air.

Thus, when fuel gas and combustion air are supplied to one burner 202 and combustion proceeds therein, the supply of fuel gas is stopped and the combustion exhaust gas having passed through the heat storage 207, is exhausted, in the other burner 202. The supply of combustion air and the exhaust of combustion exhaust gas are switched using the four way valve 211.

Referring to FIG. 29, the mechanism in the case where combustion of fuel proceeds in the above mentioned heat storage type radiant tube burner is described as follows; That is, combustion air is supplied to the combustion air passage 206 and preheated to high temperature by the heat energy accumulated in the heat storage 207 while passing through the heat storage 207. Then, the combustion air is supplied with turning force by a turning vane 208 and becomes a turning flow 212. The flow velocity of combustion air injected into the tube is about 50 m/s. Since the combustion air has a momentum, it makes a flow along the inner wall of the radiant tube 201 under the action of centrifugal force. Because the combustion exhaust gas is sucked by the other burner, the combustion exhaust gas advances toward the other burner 202.

On the other hand, fuel gas is supplied to the fuel passage 203 and is injected straight and not diffusively from the tip 203a of the fuel passage 203 into the radiant tube 201 at a flow velocity of about 100 m/s. Between the turning flow 212 of combustion air and the flow 213 of injected fuel, there is a space portion caused by the difference in diameter. Since the flow velocity of fuel/combustion air is higher than that of the subsequent combustion exhaust gas, this space portion becomes relatively a negative pressure as compared with the combustion portion. Thus, a part of combustion exhaust gas generated by combustion of fuel forms a circulating flow 214 flowing in the opposite direction toward the fuel passage to the injection direction of fuel. The portion 213a situated at the outermost side of fuel flow 213 rides on this circulating current 214 of combustion exhaust gas, is conveyed in the direction toward the turning flow 212 of combustion air and is rolled up in combustion air to burn. The portion 213b situated at the inner portion than the outermost portion 213a of fuel flow 213 advances farther than the outermost portion 213a, but this portion also rides on the circulating flow 214 of combustion exhaust gas with a delay, is conveyed in the direction toward the turning flow 212 of combustion air and is rolled up in combustion air to burn since the circulating flow 214 of combustion exhaust gas advances while circulating. The further inner portion 213c of fuel flow 213 also rides on the circulating flow 214 of combustion exhaust gas in a similar manner is conveyed in the direction of the turning flow 212 of combustion air and is rolled up in combustion air to burn. Thus, combustion proceeds in sequence.

In this way, the fuel injected from the fuel passage does not burn all at once in a short period but gradually burns so that a slow combustion takes place and the combustion temperature does not rise, thereby suppressing the generation of nitrogen oxides (NOx).

According to an experiment using mixture gas which is a side product in an iron work, the nitrogen oxide content in the gas amounted to about 130 ppm in the method of the present invention, under the condition where 450 ppm of nitrogen oxide was generated in a conventional air two-stage combustion method, and a large reduction effect of Nox was obtained.

The heat storage type radiant tube burner mentioned above is provided with an inflow part 210 of the circulating flow enclosed with the burner gun 205, the turning vane 208 and the baffle 209. The reason for provision of such a circulating-flow inflow part 210 is because it was experimentally confirmed that the circulating flow 214 of combustion exhaust gas flows in this circulating-flow inflow part 210 lowers the temperature of combustion air by heat exchange therewith and at the same time the fuel gas riding on the circulating flow 214 of combustion exhaust gas is rolled up in the turning flow 212 from the starting point of the turning flow 212 of combustion air to burn, thereby suppressing the generation of nitrogen oxides (NOx) more efficiently.

Since a clearance is provided between the outer diameter of the passage through which combustion air is injected and the inner diameter of a radiant tube, the injected combustion air is further spread at the moment it is injected so that the negative pressure region is increased to enhance the roll-up effect, thereby generation of nitrogen oxides (NOx) is further suppressed efficiently.

As compared with the two-stage combustion method, the present invention simplifies the structure because it basically comprises one fuel blow inlet and one air blow inlet, and the present invention is applicable to a radiant tube of any diameter.

In addition, in the present invention, the generated combustion exhaust gas reaches the other end of the radiant tube and passes through the turning vane so that it passes through a heat storage oppositely placed to the burner while turning in a direction of circumference. When there is an uneven temperature distribution of combustion exhaust gas over the section of the radiant tube due to heat radiation from a radiant tube, the turning vane operates to make the temperature distribution uniform. Accordingly, since the thermal energy contained in the combustion exhaust gas reaching the heat storage is uniformly distributed, the temperature of the heat storage becomes more uniform and preheated air with a uniform higher temperature can be obtained.

In the present invention, a honeycomb-shaped ceramic heat storage is employed and thereby the layer of heat storage becomes thinner than that of an aluminum ball-shaped heat storage having the same thermal efficiency. Accordingly there is an advantage that the pressure loss of combustion air is small and combustion can proceed with a low power.

In the present invention, high-temperature combustion air can be obtained by using a heat storage and thereby an instantaneous rise of pressure inside the radiant tube caused by a delay of ignition, or so-called combustion shock, is also reduced. Accordingly there is an advantage that combustion can proceed stably.

Although cases of gaseous fuel are described above, the present invention can also give a similar arrangement/advantage in cases of atomized liquid fuel.

Figure 30:
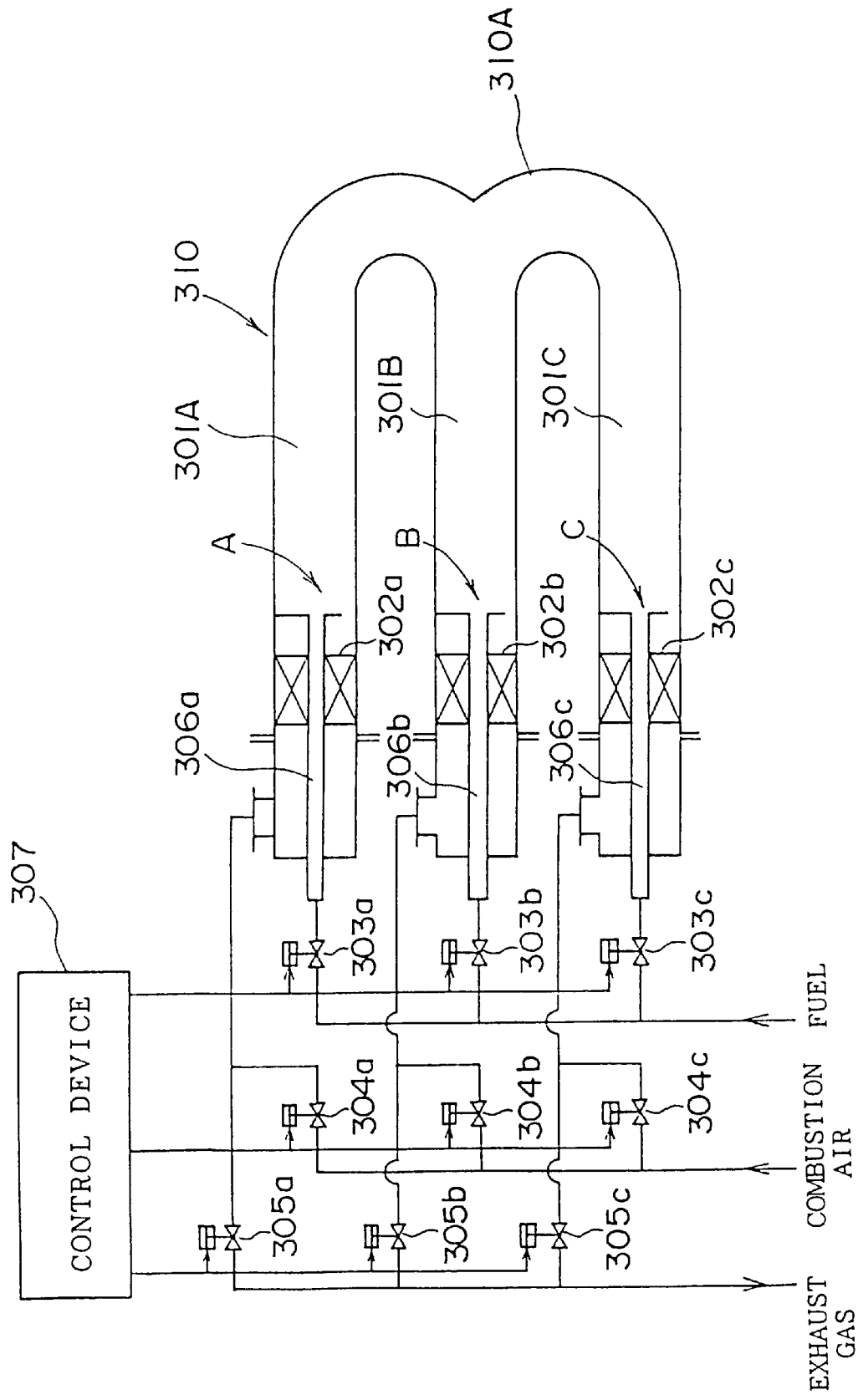
FIG. 30 is a structural schema showing a sixth embodiment of radiant tube burner according to the present invention.

FIG. 30 shows a sixth embodiment of radiant tube burner according to the present invention. This embodiment is a trident type radiant tube burner. A radiant tube 310 is provided with tubes 301A–301C and heat storage type burners A–C are provided at the respective ends of these tubes. The burners A-C comprise heat storages 302a–302c and nozzles 306a–306c penetrating these heat storages, respectively. Incidentally the section of the tubes 301A–301C is nearly circular all along their lengths.

The nozzles 306a–306c are supplied with fuel via fuel electromagnetic valves 303a–303c and the combustion air is arranged to be supplied into the tube 301A–301C via air electromagnetic valves 304a–304c. Combustion exhaust gas is arranged to be exhausted to outside the furnace (tube) via exhaust gas electromagnetic valves 305a–305c. These electromagnetic valves 303a–303c, 304a–304c and 305a–305c are subjected to an ON-OFF control by a control device 307 provided with a sequence circuit. Further, a pilot burner is provided at the end of each tube (not shown).

Figure 31:
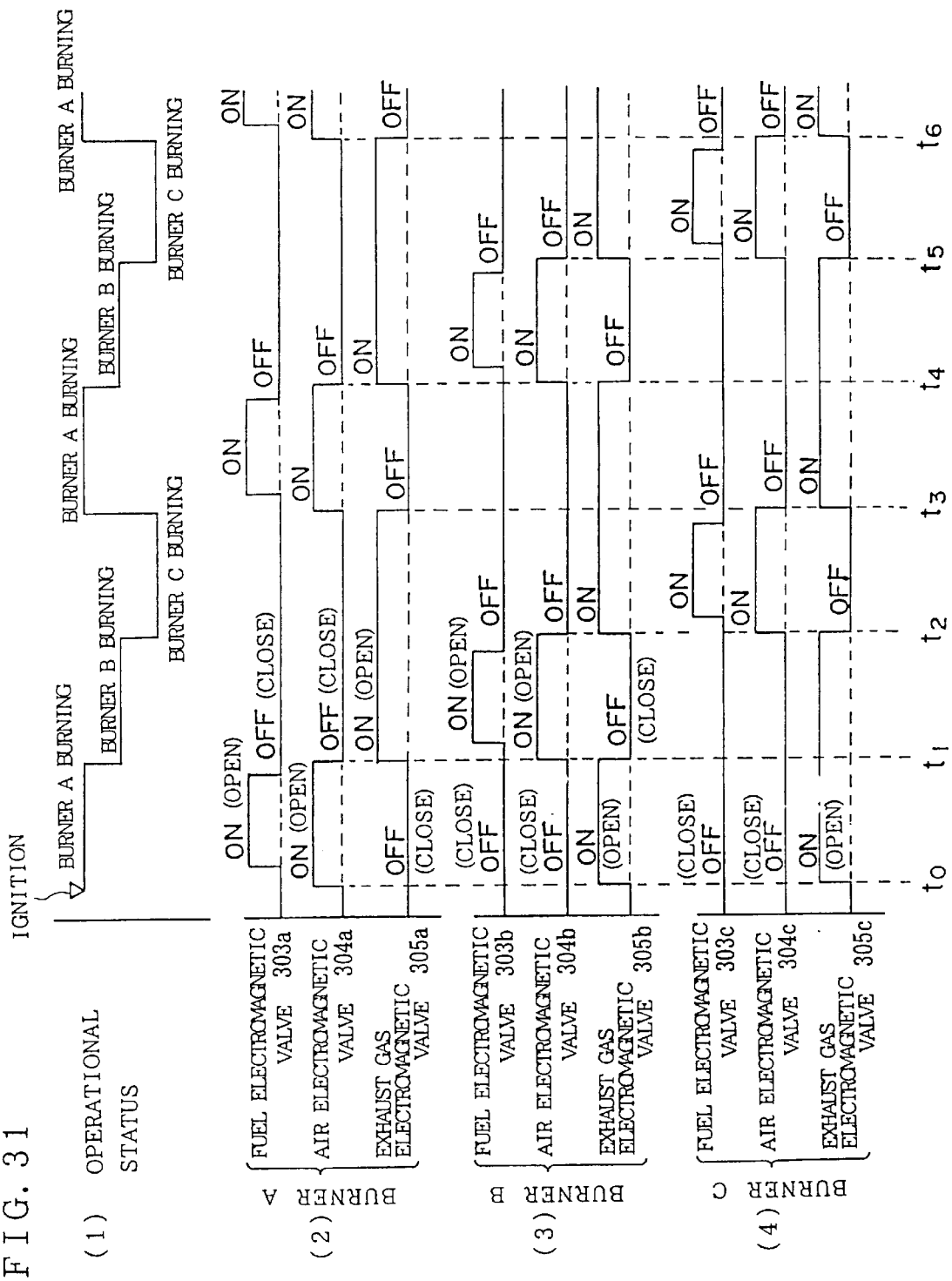
FIG. 31 is a time chart showing the operation of FIG. 30.

Next, referring to the timing chart of FIG. 31, operation of the embodiment of FIG. 30 will be described. FIG. 31 shows an alternate combustion operation of the embodiment of FIG. 30 and this operation is automatically controlled by the control device 307.

First, the control of combustion will be described briefly.

By igniting a pilot burner, Burner A burns. At that time the tubes 301B and 301C are set in suck and exhaust combustion exhaust gas via the heat storages 302b, 302c. As for the combustion and extinction method of heat storage type burners A–C, first, fuel is supplied and ignited under the state that combustion air is supplied and extinction is carried out by shutting off of combustion air after shutting off fuel supply. A time lag between supplies of fuel and combustion air is 2 seconds. This time lag is a time necessary for air purge (air ventilation) of the combustion exhaust gas stuffed in the piping from the air electromagnetic valves 304a–304c to the burners, the heat storages 302a–302c and the like, because they are filled with exhaust gas before individual burners start the next combustion. Thus, this time lag is a time required for replacement of combustion exhaust gas with air.

As shown in FIG. 31 (1), Burner A is first ignited and set in a combustion state, Burner A is next extinguished to set Burner B in a combustion state and then Burner B is extinguished to set Burner C in a combustion state. While switching a combustion state in sequence like this, the radiant tube burner is set to a predetermined temperature. Details of combustion control will be described as follows.

First, referring to FIG. 31 (2), combustion of Burner A will be described. At the time of $t_0$, the air electromagnetic valve 304a is turned ON to supply combustion air into the tube 301A and at the same time the exhaust gas electromagnetic valves 305b, 305c are turned ON to exhaust gas. Thereafter, the fuel electromagnetic valve 303a is turned to ON and fuel is supplied to start combustion. The combustion period of Burner A may be set in accordance with the heat accumulation capacity of heat storages 302a–302c and is set to 30 seconds in this embodiment. Thereafter, the fuel electromagnetic valve 303a is turned OFF and at the time $t_1$ after the lapse of 2 seconds, the air electromagnetic valve 304a is turned OFF to transfer to combustion of Burner B. Since the exhaust gas electromagnetic valves 305b, 305c are OPEN, combustion exhaust gas is exhausted from the sides of Burners B and C. During this time lag, fuel remaining in the piping from the fuel electromagnetic valve 303a to the burner nozzle is injected because of a residual pressure, but a perfect combustion of fuel can be carried out by shutting off combustion air after a previous stop of fuel supply. Such a control enables a safe alternate combustion to be continued without generation of carbon monoxide gas (CO gas) caused by an incomplete combustion. Incidentally, the stop period of fuel supply was set to 2 seconds based on results of combustion experiment, but it may be set to more than a time when fuel remaining in the piping from the fuel electromagnetic valve 303a to the burner nozzle has been completely injected because of the residual pressure but at least 0.5 seconds is required.

Next, after the lapse of 30 seconds from the time $t_0$ to $t_1$, a burning of Burner A is changed to a burning of Burner B. Burner B carries out an operation similar to that of Burner A. Referring to FIG. 31 (2), combustion of Burner B will be described. At the time of $t_1$, the air electromagnetic valve 304a is shut off, at the same time the exhaust gas electromagnetic valves 305a is turned ON, and the air electromagnetic valve 304b of Burner B is turned ON to supply combustion air into the tube 301B. The exhaust gas electromagnetic valve 305c keeps an ON state. After the lapse of 2 seconds from the time $t_1$, the fuel electromagnetic valve 303b is turned ON, to supply fuel and Burner B starts combustion. Combustion exhaust gas in the tube 301B is sucked in to the sides of Burners A and the C, and the sensible heat of combustion exhaust gas is accumulated in the heat storages 302a, 302c. The combustion air supplied from the air electromagnetic valve 304b passes through the heat storage 302b to be preheated by recovery heat accumulated in the heat storage 302b during a period of $t_0$–$t_1$ and is supplied to Burner B. During a period of $t_1$–$t_2$, Burner C maintains a suction state of combustion exhaust gas, so that the heat storage 302c accumulates the sensible heat of combustion exhaust gas during a period of $t_0$–$t_2$. Prior to the time $t_2$, the fuel electromagnetic valve 303b is shut off and the air electromagnetic valve 304b is shut off at the time $t_2$ to set Burner B in an extinction state. At the time $t_2$, the exhaust gas electromagnetic valve 305b is tuned ON, at the same time the air electromagnetic valve 304c is turned ON and exhaust gas electromagnetic valve 305c are turned OFF, respectively, so that a burning state of Burner B is changed to a burning state of Burner C. The exhaust gas electromagnetic valve 305a keeps an ON state.

Burner C turns the air electromagnetic valve 304c ON at the time $t_2$, and the fuel electromagnetic valve 303c is turned to ON after the lapse of 2 seconds so that combustion starts. A period of time when the air electromagnetic valve 304c remains ON, which is the switching interval of alternate combustion, is 30 seconds, and a period of time when the fuel electromagnetic valve 303c remains ON is 26 seconds accordingly. When Burner C is in a combustion state, the exhaust gas valves 305a, 305b are ON to exhaust combustion exhaust gas outside the furnace. At that time, the sensible heat of exhaust gas is accumulated in the heat storages 302a, 302b. The combustion air supplied from the air electromagnetic valve 304c is preheated by the heat storage 302c and supplied to Burner C. And, at the time of $t_3$, Burner C is set in an extinction state and Burner A is set in a combustion state. After that, combustion is continued by switching Burners B, C . . . in sequence till the operation of the radiant tube burner stops or pauses, as seen in the operating states shown in FIG. 31.

Incidentally, at the time of a pause, all fuel supply electromagnetic valves 303a–303c and pilot burner fuel supply valve (not shown) are set to OFF, and the air electromagnetic valves and the exhaust gas electromagnetic valves are actuated in the same way for 90 seconds as in an alternate combustion state so that only combustion air is allowed to flow to Burners A, B and C to air-purge combustion gas in the tube.

As mentioned above, while the exhaust gas electromagnetic valves 305a–305c are kept ON, sensible heat of exhaust gas is accumulated in the heat storages of their respective tubes and while the air electromagnetic valves 304a are kept ON, combustion air in the respective tubes is preheated by the recovered heat of the respective heat storages and is provided for combustion. In this embodiment, the alternate combustion period is 30 seconds, the time lag is 2 seconds and the previous stop period of the fuel supply is 2 seconds, so that a period of time when the fuel electromagnetic valves 303a–303c are kept ON is 26 seconds. By alternate combustion carried out in this manner, the thermal efficiency of a radiant tube burner is improved. Combustion is continued while combustion tubes are switched in sequence like this.

Incidentally, safety measures are taken by installing a flame monitor since the radiant tube burner of the present invention is an alternate combustion equipment in which ignition/extinction are repeated at a short interval,. A CO detector is also installed in a exhaust gas flue to monitor incomplete combustion.

Next, referring to FIG. 32, a seventh embodiment of the present invention will be described. As the embodiment of FIG. 32 differs in the shape of radiant tubes from that of FIG. 30, but is otherwise identical the same symbols are given to the same parts as those of FIG. 30.

Figure 32:
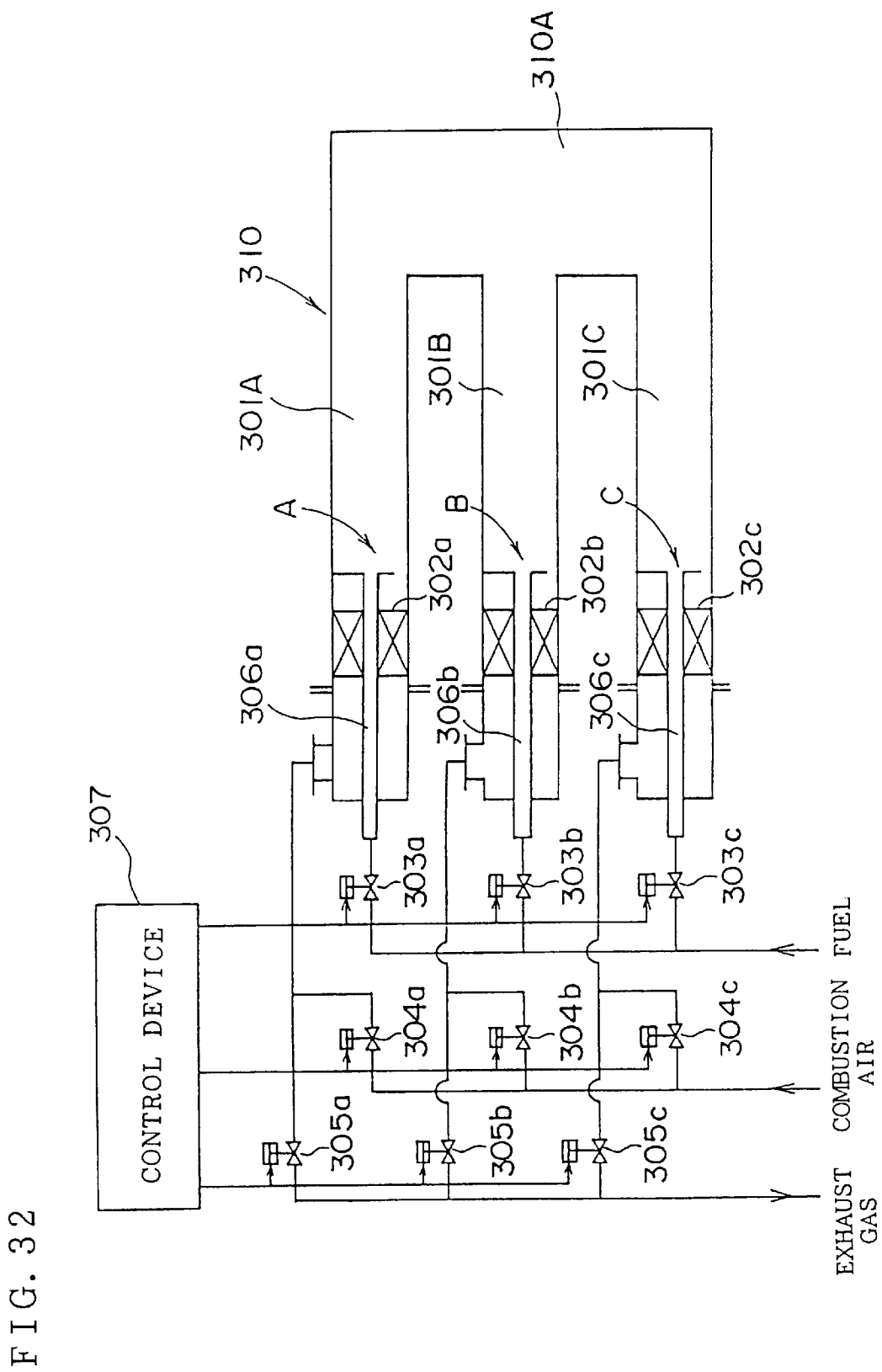
FIG. 32 is a structural schema showing a seventh embodiment of radiant tube burner according to the present invention.

In FIG. 32, the radiant tube 310 comprises a trunk tube 310A and branch tubes 301A–301C extending from the trunk tube. At the ends of the branch tubes 301A–301C, heat storage type Burners A–C are provided. The fuel supply electromagnetic valves 303a–303c, the air electromagnetic valves 304a–304c for controlling combustion air and the exhaust gas electromagnetic valves 305a–305c are the same as those of the embodiment of FIG. 30, and the ON-OFF control thereof is carried out with a control device 307.

Between the sectional area of branch tubes 301A–301C and that of trunk tube 310A, a relation of (inside sectional area of a branch tube) <(inside sectional area of a trunk tube) holds. The trunk tube 310A serves as an equalizer (header) for combustion exhaust gas flowing therethrough. Thus, Burners A–C burn alternately and, for example, even if combustion exhaust gas passes through the trunk tube 310A and respective branch tubes 301A, 301C, the respective flow rates flowing in the branch tubes 301A, 301C become nearly equal. In this embodiment, the relation is set as (inside sectional area of a trunk tube)/(inside sectional area of a branch tube)$\geq 1.5$.

Meanwhile, Burners A–C perform an alternate combustion operation as described in FIG. 31 and the description thereof will be omitted accordingly.

Next, an eighth embodiment of radiant tube burner according to the present invention will be described referring to FIG. 33. The embodiment of FIG. 33 comprises four heat storage type burners and the number of electromagnetic valves also increases corresponding to the number of the burners. However, the fundamental arrangement is the same as the embodiment of FIG. 32 and the same symbols are given to the same parts as those of FIG. 32.

Figure 33:
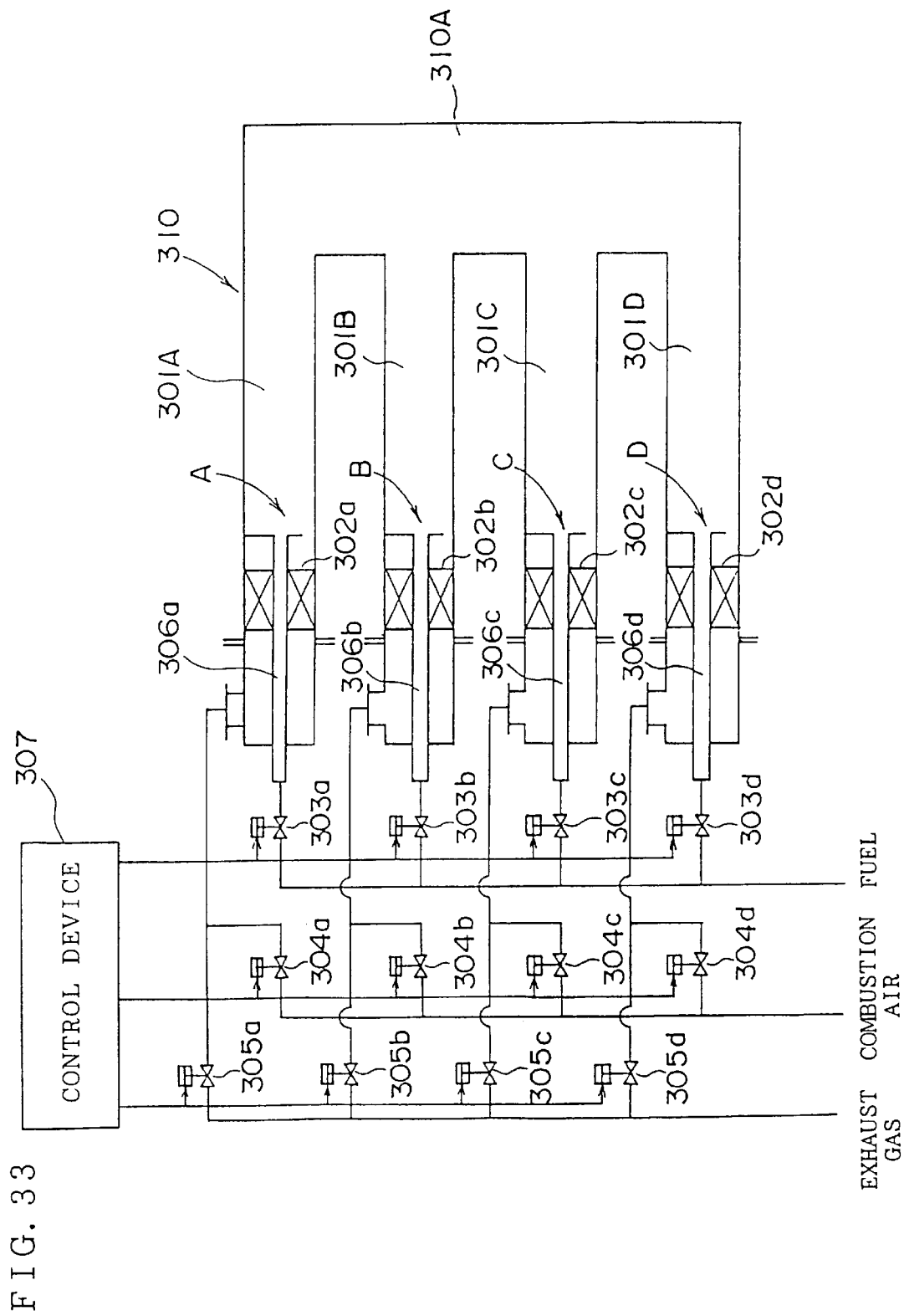
FIG. 33 is a structural schema showing an eighth embodiment of radiant tube burner according to the present invention.

In FIG. 33, the radiant tube 310 comprises a trunk tube 310A and branch tubes 301A–301D provided on the trunk tube 310A. At the ends of the branch tubes 301A–301D, H heat storage type Burners A–D are provided. Burners A–D comprise heat storages 302a–302d and nozzles 306a–306d, respectively. In order to supply fuel and combustion air to burners and exhaust gas, fuel electromagnetic valves 303a–303d, air electromagnetic valves 304a–304d for controlling combustion air and exhaust gas electromagnetic valves 305a–305d are provided. These electromagnetic valves are controlled by a control device 307. In this embodiment, the relation of between the sectional areas of the trunk tube 310A and the branch tubes 301A–301D is set as (inside sectional area of a trunk tube)/(inside sectional area in a branch tube)≧2. By setting the relation between the sectional areas of the trunk 310A and the branch tubes 301A–301D as mentioned above, a similar advantage to that of the embodiment of FIG. 32 is obtained.

Figure 34:
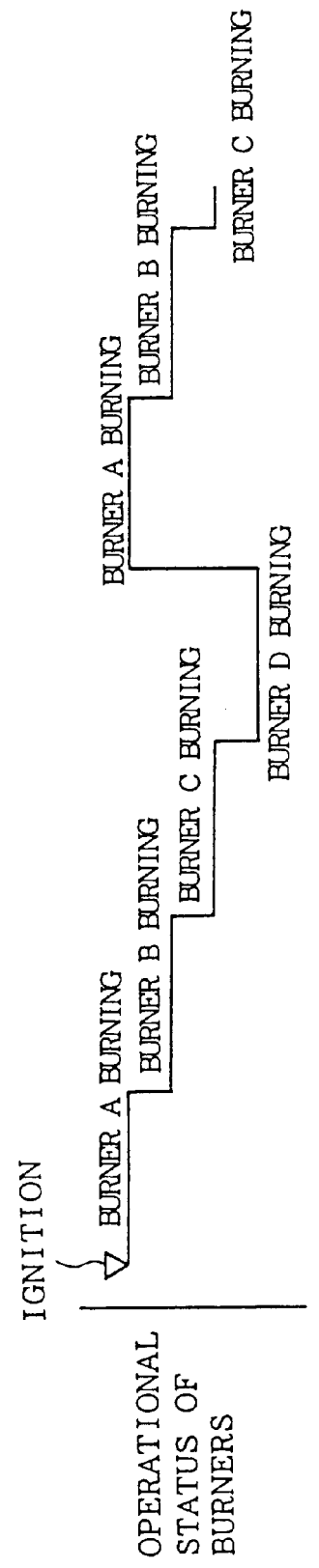
FIG. 34 is a time chart showing the operation of FIG. 33.
Figure 35:
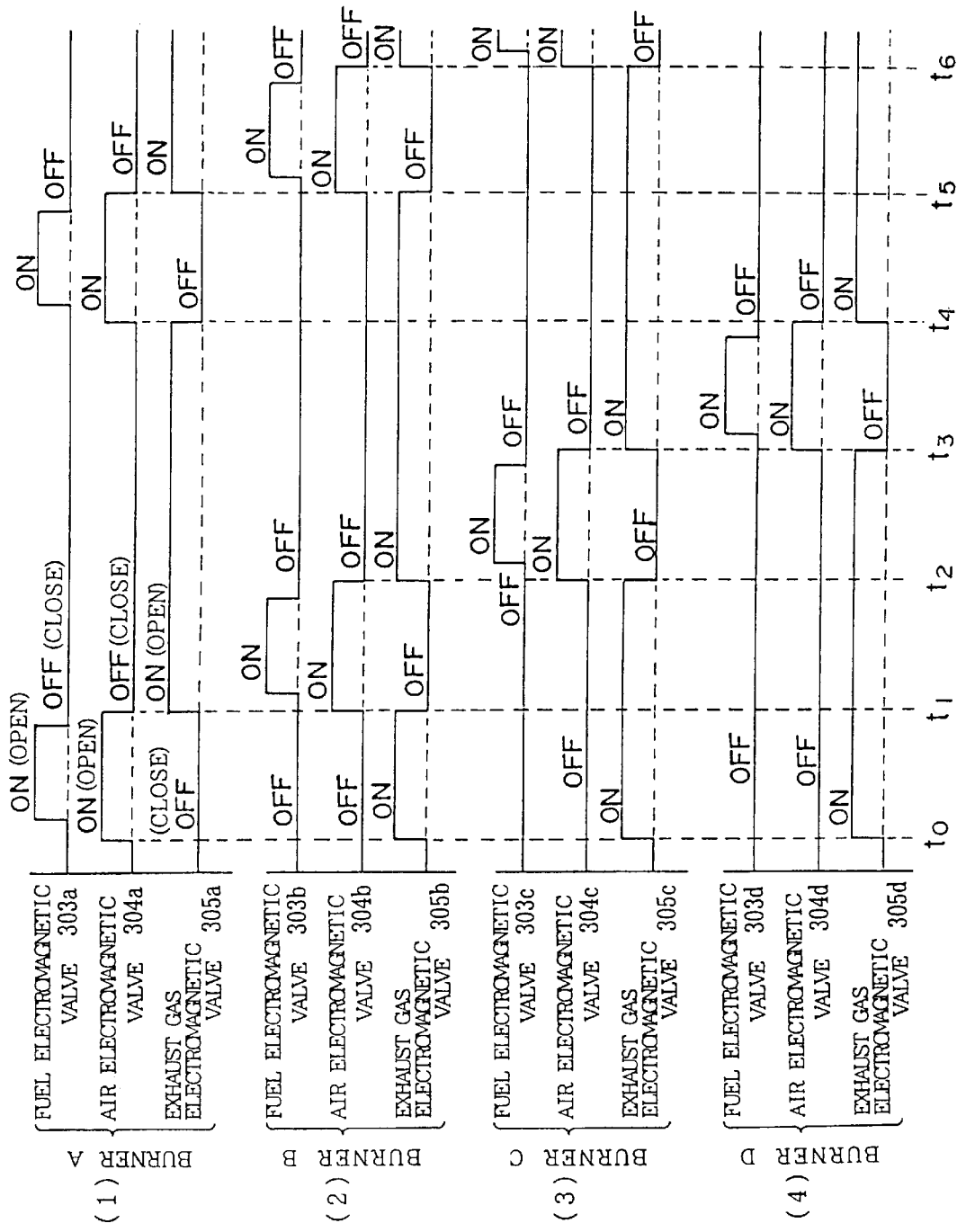
FIG. 35 is a time chart showing the operation of FIG. 33.

Combustion operation of this embodiment will be described referring to FIGS. 34 and 35. In the radiant tube burner of FIG. 33, control of combustion is carried out by switching the burning of burners A–D in the sequence of Burners A, B, C and D as shown in FIG. 34. In combustion control of this embodiment, when one Burner A burns, for example, combustion exhaust gas is so controlled as to be sucked to the sides of the other three Burners B–D sides. FIG. 35 shows a detailed timing chart thereof.

In FIG. 35, (1)–(4) show combustion/exhaust operation of Burners A-D. First, operation of Burner A will be described referring to FIG. 35 (1). The air electromagnetic valve 304$a$ is turned ON and then the fuel electromagnetic valve 303$a$ is turned ON to set Burner A for a burning state. For Burners B, C and D the exhaust gas electromagnetic valves 305$b$–305$d$ are turned ON at the time $t_0$ to exhaust combustion exhaust gas outside the furnace. After the fuel electromagnetic valve 303$a$ is turned OFF, the air electromagnetic valve 304$a$ is turned OFF at the time $t_1$ to set Burner A in an extinction state, and the exhaust gas electromagnetic valve 305$a$ is turned ON while the exhaust gas electromagnetic valves 305$c$ and 305$d$ for Burners C and D are kept in ON state.

Next, the combustion operation of Burner B will be described. As shown in FIG. 35 (2), the air electromagnetic valve 304$b$ is turned ON at the time, and then the fuel electromagnetic valve 303$b$ is turned ON to set Burner B in a burning state, and at the same time the exhaust gas electromagnetic valve 305$b$ is turned OFF. After the fuel electromagnetic valve 303$b$ is turned OFF, the air electromagnetic valve 304$b$ is turned OFF at the time $t_2$ to extinguish Burner B. At the same time, the exhaust gas electromagnetic valve 305$b$ is turned ON to proceed to a burning state of Burner C.

The combustion operation of Burner C will now be described. As shown in FIG. 35 (3), the air electromagnetic valve 304$c$ is turned ON at the time $t_2$ and then the fuel electromagnetic valve 303$c$ is turned ON for set Burner C to a burning state, and at the same time the exhaust gas electromagnetic valve 305$c$ is turned OFF. After the fuel electromagnetic valve 303$c$ is turned OFF, the air electromagnetic valve 304$c$ is turned OFF at the time $t_3$ to extinguish Burner C. At the same time, the exhaust gas electromagnetic valve 305$c$ is turned ON.

The combustion operation of Burner D will now be described. As shown in FIG. 35 (4), the air electromagnetic valve 304$d$ is turned ON at the time $t_3$ and then the fuel electromagnetic valve 303$d$ is turned ON to set Burner D in a burning state, and at the same time the exhaust gas electromagnetic valve 305$d$ is turned OFF. After the fuel electromagnetic valve 303$d$ is turned to OFF, the air electromagnetic valve 304$d$ is turned to OFF at the time $t_4$ to extinguish Burner D. At the same time, the exhaust gas electromagnetic valve 305$d$ is turned to ON. By repeating these operations, alternate combustion is carried out to heat the radiant tube burner.

Figure 36:
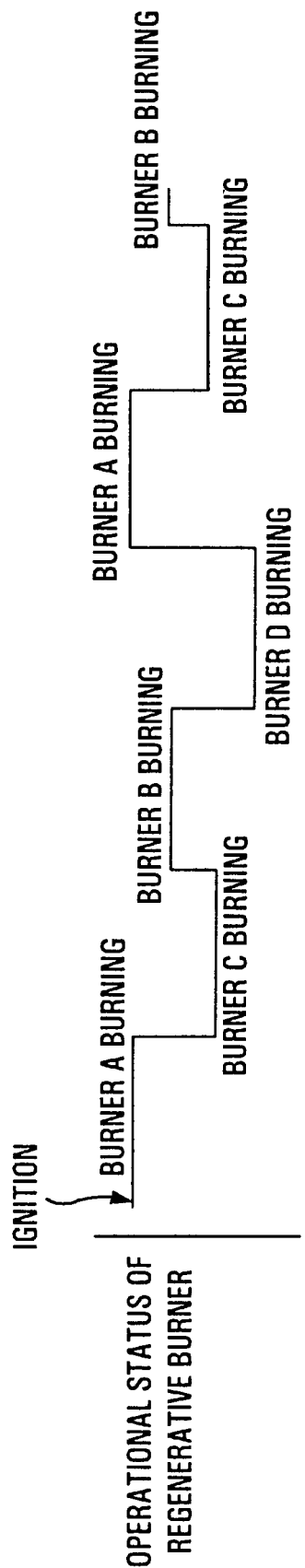
FIG. 36 is a time chart showing the operation of FIG. 33.

In the radiant tube burner of FIG. 33, the control of combustion may be also carried out in the sequence of Burners A, C, B and D as shown in FIG. 36.

Next, a ninth embodiment of radiant tube burner according to the present invention will be described referring to FIG. 37. The embodiment of FIG. 37 comprises the respective heat storage type burners provided corresponding to five branching tubes. The same symbols are given to parts similar to those in FIG. 33.

Figure 37:
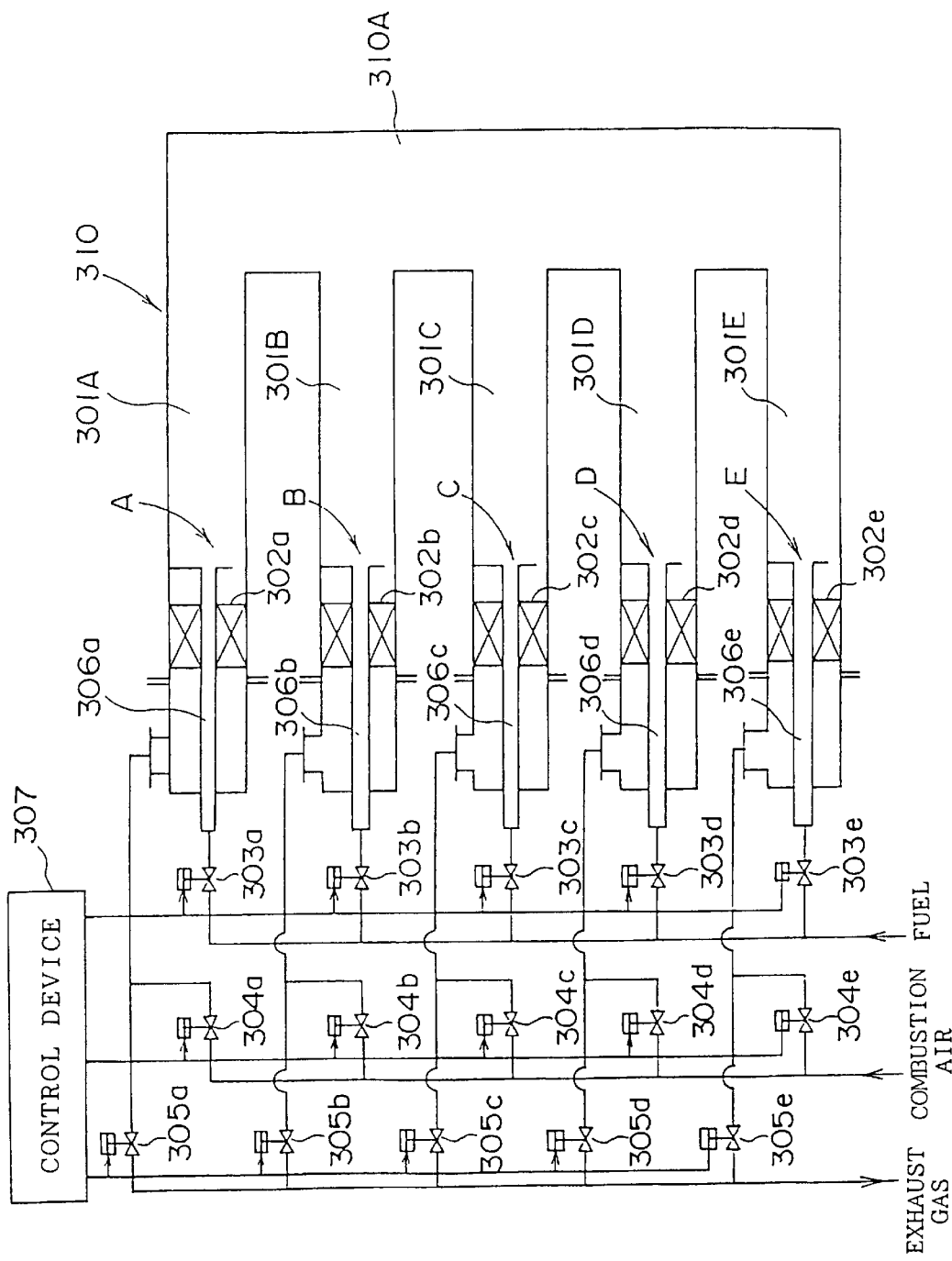
FIG. 37 is a structural schema showing a ninth embodiment of radiant tube burner according to the present invention.

In FIG. 37, the radiant tube 310 has branch tubes 301A–301E provided for a trunk tube 310A and heat storage type burners A–E provided at their ends. Burners A–E comprise heat storages 302$a$–302$e$ and nozzles 306$a$–306$e$, respectively. In order to supply fuel and combustion air to burners and exhaust gas, fuel electromagnetic valves 303$a$–303$e$, air electromagnetic valves 304$a$–304$e$ for controlling combustion air and exhaust gas electromagnetic valves 305$a$–305$e$ are provided. These electromagnetic valves are controlled by a control device 307.

Figure 38:
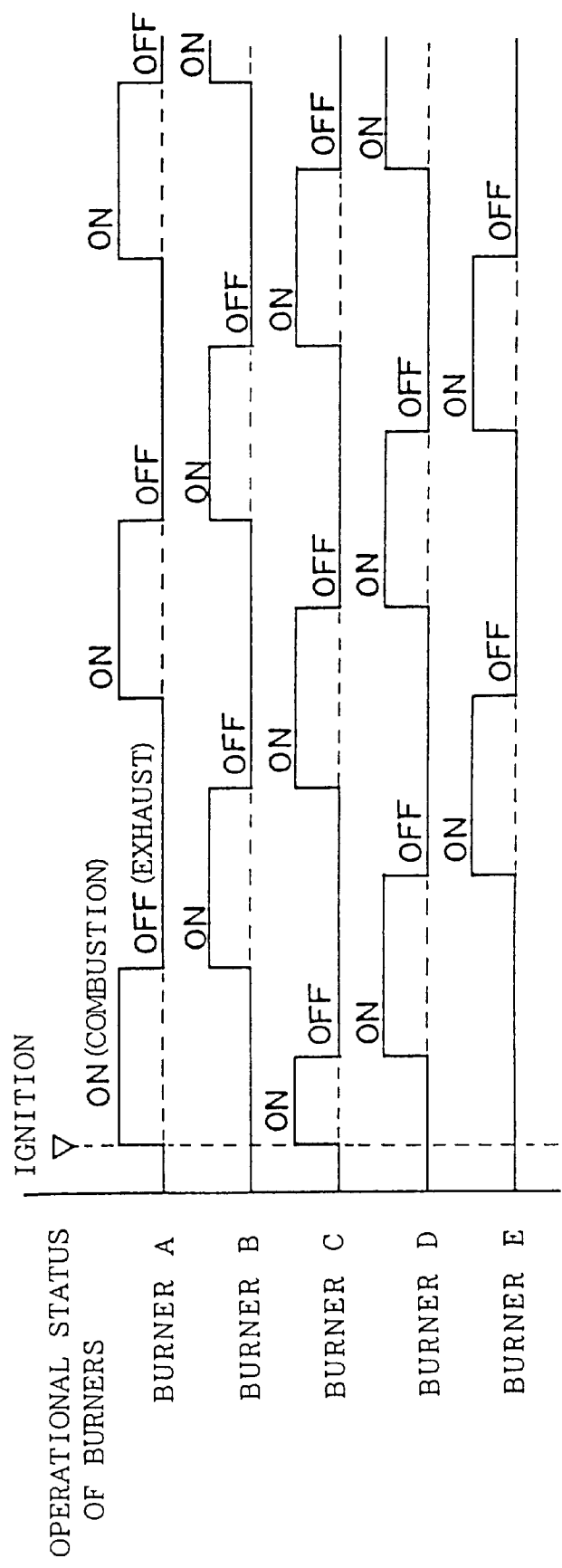
FIG. 38 is a time chart showing the operation of FIG. 37.

With this embodiment, though such an operation is possible as to burn one burner and exhaust combustion gas with the other four burners, an example of operation to burn two burners and suck the combustion exhaust gas with the other three burners is shown in FIG. 38. The ON-OFF operation of electromagnetic valves in this embodiment is the same as that described above. Needless to say, it is evident that the operating pattern is not limited to that of FIG. 38 but may be another pattern.

As mentioned above, radiant tube burners according to the present invention have been described by enumerating various embodiments, but any number of branch tubes may be provided on the trunk tube. And, the combination of burners in a burning state and non-burning state is optional.

Since the relation of (pressure loss of a heat storage during passing of combustion air)<(pressure loss of a heat storage during passing of exhaust gas) holds as described before, operation with a smaller number of burning burners than that of non-burning burners (combustion gas suction burners) is effective in reducing the pressure loss in the device.

In addition, though radiant tubes with a circular sectional shape are employed in these embodiments, such an arrangement in pipe shape is not necessarily required but tubes with a polygonal-section are also allowable.

Furthermore, the burner may be equipped with a fin to increase the heat transmission area.

Still, in these embodiments, metal, such as heat-resisting steel pipe is used as a material of the radiant tube, but the radiant tube may be made up of ceramics. The material of a radiant tube is not limited to the ones described above, and any material can be used provided that it is capable of maintaining a sufficient durability.

Figure 39:
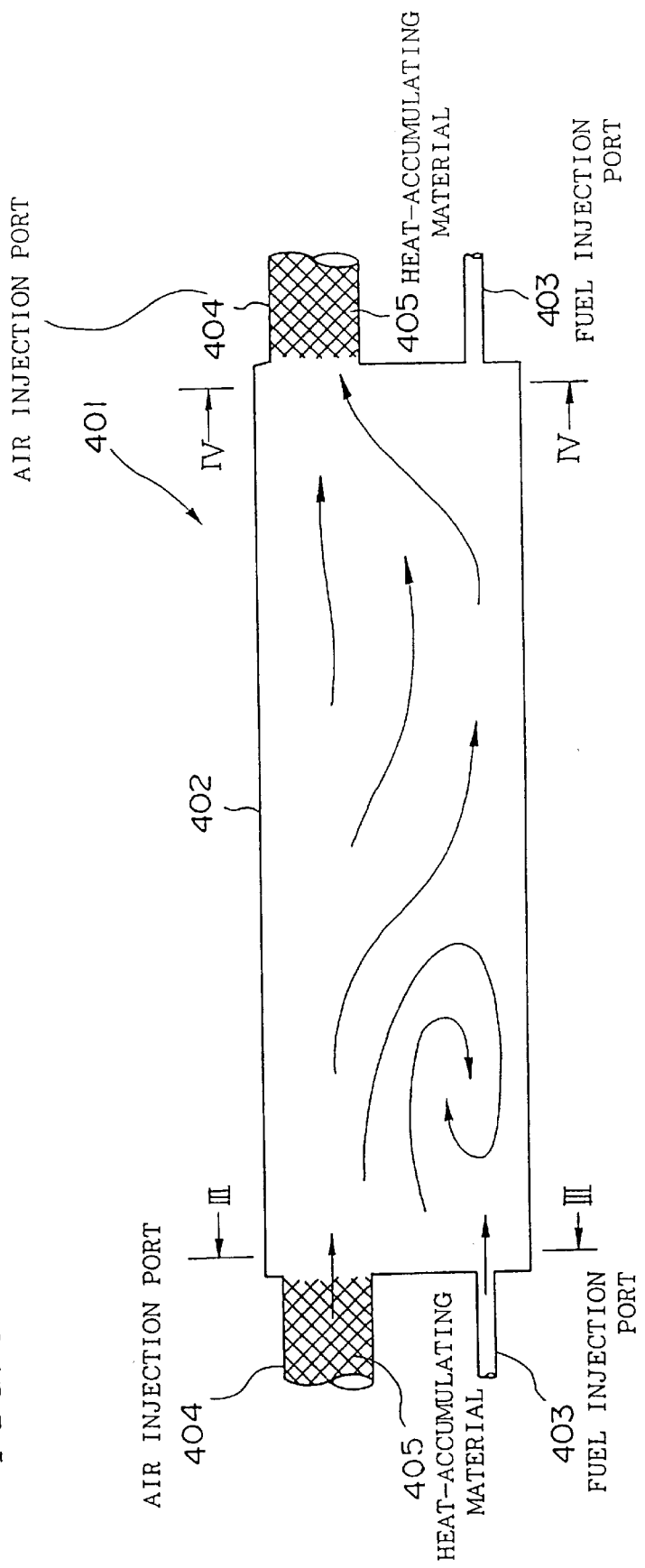
FIG. 39 is an explanatory drawing showing the basic arrangement of a demonstrative example of a radiant tube burner combustion method according to the present invention.
Figure 40:
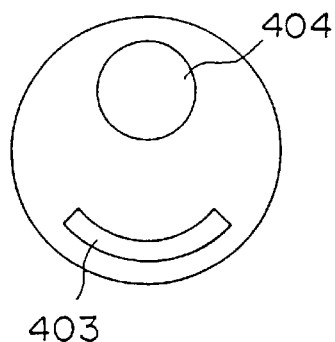
FIG. 40 is a III—III and IV—IV arrow view of FIG. 39.

FIG. 39 is a structural view showing the fundamental concept for verifying the combustion method of a radiant tube burner according to the present invention. Numeral 401 denotes a radiant tube burner, which is equal to a conventional one in that gaseous fuel of hydrocarbon type is normally used. The burner is heated by combustion gas passing through the interior and heat is radiated from the outer surface to heat a heating furnace, heat-treating furnace or the like. Numeral 402 denotes a radiant tube with both ends closed to partition a space to form a combustion chamber. Numeral 403 denotes fuel injection ports provided at both ends of said radiant tube 402 and connected to a hydrocarbon type gaseous fuel piping. Numeral 404 denotes combustion air injection ports provided at both ends of said radiant tube 402, connected to a not shown air supply installation and exhaust installation and used both for air supply and for gas exhaust. When either one of the injection parts functions as a supply port, the other functions as an exhaust port. Numeral 405 denotes a heat accumulating material stuffed in combustion air injection ports 404 and composed of globular ceramic, porous ceramic or other molded ceramic. The heat accumulating material is deprived of heat by supplied air when the combustion air injection port 404 functions as a supply port, and is heated by exhaust gas when the combustion air injection port functions as an exhaust port. As shown in FIG. 40, a fuel injection port 403 has a slit shape for executing a high-speed mixing of fuel with air, and a combustion air injection port 404 has a circular shape for enlarging the self-circulating flow, both of which are positioned apart from each other. Although the fuel injection port 403 and the combustion air injection port 404 are both positioned off the center in this embodiment only either one of them may be positioned of the center.

And, combustion of the radiant tube is alternately executed at both ends. That is, while one combustion air injection port 404 is burning, the other combustion air injection port 404 is made to function as a exhaust port of combustion gas and heat is accumulated in the heat-accumulating material stuffed in the exhaust port. After heat is sufficiently accumulated, combustion is stopped, then the combustion air injection port 404 having functioned as an exhaust port is made to function as an air supply port and air supplied from the port is preheated by the heat accumulated in the heat-accumulating material.

In a radiant tube burner 401 arranged as above, the supply speed of combustion air supplied from the combustion air injection port 404 is made substantially larger than that employed in a conventional radiant tube burner, vortex flow is generated near the extension line of the fuel injection port 403, a self-circulating flow is derived in combustion gas, a high-temperature combustion gas is diluted to lower the combustion temperature, and moreover the generation time of nitrogen oxides determined from the length of a radiant tube and the flow velocity of combustion gas is shortened to keep the reaction in a non-equilibrium state, thereby decreasing the nitrogen oxide content in exhaust gas.

Figure 42:
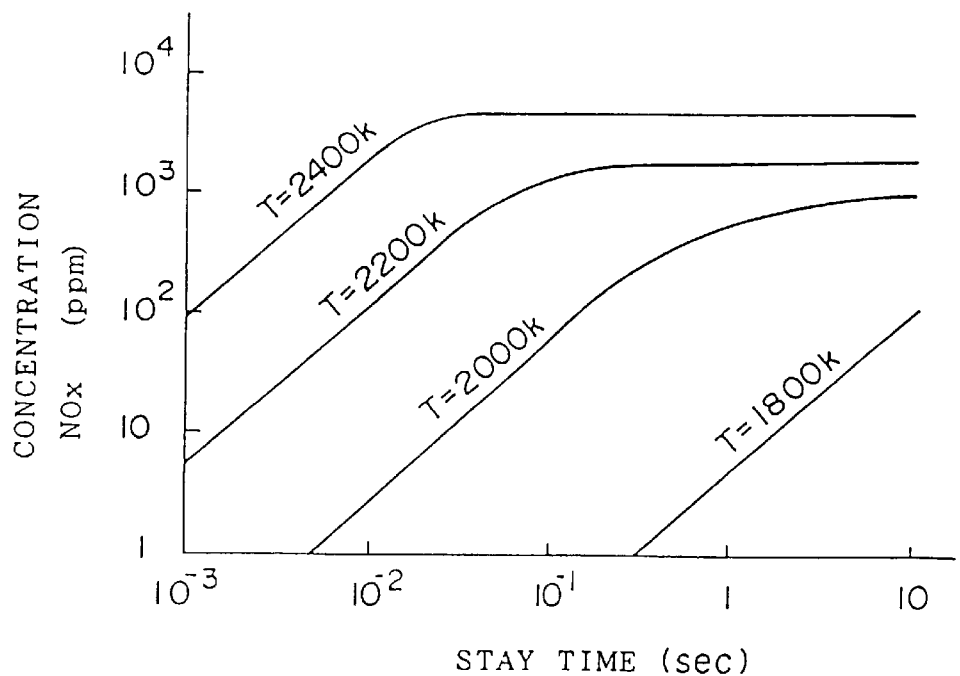
FIG. 42 is a graph showing the relation between the stay time of and the NOx concentration of combustion gas in a radiant tube burner.

In the case where a combustion flame with maximum temperature of, for example, 2000K is formed, about 1000 ppm of nitrogen oxides is generated when the reaction is allowed to proceed to an equilibrium state, but the quantity of generated nitrogen oxides can be reduced to about 100 ppm by setting the stay time to about 0.1 second, as is clearly seen in FIG. 42. As seen from this, the generated quantity of nitrogen oxides can be reduced by decreasing the combustion maximum temperature and the stay time.

Retaining the high velocity of gas flow causing a short stay time of the high-temperature part to prevents the combustion reaction from proceeding to an equilibrium state. Thus, the locally generated portion with an air ratio of about 1.0 is greatly decreased and the combustion time in a radiant tube is made shorter than a period for a perfect completion of combustion reaction, so that the combustion in the radiant tube can be kept in non-equilibrium.

On the other hand, in cases where combustion proceeds in a non-equilibrium state, the reaction may not be completed by using a certain sort of fuel or a certain method of combustion. Therefore, it is arranged to execute reaction of unreacated gas while recovering the heat of combustion gas, by installing a heat-accumulating material or the like at the outlet of the radiant tube. Such burners are provided at both ends of a radiant tube and allowed to alternately burn. That is, the heat-accumulating material stuffed in a combustion air injection port of one burner is allowed to accumulate heat while the other burner is burning, the combustion is stopped after the heat is sufficiently accumulated therein, and the one burner with the accumulated heat is actuated to preheat air with the heat so that an efficient combustion can be carried out.

Incidentally, since intermittent combustion takes place alternately from both ends of a radiant tube, the shape of the radiant tube (402) should preferably be a straight tube from the standpoint of thermal distortion.

Figure 41:
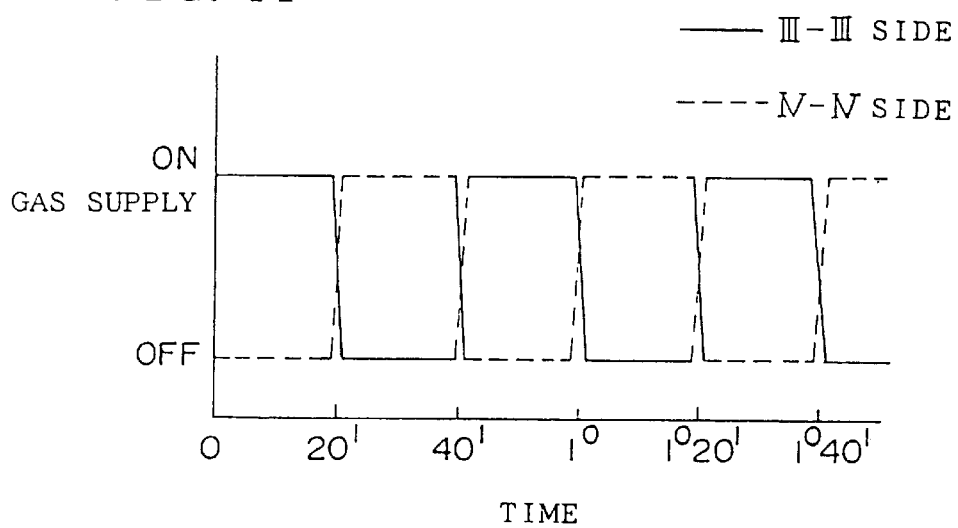
FIG. 41 is a graph showing one example of alternate combustion of a radiant tube burner.

Table 4 shows the results obtained by a 20-second-interval intermittent combustion as shown in FIG. 41 with a mean combustion gas velocity of 50 m/s at the outlet of a radiant tube (402) with 2 m in length and 100 mm in tube diameter. It is evident from these results that the present invention can achieve a lower nitrogen oxide content and a higher combustion efficiency than those of a conventional combustion method.

TABLE 4

|  | Maximum temperature (° C.) | Nox generated quantity (ppm) |
|---|---|---|
| Conventional example | 1800 | 700 |
| Present invention | 1750 | 100 |

We claim:

1. A radiant tube burner comprising a radiant tube having ends each provided with a burner in which a heat storage is arranged to allow the burner to burn by using high-temperature combustion air obtained by alternately letting combustion exhaust gas and combustion air pass through the heat storage, characterized in that:

a fuel nozzle for injecting fuel and an air throat for allowing said combustion air and said combustion exhaust gas to pass inside are arranged in parallel in said radiant tube at each of said ends; and a combustion air injection port provided at a tip of said air throat is so arranged as to be placed apart from a fuel injection port at a tip of said fuel nozzle, and near an inner circumferential wall surface of said radiant tube.

2. A radiant tube burner as set forth in claim 1, characterized in that:

a nozzle support for stopping up said radiant tube is provided at the tip of said air-throat and a fuel-nozzle through hole for inserting the tip of said fuel nozzle to support it is provided in said nozzle support, and said combustion air injection port is formed in a marginal portion of said nozzle support.

3. A radiant tube burner as set forth in claim 2, said combustion air injection port is formed utilizing the inner circumferential wall surface of said radiant tube as a part of the port.

4. A radiant tube burner as set forth in claim 1, characterized in that:

said fuel nozzle is a pilot-burner nozzle used for both a pilot and a burner, comprising a fuel supply pipe in which sufficient amount of fuel for maintaining a pilot flame is allowed to always flow as a pilot fuel, and a primary air throat provided around said fuel supply pipe to allow an appropriate amount of primary air for pilot combustion to always flow in said primary air throat independently of an operating state of said burner so that main combustion and pilot combustion proceed alternately by switching an amount of the fuel injected from said fuel supply pipe.

5. A radiant tube burner as set forth in claim 1, characterized in that:

said heat storage is a honeycomb-shaped ceramics through which a straight flow passage having a constant passage area passes.

6. A radiant tube burner as set forth in claim 1, characterized in that:

the sectional shape of said combustion air injection port is circular.

7. A radiant tube burner as set forth in claim 1, characterized in that:

the temperature of air injected from said combustion air injection port is at least 100° C. higher than the ignition temperature of fuel.

8. A radiant tube burner as set forth in claim 1, characterized in that a flow velocity of combustion air injected from said combustion air injection port is set higher than 110 times as high as the combustion speed of fuel.

9. A radiant tube burner as set forth in claim 1, characterized in that:

a flow velocity of combustion air injected from said combustion air injection port is set to 100 m/s or higher.

10. A radiant tube burner as set forth in claim 1, characterized in that:

a turning means is provided in said radiant tube, to inject combustion air preheated by said heat storage while turning the combustion air.

11. A radiant tube burner as set forth in claim 10, characterized in that:

a circulating-flow inflow part for allowing a circulating flow of combustion exhaust gas to flow in is provided between said fuel nozzle and said turning means.

12. A radiant tube burner as set forth in claim 1, characterized in that:

said radiant tube comprises a trunk tube and three or more branch tubes linked to said trunk tube, and a burner is provided at each end of said branch tubes.

13. A radiant tube burner as set forth in claim 12, characterized in that:

an inner sectional area of said trunk tube is larger than that of each of said branch tubes.

14. A radiant tube burner as set forth in claim 12, characterized in that:

said burners execute alternate combustion by periodically repeating a burning state and not burning state with a certain cycle.

15. A radiant tube burner as set forth in claim 12, characterized in that:

the radiant tube burner further comprises a controller for controlling alternate combustion to be executed with a smaller number of burning burners than that of not burning burners.

16. A radiant tube burner as set forth in claim 12, characterized in that:

the number of burners switched between a burning state and a not burning state is set below a half of a total number of burners.

17. A radiant tube burner as set forth in claim 12, characterized in that:

supply of combustion air is stopped with a delay of a predetermined time after fuel supply in alternate combustion of the burners has been stopped.

18. A radiant tuber burner as set forth in claim 1, characterized in that:

said fuel is allowed to burn in a non-equilibrium state.

19. A radiant tube burner as set forth in claim 18, characterized in that:

after said fuel is allowed to burn in a non-equilibrium state at one of said ends of said radiant tube, unburnt fuel is allowed to further burn utilizing said heat storage provided at another of said ends of said radiant tube, thus attaining an equilibrium state.

20. A radiant tube as set forth in claim 18, characterized in that:

combustion is so controlled as to burn in a non-equilibrium state with the average stay time of said fuel in said radiant tube set below 1 second.

* * * * *